(12) United States Patent
Melrose et al.

(10) Patent No.: US 12,672,733 B2
(45) Date of Patent: Jul. 7, 2026

(54) CAPSULE, SYSTEM AND USE OF THE SYSTEM FOR PREPARING DOUBLE BEVERAGES LIKE A DOUBLE ESPRESSO, A DOUBLE LUNGO AND A DOUBLE RISTRETTO

(71) Applicant: KONINKLIJKE DOUWE EGBERTS B.V., Utrecht (NL)

(72) Inventors: John Richard Melrose, Banbury (GB); Richard John Andrews, Banbury (GB); Paul James Harpley, Banbury (GB); Gerbrand Kristiaan De Graaff, Hillegom (NL)

(73) Assignee: KONINKLIJKE DOUWE EGBERTS B.V., Utrecht (NL)

( * ) Notice: Subject to any disclaimer, the term of this patent is extended or adjusted under 35 U.S.C. 154(b) by 384 days.

(21) Appl. No.: 16/265,955

(22) Filed: Feb. 1, 2019

(65) Prior Publication Data

US 2020/0000266 A1     Jan. 2, 2020

Related U.S. Application Data

(63) Continuation of application No. PCT/NL2017/050522, filed on Aug. 3, 2017.

(30) Foreign Application Priority Data

Aug. 3, 2016    (NL) ........................................ 2017277
Aug. 3, 2016    (NL) ........................................ 2017278

(Continued)

(51) Int. Cl.
B65D 85/80        (2006.01)
A23F 5/20         (2006.01)
(Continued)

(52) U.S. Cl.
CPC ............... *A47J 31/407* (2013.01); *A23F 5/26* (2013.01); *A47J 31/0647* (2013.01); (Continued)

(58) Field of Classification Search
CPC .............. B65D 85/8043; B65D 85/804; B65D 85/8046; A47J 31/407; A47J 31/468; (Continued)

(56) References Cited

U.S. PATENT DOCUMENTS 5,242,702 A * 9/1993 Fond .................... A47J 31/0673
426/433
8,327,754 B2 12/2012 Kirschner
(Continued)

FOREIGN PATENT DOCUMENTS

CN        103829804 A      6/2014
CN        104271469        1/2015
(Continued)

OTHER PUBLICATIONS

"The Caffeine House." Feb. 14, 2015. <https://thecaffeinehouse.tumblr.com/post/111040588004/how-to-make-a-dppio-espresso-doppio-in-italian>. Access Apr. 5, 2022. (Year: 2015).*

(Continued)

*Primary Examiner* — Ericson M Lachica
(74) *Attorney, Agent, or Firm* — Fitch, Even, Tabin & Flannery LLP

(57)        ABSTRACT

A capsule, a system and a use of the system for preparing double beverages like a double espresso, a double lungo and a double ristretto are provided. With the capsule, system and use, a high quality double espresso, double lungo and double ristretto can be brewed in an on demand apparatus. The capsule has a shape and configuration which is easily acceptable for the average user whereas the brew which is obtainable with the capsule meets high quality standards. To (Continued)

that effect, the capsule has a frusto-conical capsule body with a radial flange at one end, a foil lid closing off the body and connected to the flange, and a coffee bed which is accommodated in the internal space bounded by the capsule body and the foil lid and which has a weight of 9-13 g and a (height)/(maximum width) ratio within the range of 0.9-1.2.

35 Claims, 37 Drawing Sheets

(30) Foreign Application Priority Data

| Aug. 3, 2016 | (NL) | ..................................... | 2017279 |
| Aug. 3, 2016 | (NL) | ..................................... | 2017280 |
| Aug. 3, 2016 | (NL) | ..................................... | 2017281 |
| Aug. 3, 2016 | (NL) | ..................................... | 2017282 |
| Aug. 3, 2016 | (NL) | ..................................... | 2017283 |
| Aug. 3, 2016 | (NL) | ..................................... | 2017284 |
| Aug. 3, 2016 | (NL) | ..................................... | 2017285 |
| Aug. 3, 2016 | (NL) | ..................................... | 2017286 |
| Jul. 10, 2017 | (NL) | ..................................... | 2019216 |
| Jul. 10, 2017 | (NL) | ..................................... | 2019218 |

(51) Int. Cl.

| | |
| --- | --- |
| A23F 5/26 | (2006.01) |
| A47J 31/00 | (2006.01) |
| A47J 31/06 | (2006.01) |
| A47J 31/36 | (2006.01) |
| A47J 31/40 | (2006.01) |
| A47J 31/44 | (2006.01) |
| A47J 31/46 | (2006.01) |
| A47J 31/52 | (2006.01) |
| B65D 85/804 | (2006.01) |

(52) U.S. Cl.
CPC ....... *A47J 31/3623* (2013.01); *A47J 31/3628* (2013.01); *A47J 31/3633* (2013.01); *A47J 31/3638* (2013.01); *A47J 31/3695* (2013.01); *A47J 31/4403* (2013.01); *A47J 31/468* (2018.08); *A47J 31/52* (2013.01); *B65D 85/8043* (2013.01)

(58) Field of Classification Search
CPC ...... A47J 31/52; A47J 31/0647; A47J 31/064; A47J 31/36; A47J 31/3623; A47J 31/3628; A47J 31/3633; A47J 31/3638; A47J 31/3695; A47J 31/4403; A47J 31/5255; A23F 5/26
See application file for complete search history.

(56) References Cited

U.S. PATENT DOCUMENTS

| | | | | |
| --- | --- | --- | --- | --- |
| 2003/0217643 A1* | 11/2003 | Masek | ............... | B65D 85/8043 |
| | | | | 99/279 |
| 2006/0219098 A1* | 10/2006 | Mandralis | .......... | B65D 85/8043 |
| | | | | 99/279 |
| 2008/0028946 A1* | 2/2008 | Kirschner | ............ | B65D 85/804 |
| | | | | 99/287 |
| 2008/0038441 A1* | 2/2008 | Kirschner | ............. | A47J 31/085 |
| | | | | 426/594 |
| 2009/0098253 A1* | 4/2009 | Diaz Blanco | ...... | B65D 85/8043 |
| | | | | 426/82 |
| 2009/0211458 A1* | 8/2009 | Denisart | ............ | B65D 85/8043 |
| | | | | 99/300 |
| 2009/0282987 A1* | 11/2009 | MacMahon | ........ | B65D 85/8046 |
| | | | | 99/302 R |

| | | | | |
| --- | --- | --- | --- | --- |
| 2009/0324791 A1* | 12/2009 | Ohresser | ............. | A47J 31/0673 |
| | | | | 426/433 |
| 2010/0239734 A1* | 9/2010 | Yoakim | ................... | A47J 31/22 |
| | | | | 99/302 C |
| 2010/0288131 A1* | 11/2010 | Kilber | ................. | A47J 31/0673 |
| | | | | 99/295 |
| 2011/0033580 A1* | 2/2011 | Biesheuvel | ........ | A47J 31/3695 |
| | | | | 426/77 |
| 2011/0189362 A1* | 8/2011 | Denisart | ................. | A47J 31/22 |
| | | | | 426/433 |
| 2011/0226343 A1* | 9/2011 | Novak | ............... | B01F 3/04808 |
| | | | | 137/12.5 |
| 2011/0259779 A1* | 10/2011 | Moutty | ................. | A47J 31/407 |
| | | | | 206/524.1 |
| 2011/0262601 A1* | 10/2011 | Manser | .................. | A23L 33/40 |
| | | | | 426/431 |
| 2011/0315021 A1* | 12/2011 | Eichler | ............. | B65D 85/8046 |
| | | | | 99/295 |
| 2011/0315711 A1* | 12/2011 | Hecht | ................. | B67D 1/0895 |
| | | | | 222/144.5 |
| 2012/0055343 A1* | 3/2012 | Remo | ................. | A47J 31/3614 |
| | | | | 99/289 P |
| 2012/0121765 A1* | 5/2012 | Kamerbeek | .......... | A47J 31/407 |
| | | | | 426/77 |
| 2012/0231126 A1* | 9/2012 | Lo Faro | .................... | A23F 3/18 |
| | | | | 426/115 |
| 2012/0240779 A1 | 9/2012 | Perentes | | |
| 2012/0251669 A1 | 10/2012 | Kamerbeek | | |
| 2012/0251670 A1* | 10/2012 | Kamerbeek | ........ | A47J 31/0673 |
| | | | | 426/77 |
| 2012/0251677 A1* | 10/2012 | Yoakim | .................. | A47J 31/22 |
| | | | | 426/112 |
| 2012/0301581 A1* | 11/2012 | Abegglen | ......... | B65D 85/8043 |
| | | | | 426/112 |
| 2012/0308691 A1* | 12/2012 | Alvarez | ............. | A47J 31/0642 |
| | | | | 426/433 |
| 2012/0328739 A1* | 12/2012 | Nocera | ............. | A47J 31/3685 |
| | | | | 426/77 |
| 2012/0328744 A1 | 12/2012 | Nocera | | |
| 2013/0129885 A1* | 5/2013 | Doglioni Majer | .... | A47J 31/368 |
| | | | | 426/431 |
| 2013/0189405 A1* | 7/2013 | Filliol | .................. | A47J 31/521 |
| | | | | 99/287 |
| 2013/0220138 A1 | 8/2013 | Deuber | | |
| 2013/0312619 A1* | 11/2013 | Spiegel | ............... | A47J 31/3623 |
| | | | | 99/295 |
| 2013/0323366 A1* | 12/2013 | Gerbaulet | ............... | A47J 31/22 |
| | | | | 426/77 |
| 2013/0337119 A1* | 12/2013 | Hoog | ......................... | A23F 3/18 |
| | | | | 345/173 |
| 2013/0344205 A1* | 12/2013 | Oh | ...................... | A47J 31/0673 |
| | | | | 426/433 |
| 2014/0037803 A1* | 2/2014 | Hansen | ............... | A47J 31/0642 |
| | | | | 426/115 |
| 2014/0053734 A1 | 2/2014 | Santi | | |
| 2014/0076167 A1* | 3/2014 | Boggavarapu | .......... | A47J 31/42 |
| | | | | 99/286 |
| 2014/0141128 A1* | 5/2014 | Trombetta | .............. | B65B 55/24 |
| | | | | 426/77 |
| 2014/0305314 A1* | 10/2014 | Perentes | ............ | B65D 85/8049 |
| | | | | 426/115 |
| 2014/0338541 A1* | 11/2014 | Jaccard | ................... | A47J 31/36 |
| | | | | 99/291 |
| 2014/0345468 A1* | 11/2014 | Talon | ....................... | B65D 1/16 |
| | | | | 99/282 |
| 2014/0356501 A1* | 12/2014 | Juris | ....................... | A23F 5/265 |
| | | | | 426/433 |
| 2014/0373723 A1* | 12/2014 | Vestreli | .................. | A47J 31/52 |
| | | | | 99/285 |
| 2015/0017293 A1* | 1/2015 | Carr | ...................... | A47J 31/3623 |
| | | | | 426/232 |
| 2015/0059587 A1 | 3/2015 | Colleoni | | |
| 2015/0082989 A1* | 3/2015 | Besson | .............. | G06F 3/04842 |
| | | | | 99/280 |
| 2015/0132445 A1* | 5/2015 | Perentes | ............ | B65D 85/8052 |
| | | | | 426/112 |

(56) References Cited

U.S. PATENT DOCUMENTS

| | | | | |
|---|---|---|---|---|
| 2015/0175347 | A1* | 6/2015 | Empl .................... | B65B 25/001 |
| | | | | 426/433 |
| 2015/0201791 | A1* | 7/2015 | Tinkler ............... | A47J 31/3695 |
| | | | | 426/431 |
| 2015/0216353 | A1* | 8/2015 | Polti ................... | A47J 31/5253 |
| | | | | 426/433 |
| 2015/0239652 | A1* | 8/2015 | Trombetta .............. | A23F 5/243 |
| | | | | 426/594 |
| 2015/0257580 | A1* | 9/2015 | Crarer ................ | A47J 31/3638 |
| | | | | 99/295 |
| 2015/0272375 | A1 | 10/2015 | Flick et al. | |
| 2015/0320254 | A1* | 11/2015 | Perentes ........... | B65D 85/8058 |
| | | | | 426/232 |
| 2015/0342394 | A1 | 12/2015 | Bonacci et al. | |
| 2015/0352044 | A1* | 12/2015 | Benson ................ | A61J 1/1443 |
| | | | | 206/205 |
| 2015/0359374 | A1* | 12/2015 | Anthony ............... | A47J 31/002 |
| | | | | 426/433 |
| 2015/0359381 | A1* | 12/2015 | Anthony ................ | A47J 31/56 |
| | | | | 426/433 |
| 2016/0001968 | A1* | 1/2016 | Kruger .............. | B65D 85/8043 |
| | | | | 426/115 |
| 2016/0045060 | A1* | 2/2016 | Flick ........................ | G06K 7/01 |
| | | | | 99/295 |
| 2016/0055599 | A1* | 2/2016 | Illy .................... | G06Q 30/0635 |
| | | | | 705/15 |
| 2016/0068336 | A1* | 3/2016 | Biesheuvel .......... | A47J 31/407 |
| | | | | 426/115 |
| 2016/0075506 | A1* | 3/2016 | Chapman ................ | A47J 31/36 |
| | | | | 426/112 |
| 2016/0145037 | A1* | 5/2016 | Trombley .............. | A61K 45/06 |
| | | | | 206/438 |
| 2016/0150907 | A1 | 6/2016 | Bolognese et al. | |
| 2016/0198732 | A1* | 7/2016 | Charles .................... | A23F 5/40 |
| | | | | 426/115 |
| 2016/0242594 | A1* | 8/2016 | Empl ...................... | A47J 31/60 |
| 2016/0257488 | A1* | 9/2016 | de Graaff ............ | A47J 31/0668 |
| 2016/0338376 | A1* | 11/2016 | Kelly ...................... | A47J 31/42 |
| 2016/0360919 | A1* | 12/2016 | Burrows ............. | A47J 31/3628 |
| 2017/0086471 | A1* | 3/2017 | Eppler ...................... | A23F 3/18 |
| 2017/0121050 | A1* | 5/2017 | Foster ............... | B65D 21/0209 |
| 2017/0174417 | A1* | 6/2017 | Nordqvist .......... | B65D 85/8043 |
| 2017/0347825 | A1* | 12/2017 | Walter ............... | A47J 31/469 |
| 2018/0170664 | A1* | 6/2018 | Kruger ............... | B65D 85/8046 |

FOREIGN PATENT DOCUMENTS

| | | |
|---|---|---|
| CN | 104854001 | 8/2015 |
| EP | 1 208 782 A1 | 5/2002 |
| EP | 2384996 A1 | 11/2011 |
| EP | 2470053 | 7/2012 |
| EP | 2 833 766 B1 | 2/2015 |
| KR | 1020130112696 | 10/2013 |
| WO | 2009112291 | 9/2009 |
| WO | 2011023711 | 3/2011 |
| WO | WO-2011/042401 A2 | 4/2011 |
| WO | WO-2011/069829 A1 | 6/2011 |
| WO | 2012126971 | 9/2012 |
| WO | WO-2013/079814 A1 | 6/2013 |
| WO | 2013167434 | 11/2013 |
| WO | WO-2014/056730 A1 | 4/2014 |
| WO | WO-2014/056862 A1 | 4/2014 |
| WO | 2014090965 | 6/2014 |
| WO | 2014097039 | 6/2014 |
| WO | WO-2015/082662 A1 | 6/2015 |
| WO | WO-2015/109052 A1 | 7/2015 |
| WO | WO-2015/155145 A1 | 10/2015 |
| WO | WO-2015144356 A1 * | 10/2015 .......... A47J 31/0673 |
| WO | WO-2015/173123 A1 | 11/2015 |
| WO | WO-2015/193744 A1 | 12/2015 |

OTHER PUBLICATIONS

Korean Notice of Allowance dated Feb. 5, 2024, Patent Application No. 520120316723 with English translation (10 pgs.).

International Search Report and Written Opinion, PCT/NL2017/050509, 11 pages (Jun. 5, 2018).

International Search Report and Written Opinion, PCT/NL2017/050510, 10 pages (Nov. 20, 2017).

International Search Report and Written Opinion, PCT/NL2017/050511, 9 pages (Nov. 30, 2017).

International Search Report and Written Opinion, PCT/NL2017/050512, 10 pages (Nov. 27, 2017).

International Search Report and Written Opinion, PCT/NL2017/050513, 8 pages (Dec. 22, 2017).

International Search Report and Written Opinion, PCT/NL2017/050514, 8 pages (Nov. 23, 2017).

International Search Report and Written Opinion, PCT/NL2017/050515, 10 pages (Nov. 27, 2017).

International Search Report and Written Opinion, PCT/NL2017/050519, 11 pages (Nov. 29, 2017).

International Search Report and Written Opinion, PCT/NL2017/050521, 8 pages (Dec. 4, 2017).

International Search Report and Written Opinion, PCT/NL2017/050522, 17 pages (Jan. 17, 2018).

* cited by examiner

Fig. 1
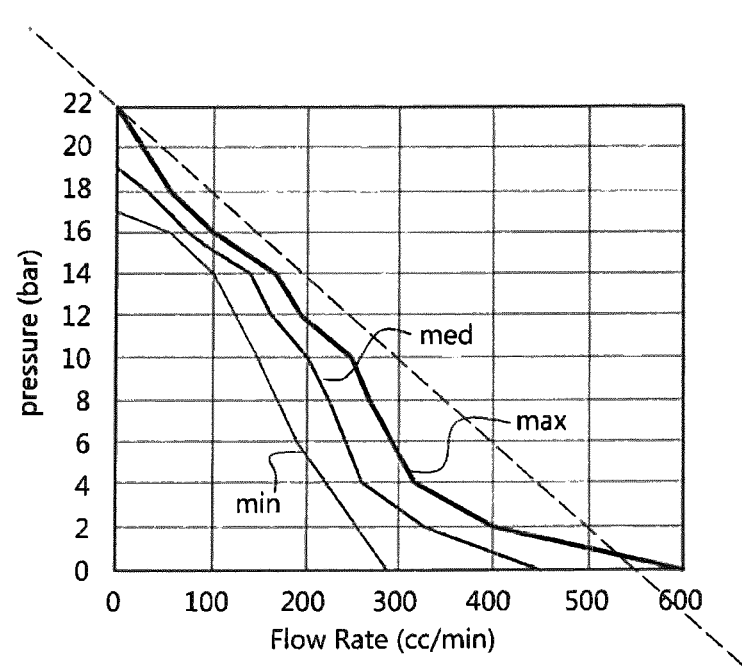
Fig. 2
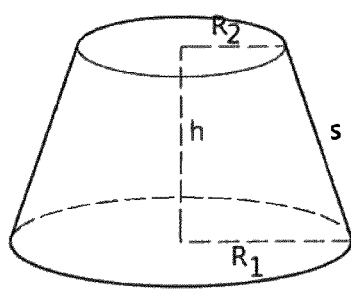
Fig. 3 - Table 1
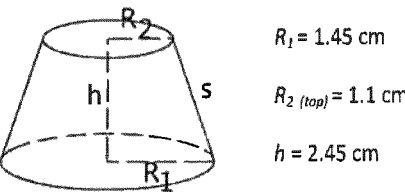
$R_1 = 1.45$ cm
$R_{2\ (top)} = 1.1$ cm
$h = 2.45$ cm

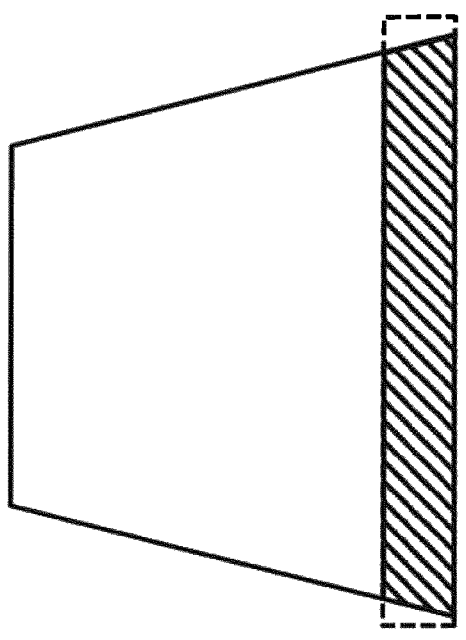
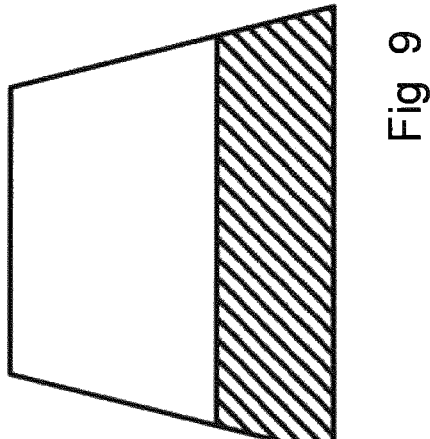
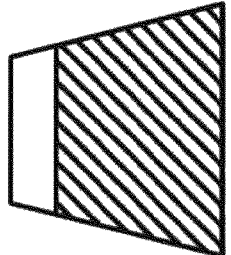
Fig 9

Normalized comparison Espresso aroma

Espresso 1    Espresso 2

| sample ID | Sulfur compounds ppm | Aldehydes ppm | Pyrazines ppm | Esters ppm | Acids ppm | Ketones ppm | Phenols ppm | Alcohols ppm | Miscellaneous Nitrogen compounds ppm | Total ppm |
|---|---|---|---|---|---|---|---|---|---|---|
| Espresso 1 | 9.86 | 1748.35 | 650.34 | 139.50 | 25.53 | 241.97 | 124.83 | 4491.42 | 266.71 | 7698.51 |
| Espresso 1 | 9.45 | 1795.96 | 662.50 | 135.45 | 44.76 | 241.75 | 125.01 | 4591.31 | 262.32 | 7868.51 |
| Espresso 1 | 9.19 | 1636.16 | 646.32 | 121.94 | 35.18 | 214.16 | 113.66 | 4100.15 | 254.42 | 7136.18 |
| Espresso 2 | 7.57 | 1692.44 | 626.96 | 120.59 | 33.86 | 216.01 | 107.36 | 4563.04 | 255.45 | 7622.28 |
| Espresso 2 | 10.93 | 1799.71 | 723.21 | 149.46 | 31.53 | 242.33 | 128.11 | 4370.16 | 296.12 | 7749.56 |
| Espresso 2 | 8.44 | 1607.21 | 597.67 | 124.44 | 36.81 | 196.83 | 107.14 | 4260.65 | 249.61 | 7188.80 |
| ANOVA sign diff. | NO | NO | NO | NO | NO | NO | NO | NO | NO | NO |

Fig. 14A

Normalized comparison Lungo aroma

—◇—Espresso 1  ——Espresso 2

| sample ID | Sulfur compounds | Aldehydes | Pyrazines | Esters | Acids | Ketones | Phenols | Alcohols | Miscellaneous Nitrogen compounds | Total |
|---|---|---|---|---|---|---|---|---|---|---|
| | ppm | ppm | ppm | ppm | ppm | ppm | ppm | ppm | ppm | ppm |
| Lungo 1 | 12.16 | 2139.18 | 595.09 | 112.36 | 144.19 | 227.35 | 155.50 | 4140.55 | 61.34 | 7587.72 |
| Lungo 1 | 13.77 | 2290.74 | 559.52 | 129.84 | 168.16 | 257.35 | 158.68 | 4654.26 | 60.26 | 8392.78 |
| Lungo 1 | 13.05 | 2276.86 | 553.97 | 117.31 | 155.88 | 262.34 | 153.00 | 4186.04 | 64.28 | 7879.94 |
| Lungo 2 | 11.14 | 2228.53 | 528.98 | 108.22 | 153.39 | 241.68 | 131.60 | 3877.62 | 66.36 | 7466.52 |
| Lungo 2 | 12.37 | 2157.35 | 608.80 | 111.33 | 142.14 | 232.86 | 138.03 | 3970.58 | 69.10 | 7532.53 |
| Lungo 2 | 13.37 | 2087.06 | 654.97 | 107.15 | 142.99 | 220.55 | 143.45 | 3875.96 | 64.66 | 7320.16 |
| ANOVA sign diff. | NO | NO | NO | NO | NO | NO | YES | NO | NO | NO |

Fig. 14B

Results one way analysis of variance Organic acids.

| SampleID | Tartaric Acid g/kg | Citric Acid g/kg | Malic Acid g/kg | Quinic Acid g/kg | Glycolic Acid g/kg | Formic Acid g/kg | Lactic Acid g/kg | Fumaric Acid g/kg | Shikimic Acid g/kg | Succinic Acid g/kg | Acetic Acid g/kg | Propionic Acid g/kg |
|---|---|---|---|---|---|---|---|---|---|---|---|---|
| espresso 1 | 0 | 21.5 | 6.1 | 45.3 | 8.0 | 7.8 | 3.8 | 0.7 | 6.1 | 0.5 | 19.3 | 0 |
| espresso 1 | 0 | 20.4 | 5.6 | 42.1 | 7.5 | 7.1 | 3.1 | 0.7 | 5.9 | 0.5 | 17.1 | 0 |
| espresso 1 | 0 | 20.7 | 5.9 | 43.8 | 7.8 | 7.1 | 3.3 | 0.6 | 5.6 | 0.5 | 18.9 | 0 |
| espresso 2 | 0 | 20.7 | 6.1 | 44.5 | 8.2 | 7.2 | 3.3 | 0.7 | 5.4 | 0.5 | 18.4 | 0 |
| espresso 2 | 0 | 20.9 | 5.8 | 43.8 | 8.0 | 7.6 | 3.5 | 0.9 | 5.4 | 0.3 | 18.7 | 0 |
| espresso 2 | 0 | 21.0 | 6.0 | 44.9 | 8.4 | 7.7 | 3.4 | 1.1 | 5.9 | 0.5 | 20.1 | 0 |
| ANOVA | No | No | No | No | No | No | No | No | No | No | No | No |

| SampleID | Tartaric Acid g/kg | Citric Acid g/kg | Malic Acid g/kg | Quinic Acid g/kg | Glycolic Acid g/kg | Formic Acid g/kg | Lactic Acid g/kg | Fumaric Acid g/kg | Shikimic Acid g/kg | Succinic Acid g/kg | Acetic Acid g/kg | Propionic Acid g/kg |
|---|---|---|---|---|---|---|---|---|---|---|---|---|
| lungo 1 | 0 | 21.6 | 7.3 | 40.0 | 6.6 | 7.8 | 3.0 | 0.6 | 2.5 | 0.4 | 17.8 | 0 |
| lungo 1 | 0 | 21.9 | 7.4 | 41.4 | 6.8 | 8.0 | 3.0 | 0.6 | 2.7 | 0.5 | 18.1 | 0 |
| lungo 1 | 0 | 21.5 | 7.2 | 39.6 | 6.6 | 7.9 | 3.2 | 0.5 | 2.3 | 0.3 | 17.7 | 0 |
| lungo 2 | 0 | 21.2 | 7.1 | 39.2 | 6.3 | 7.6 | 2.9 | 0.5 | 2.5 | 0.4 | 17.3 | 0 |
| lungo 2 | 0 | 21.2 | 7.1 | 39.1 | 6.5 | 7.5 | 2.9 | 0.5 | 2.5 | 0.4 | 17.3 | 0 |
| lungo 2 | 0 | 21.3 | 7.1 | 39.0 | 6.5 | 7.6 | 2.8 | 0.5 | 2.5 | 0.4 | 17.4 | 0 |
| ANOVA | No | YES | YES | No | No | YES | No | No | No | No | YES | No |

Fig. 15

Results one way analysis of variance of pH/Ta, DMA and Caffeine

| SampleID | Dry Matter % | pH | Ta 6 ml NaOH | Ta 8 ml NaOH | Caffeine % | Caffeine % |
|---|---|---|---|---|---|---|
| espresso 1 | 3.16 | 5.41 | 5.2 | 15.8 | 5.12 | 0.162 |
| espresso 1 | 3.33 | 5.40 | 5.8 | 16.8 | 5.15 | 0.172 |
| espresso 1 | 3.31 | 5.40 | 5.7 | 16.5 | 5.13 | 0.170 |
| espresso 2 | 3.37 | 5.40 | 5.5 | 16.1 | 4.84 | 0.163 |
| espresso 2 | 3.23 | 5.39 | 5.4 | 15.9 | 4.73 | 0.153 |
| espresso 2 | 2.88 | 5.40 | 5.6 | 16.6 | 4.53 | 0.130 |
| ANOVA | No | No | No | No | YES | No |
| | | | | | *dry matter base | in Brew |

| SampleID | Dry Matter % | pH | Ta 6 ml NaOH | Ta 8 ml NaOH | Caffeine % | Caffeine % |
|---|---|---|---|---|---|---|
| lungo 1 | 1.44 | 5.22 | 3.4 | 8.1 | 4.64 | 0.067 |
| lungo 1 | 1.33 | 5.22 | 3.3 | 8.0 | 4.76 | 0.063 |
| lungo 1 | 1.46 | 5.22 | 3.3 | 8.1 | 4.67 | 0.068 |
| lungo 2 | 1.39 | 5.24 | 3.1 | 7.8 | 4.55 | 0.063 |
| lungo 2 | 1.38 | 5.23 | 3.0 | 7.6 | 4.43 | 0.061 |
| lungo 2 | 1.44 | 5.24 | 3.0 | 7.7 | 4.54 | 0.065 |
| ANOVA | No | YES | YES | YES | YES | No |
| | | | | | *dry matter base | in Brew |

Fig. 16

Results one way analysis of variance Bitterlactones and Chlorogenic acids

| SampleID | Chlorogenic acids 5-CQA mg/kg | 3-CQA mg/kg | 4-CQA mg/kg | Bitterlactones Compound no 1 mg/kg | Compound no 2 mg/kg | Compound no 3 mg/kg | Compound no 4 mg/kg | Compound no 5 mg/kg | total Bitterlactones | Ratio Bitterlact. total/Acetic acid | Bitterlact. total/Quinic acid | Bitterlact. total/Chlor acid |
|---|---|---|---|---|---|---|---|---|---|---|---|---|
| espresso 1 | 4538 | 8019 | 6237 | 503 | 2138 | 310 | 190 | 1339 | 4449 | 230 | 98 | 207 |
| espresso 1 | 4751 | 8204 | 6384 | 583 | 2243 | 366 | 225 | 1435 | 4853 | 284 | 115 | 238 |
| espresso 1 | 9069 | 15789 | 12136 | 876 | 4578 | 784 | 380 | 2737 | 9341 | 493 | 233 | 451 |
| espresso 2 | 4852 | 8463 | 6427 | 380 | 2193 | 353 | 196 | 1356 | 4478 | 243 | 101 | 216 |
| espresso 2 | 5022 | 8765 | 6632 | 418 | 2158 | 350 | 211 | 1337 | 4474 | 239 | 102 | 214 |
| espresso 2 | 5156 | 8993 | 6774 | 430 | 2160 | 358 | 194 | 1361 | 4483 | 223 | 100 | 214 |
| ANOVA | No | No | No | No | No | No | No | No | No | No | No | No |
| | | | | | Outlier | | | | | | | |

| SampleID | Chlorogenic acids 5-CQA mg/kg | 3-CQA mg/kg | 4-CQA mg/kg | Bitterlactones Compound no 1 mg/kg | Compound no 2 mg/kg | Compound no 3 mg/kg | Compound no 4 mg/kg | Compound no 5 mg/kg | total Bitterlactones | Ratio Bitterlact. total/Acetic acid | Bitterlact. total/Quinic acid | Bitterlact. total/Chlor acid |
|---|---|---|---|---|---|---|---|---|---|---|---|---|
| lungo 1 | 8778 | 17132 | 11806 | 507 | 4090 | 715 | 333 | 2792 | 8438 | 475 | 211 | 391 |
| lungo 1 | 9383 | 17323 | 12060 | 474 | 4538 | 694 | 361 | 2805 | 8301 | 458 | 200 | 379 |
| lungo 1 | 9418 | 17986 | 12397 | 527 | 4342 | 767 | 377 | 2979 | 8993 | 509 | 227 | 418 |
| lungo 2 | 9207 | 17287 | 11799 | 597 | 4187 | 748 | 281 | 2957 | 9770 | 538 | 224 | 415 |
| lungo 2 | 8761 | 16667 | 13449 | 529 | 4225 | 746 | 377 | 2942 | 8819 | 509 | 225 | 417 |
| lungo 2 | 8701 | 16198 | 13394 | 674 | 3861 | 722 | 368 | 2778 | 8403 | 484 | 216 | 395 |
| ANOVA | No | No | No | No | No | No | No | No | No | No | No | No |

Fig. 17

Results one way analysis of variance Free and Total Carbohydrates

| SampleID | Free carbohydrates | | | | | | | Total carbohydrates | | | | | | |
| --- | --- | --- | --- | --- | --- | --- | --- | --- | --- | --- | --- | --- | --- | --- |
| | Arabinose %m/m | Galactose %m/m | Glucose %m/m | Sucrose %m/m | Xylose %m/m | Mannose %m/m | Fructose %m/m | Arabinose %m/m | Galactose %m/m | Glucose %m/m | Sucrose %m/m | Xylose %m/m | Mannose %m/m | Fructose %m/m |
| espresso 1 | 0 | 0 | 0 | 0.3 | 0 | 0 | 0 | 0 | 7.0 | 0.9 | 0 | 0 | 13.0 | 0 |
| espresso 1 | 0 | 0 | 0 | 0.3 | 0 | 0 | 0 | 0 | 5.4 | 0.9 | 0 | 0 | 10.2 | 0 |
| espresso 1 | 0 | 0 | 0 | 0.3 | 0 | 0 | 0 | 0 | 6.6 | 0.9 | 0 | 0 | 12.7 | 0 |
| espresso 2 | 0 | 0 | 0 | 0.3 | 0 | 0 | 0 | 0 | 6.2 | 0.9 | 0 | 0 | 12.2 | 0 |
| espresso 2 | 0 | 0 | 0 | 0.3 | 0 | 0 | 0 | 0 | 5.3 | 0.6 | 0 | 0 | 9.9 | 0 |
| espresso 2 | 0 | 0 | 0 | 0.3 | 0 | 0 | 0 | 0 | 6.3 | 0.7 | 0 | 0 | 11.8 | 0 |
| ANOVA | No | No | No | No | No | No | No | No | No | No | No | No | No | No |

| SampleID | Free carbohydrates | | | | | | | Total carbohydrates | | | | | | |
| --- | --- | --- | --- | --- | --- | --- | --- | --- | --- | --- | --- | --- | --- | --- |
| | Arabinose %m/m | Galactose %m/m | Glucose %m/m | Sucrose %m/m | Xylose %m/m | Mannose %m/m | Fructose %m/m | Arabinose %m/m | Galactose %m/m | Glucose %m/m | Sucrose %m/m | Xylose %m/m | Mannose %m/m | Fructose %m/m |
| lungo 1 | 0 | 0 | 0 | 0.7 | 0 | 0 | 0 | 0 | 6.3 | 0.7 | 0 | 0 | 9.7 | 0 |
| lungo 1 | 0 | 0 | 0 | 0.8 | 0 | 0 | 0 | 0 | 6.0 | 0.8 | 0 | 0 | 9.8 | 0 |
| lungo 1 | 0 | 0 | 0 | 0.7 | 0 | 0 | 0 | 0 | 6.2 | 0.7 | 0 | 0 | 10.3 | 0 |
| lungo 2 | 0 | 0 | 0 | 0.7 | 0 | 0 | 0 | 0 | 6.5 | 0.7 | 0 | 0 | 10.8 | 0 |
| lungo 2 | 0 | 0 | 0 | 0.7 | 0 | 0 | 0 | 0 | 5.8 | 0.7 | 0 | 0 | 10.1 | 0 |
| lungo 2 | 0 | 0 | 0 | 0.7 | 0 | 0 | 0 | 0 | 6.3 | 0.7 | 0 | 0 | 11.1 | 0 |
| ANOVA | No | No | No | No | No | No | No | No | No | No | No | No | No | No |

CAPSULE, SYSTEM AND USE OF THE SYSTEM FOR PREPARING DOUBLE BEVERAGES LIKE A DOUBLE ESPRESSO, A DOUBLE LUNGO AND A DOUBLE RISTRETTO

CROSS-REFERENCE TO RELATED APPLICATION

This application is a continuation of PCT/NL2017/050522 filed Aug. 3, 2017, which claims the benefit of and priority to Netherlands Patent Application Nos.:

NL 2017277 filed Aug. 3, 2016,
NL 2017278 filed Aug. 3, 2016,
NL 2017279 filed Aug. 3, 2016,
NL 2078280 filed Aug. 3, 2016,
NL 2017281 filed Aug. 3, 2016,
NL 2017282 filed Aug. 3, 2016,
NL 2017283 filed Aug. 3, 2016,
NL 2017284 filed Aug. 3, 2016,
NL 2017285 filed Aug. 3, 2016,
NL 2017286 filed Aug. 3, 2016,
NL 2019216 filed Jul. 10, 2017, and
NL 2019218 filed Jul. 10, 2017,
the entire contents of each of which are hereby incorporated herein by reference.

BACKGROUND

The present invention relates to a capsule for brewing a coffee brew, the capsule including:

a frusto-conical capsule body comprising:
a circumferential side wall extending around a central axis of the cup body;
a bottom wall connected with a first end of the side wall for closing off the first end of the capsule body;
a flange extending radially outwardly from a second end of the circumferential side wall;
wherein the capsule further includes:
a foil lid that is connected with the flange;
a coffee bed of coffee grind that is accommodated within an internal space bounded by the capsule body and the lid, the coffee bed having a maximum coffee bed diameter that corresponds with an inner diameter of the cup body at the second end of the circumferential wall, the internal space having a height defined by the maximum distance between the bottom and a plane in which the second end of the circumferential side wall extends.

Known capsules are referred to as a capsule of the first type and is filled with about 5-6 grams of coffee for the preparation of a single espresso or a single lungo per capsule.

Café style espresso makers are capable of making both single espressos and double espressos, or single lungos and double lungos. Typically a Barrista will double the weight of coffee in the basket to make the double versions.

In recent years home on-demand espresso system which may make espressos and lungos and optionally ristrettos from capsules have become widespread, however as indicated above the standard espresso capsule such as that used in the Nespresso system and now made by several manufacturers are designed to take 5-6 g of coffee and are not capable of taking larger quantities. The volume of a single ristretto brew is typically in the range of 22-28 ml, more preferably approximately 25 ml. The volume of a single espresso brew is typically in the range of 35-60 ml, more preferably approximately 40 ml. The volume of a single lungo brew is typically in the range of 75-115 ml, more preferably approximately 80 ml.

It is desirable to create a system capable of multiple capsules sizes, one for the single beverages and a larger capsule for the double beverages.

The brewer system is described below with reference to FIGS. 21A-28B. The size of the standard/single capsules is assumed given, typical these are frustums of smaller 'top' radius (1.1) cm, a larger 'bottom' radius (1.45 cm) and height (2.45) cm. The capsules have features such as a domed top above the top radius which is pierced in action to create a water inlet and a rim around the bottom radius which acts to seal the capsule in the brewing chamber of the brewer.

The shape and size of the standard capsule single (also referred to as a capsule of the first type or STN capsule) is taken as given. This description concerns the optimal choice of a larger capsule (also referred to as a capsule of the second type), capable of producing doubles, given a series of design and functional constraints.

The first constraint is that the prepared beverages single and double have and acceptably similar quality in terms of flavor, aroma and crema. At the simplest level this requires that the beverages have a 'close enough' strength and yield sufficient not to be judged different by sensory testing. Strength (S) and yield (Y) are defined as percentages as follows. Let M be the mass of all coffee extracted species (molecules, colloids, carbohydrates) into the beverage, let $M_w$ be the mass of water added and $M_{grind}$ be the mass (dry) of grinds in the capsules $$S = \frac{100 * M}{M_{water} + M} \quad Y = \frac{100 * M}{M_{grind}} \quad (1)$$

In practice the strength is measured by drying and weighing residues or by using densitometer (e.g a refractometer) calibrated against drying methods. The skilled man will look for a single larger capsule which during brewing behaves as two identical standard capsules which are used in parallel. Two identical standard capsules which are used in parallel means that the same amount of water flows through these capsules in the same time as would be the case for the use of only one standard capsule. By definition, in that case, a double amount of coffee with the same characteristics as for the single standard capsule is obtained. The skilled man will also realize that the two identical standard capsules could be replaced by a single larger capsule having the same height as the standard capsule and having in a first direction a cross sectional area with a width which is about twice the width of the cross sectional area of the standard capsule and having a cross sectional area in a second direction which is perpendicular to the first direction with a width which is about the same as the cross sectional area of the standard capsule. This capsule is here referred to as the straight forward double capsule (SFD-capsule). In that case the flowrate of the water which is submitted to the SFD-capsule should be doubled and the water should be spread over and flow through the coffee bed of the larger capsule in a similar manner as through the coffee bed of a single standard capsule. This can be realized by a device with sufficient pump capacity and which for example injects the water on two locations on top of the capsule which locations are spaced apart from each other.

SUMMARY

According to the invention the above obvious assumption to provide a SFD-capsule is ignored. In other words, the invention breaks with this prejudice. The invention has as an object to provide an improved larger double capsule (ILD-capsule) other than the SFD-capsule which nevertheless provides a good brewing result. According to the invention the ILD capsule has in addition certain benefits over the SFD-capsule. Thus on balance the ILD-capsule is an improved capsule relative to the SFD-capsule.

The ILD-capsule which is provided according to the invention is a capsule of a second type for brewing a coffee brew, the capsule includes:

a frusto-conical capsule body comprising:
  a circumferential side wall extending around a central axis of the cup body;
  a bottom wall connected with a first end of the side wall for closing off the first end of the capsule body;
  a flange extending radially outwardly from a second end of the circumferential side wall;
wherein the capsule further includes:
  a foil lid that is connected with the flange;
  a coffee bed of coffee grind that is accommodated within an internal space bounded by the capsule body and the lid, the coffee bed having a maximum coffee bed diameter that corresponds with an inner diameter of the cup body at the second end of the circumferential wall, the internal space having a height defined by the maximum distance between the bottom and a plane in which the second end of the circumferential side wall extends,
wherein the weight of the coffee bed is in the range of 9-13 grams and wherein the (height)/(maximum width) ratio of the coffee bed is within the range of 0.9-1.2.

As will be discussed hereinafter the capsule according to the invention still has (contrary to what is expected by the skilled man) good brewing results on the one hand and other benefits on the other hand.

One benefit is the possible use of an appliance which does not provide the same (short) brewing time as for the standard capsule. Thus the requirements of the pump will not be that high. Another benefit is the possible more attractive shape of the ILD-capsule.

The maximum width of the coffee bed mentioned above corresponds with the maximum inner diameter of the cup body.

This can be understood as explained in section I 'Model for the ILD capsule'.

Some possible practical embodiments will subsequently be discussed in section II 'Possible embodiments of the ILD-capsule'.

BRIEF DESCRIPTION OF THE DRAWINGS

FIG. 1 shows a pump characteristic ULka-4.

FIG. 2 shows schematically a capsule having a frustrum shape.

FIG. 3 and table 1 show schematically the dimensions of a standard capsule.

FIG. 9 schematic of capsules with different scale factors filled with the same weight of coffee bed.

FIG. 14A shows a normalized aroma analysis of an averaged double espresso brewed in a DCA capsule (Espresso 2) vs an averaged single espresso brewed in a STN capsule (Espresso 1) in which the values of the STN capsule are normalized to 100%;

FIG. 14B shows a normalized aroma analysis of an averaged double lungo brewed in a DCA capsule (Lungo 2) vs an averaged single lungo brewed in a STN capsule (Lungo 1) in which the values of the STN capsule are normalized to 100%;

FIG. 15 shows data representing one way analysis of organic acid variance in sample single and double espresso and single and double lungo brews.

FIG. 16 is a table relating to the variance of pH/Ta, DMA and Caffeine in which espresso 1 relates to measurements of a single espresso brewed in a STN capsule and espresso 2 relates to measurements of a double espresso brewed in a DCA capsule;

FIG. 17 is a table relating to the variance of Bitterlactones and Chlorogenic acids in which espresso 1 relates to measurements of a single espresso brewed in a STN capsule and espresso 2 relates to measurements of a double espressos brewed in a DCA capsule;

FIG. 18 is a table relating to the variance of free and total carbohydrates in which espresso 1 relates to measurements of a single espresso brewed in a STN capsule and espresso 2 relates to measurements of a double espresso brewed in a DCA capsule;

FIG. 22A shows a perspective side view of an apparatus in half-closed state.

DETAILED DESCRIPTION

Figure 4A:
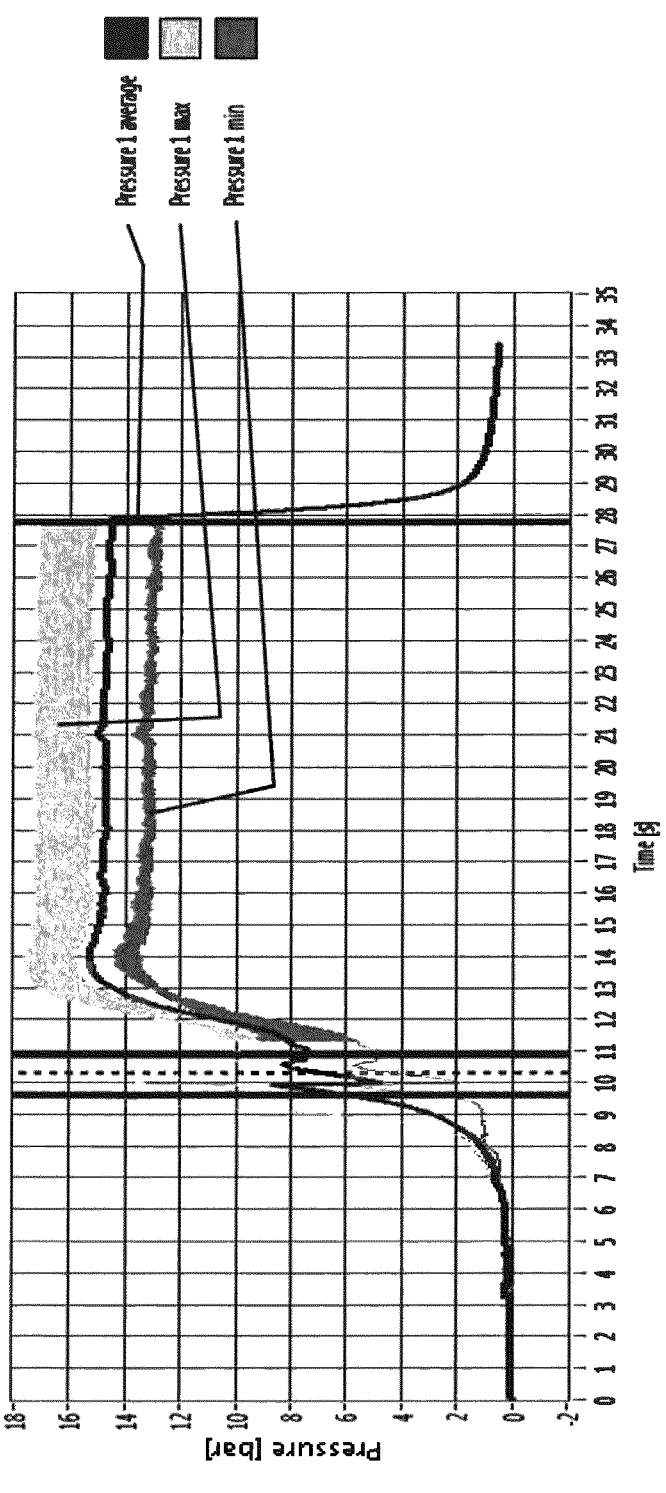
FIG. 4A shows experimental pressure time curves from a capsule with foil lid which ruptures in use.
Figure 4B:
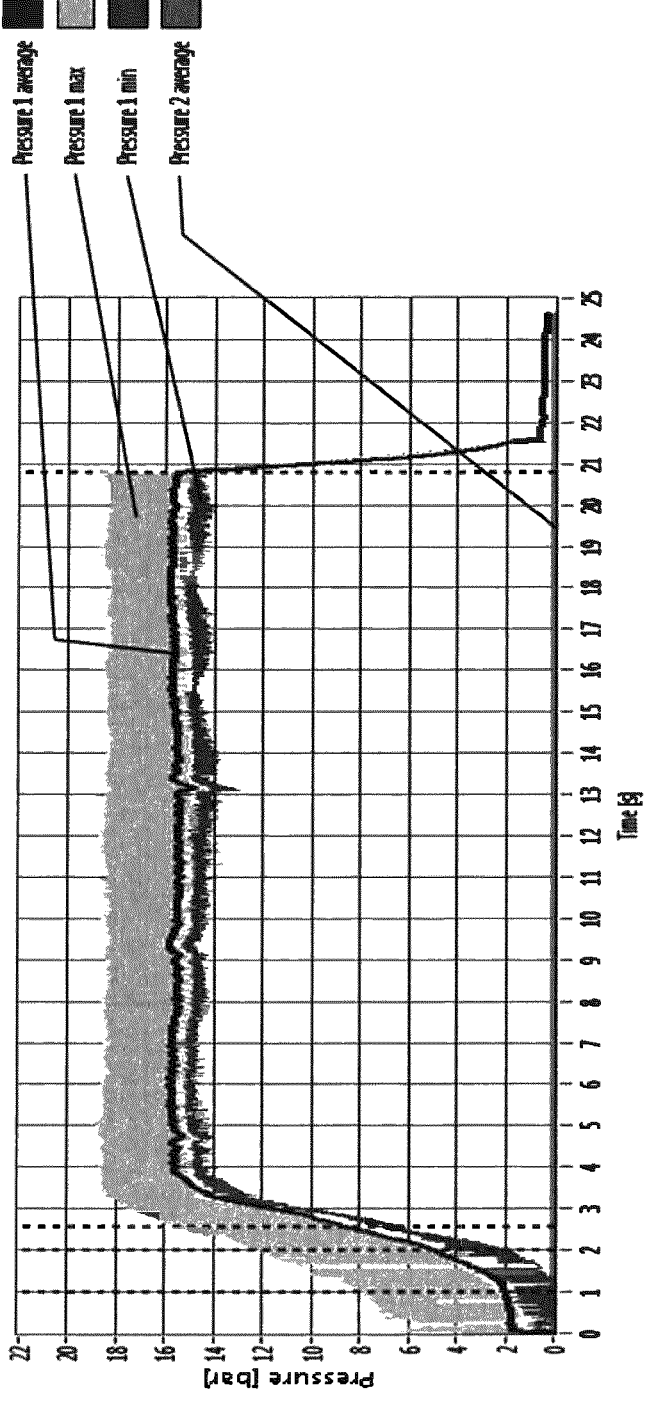
FIG. 4B shows experimental pressure time curves from a capsule with foil lid in the form of a filter which is open and does not rupture in use.
Figure 5A:
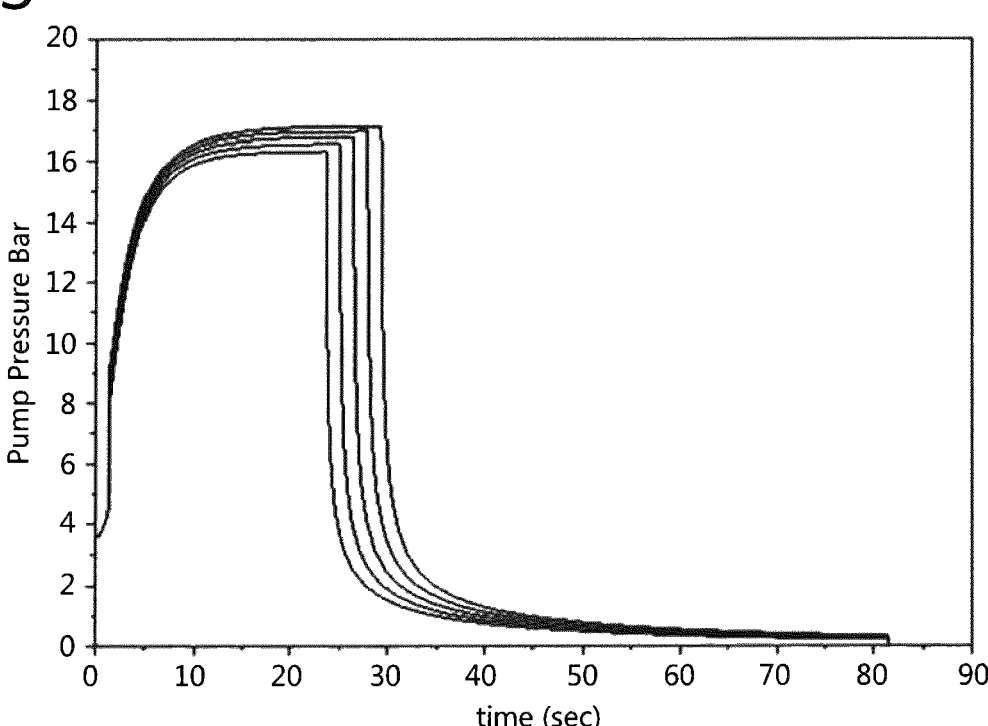
FIG. 5A shows a model pressure-time curve for a simulation of a standard capsule with different resistances.
Figure 5B:
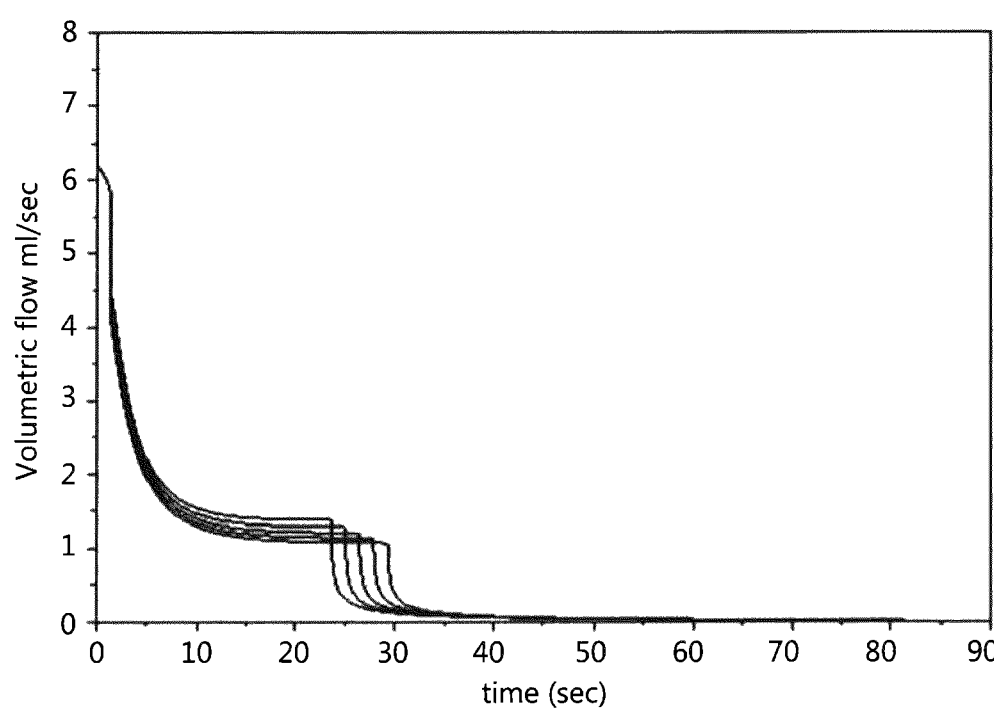
FIG. 5B shows a model flowrate-time curve for a simulation of a standard capsule with different resistances.
Figure 5C:
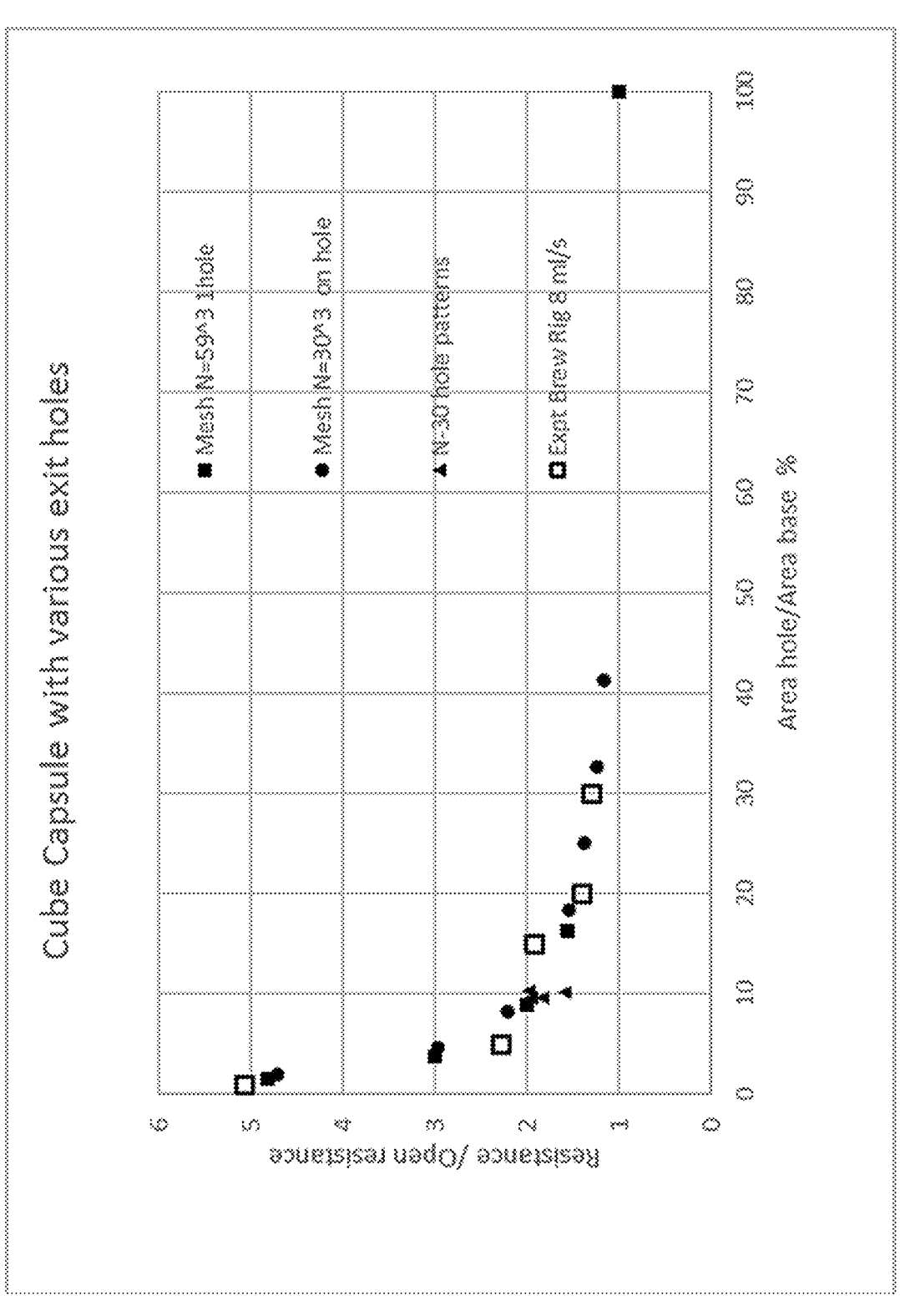
FIG. 5C shows modelling of the exit area effect for a pressure driven flow through a porous bed for a cube shaped bed open at the flow entrance but with different exit areas.
Figure 6A:
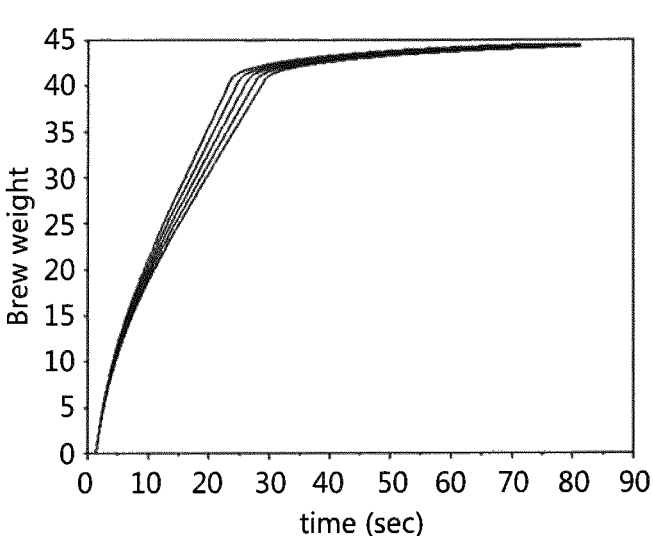
FIG. 6A shows predicted brew weight vs time.
Figure 6B:
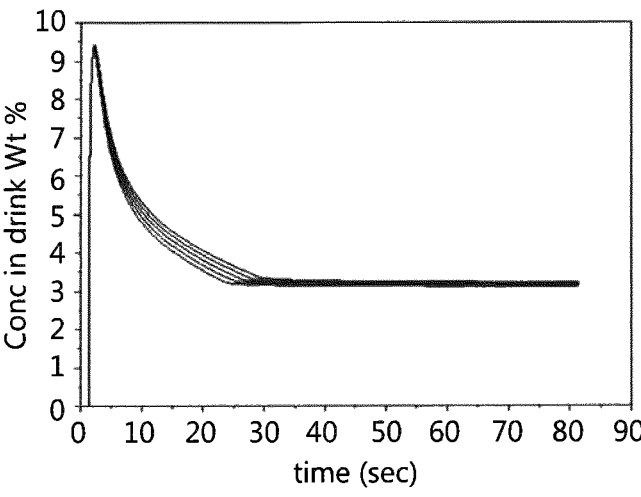
FIG. 6B shows predicted brew strength vs time.
Figure 6C:
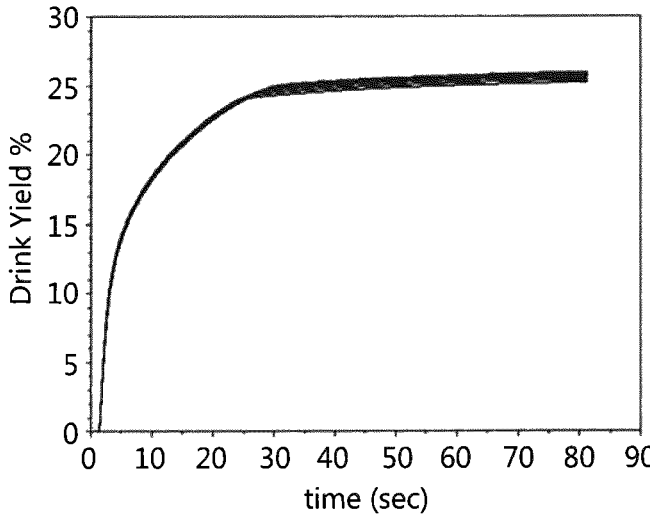
FIG. 6C shows predicted brew yield vs time.
Figure 7A:
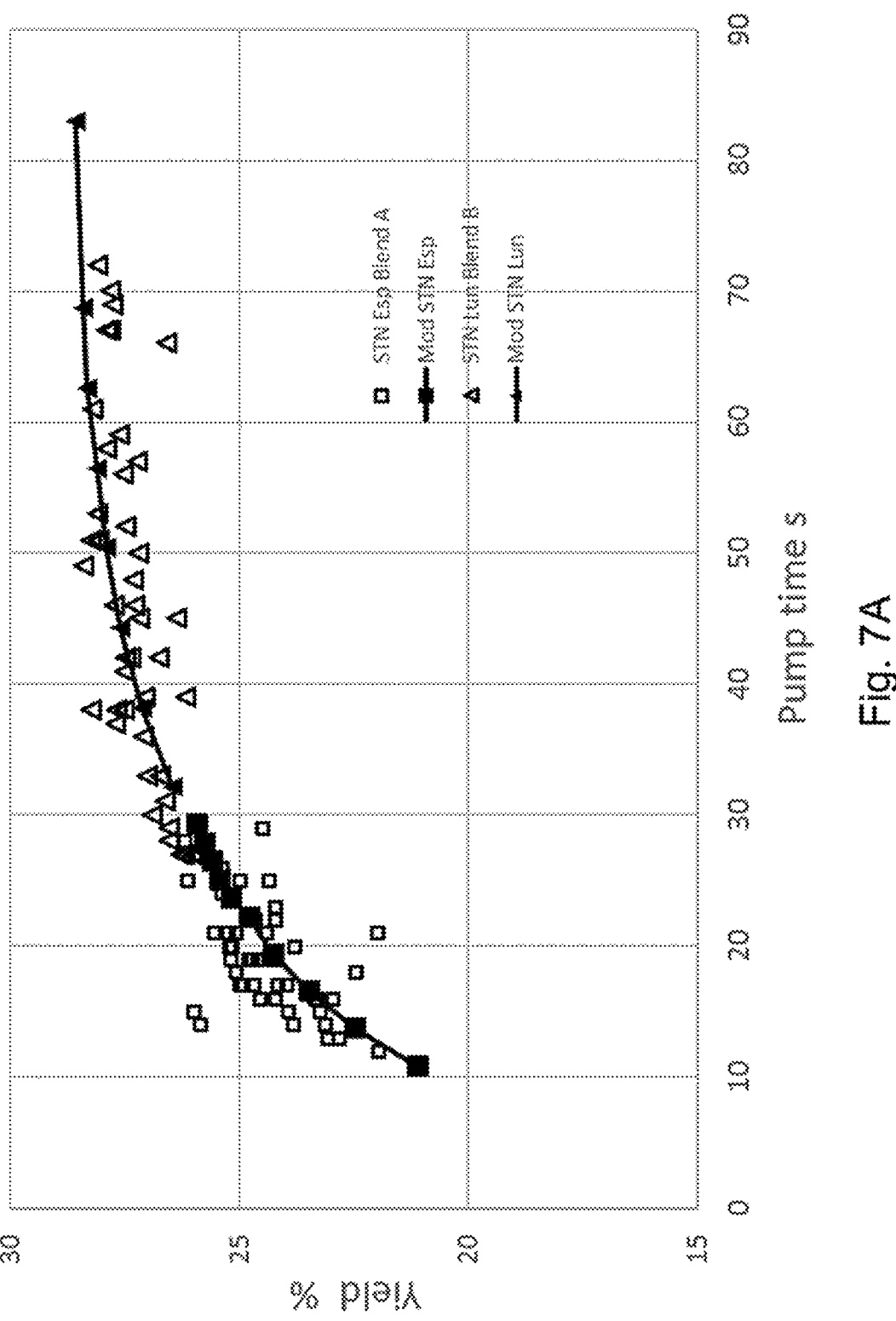
FIG. 7A shows the prediction according to a model of final brew yield for some standard capsules vs pump time (the time at which the pump stops) co-plotted with some experimental data for a standard capsule. In both the model and experiment time is allowed for drip to added to the brew (cf FIGS. 4-5).
Figure 7B:
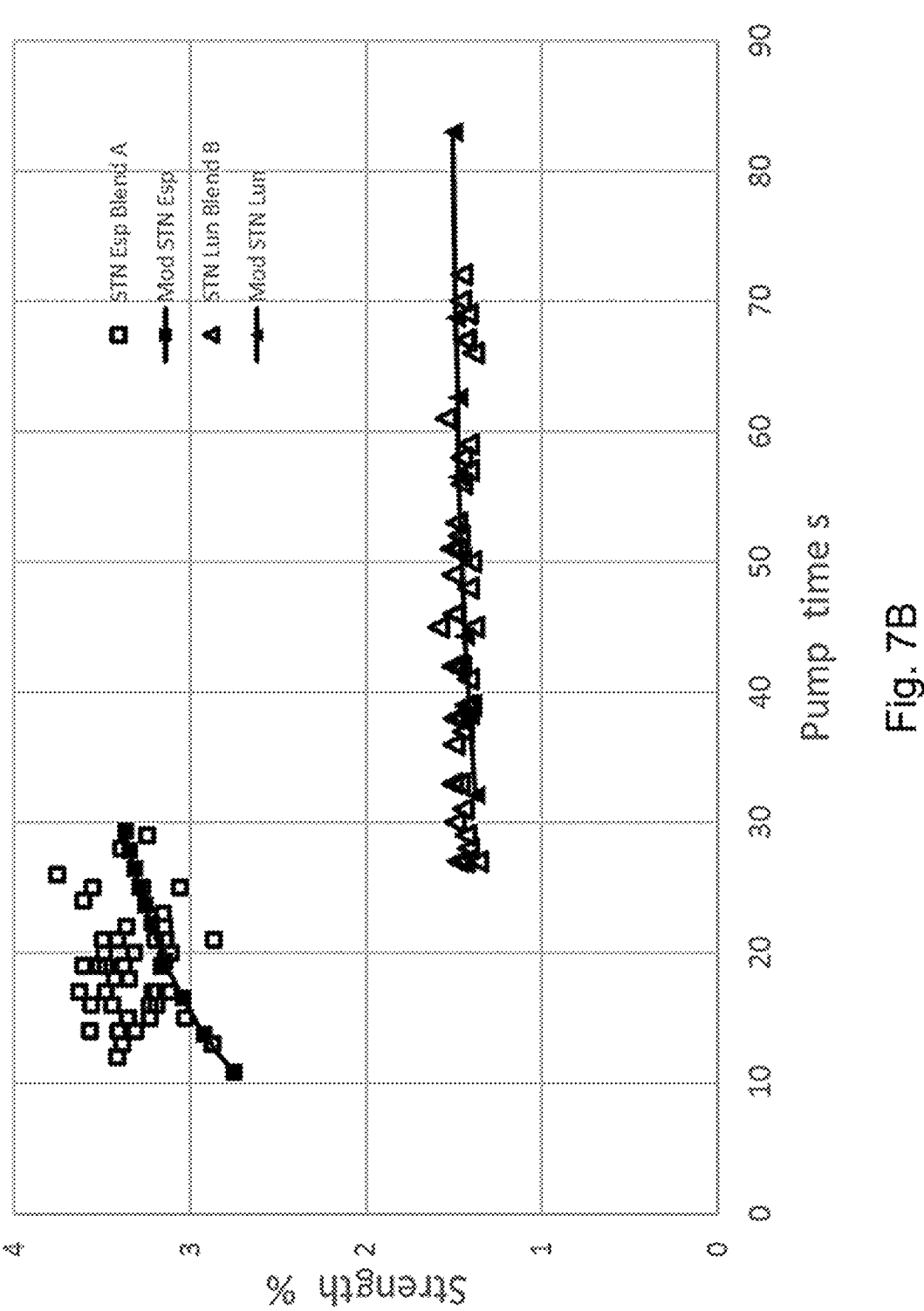
FIG. 7B shows the prediction according to a model of final brew strength for some standard capsules vs pump time co-plotted with some experimental data for a standard capsule.
Figure 8A:
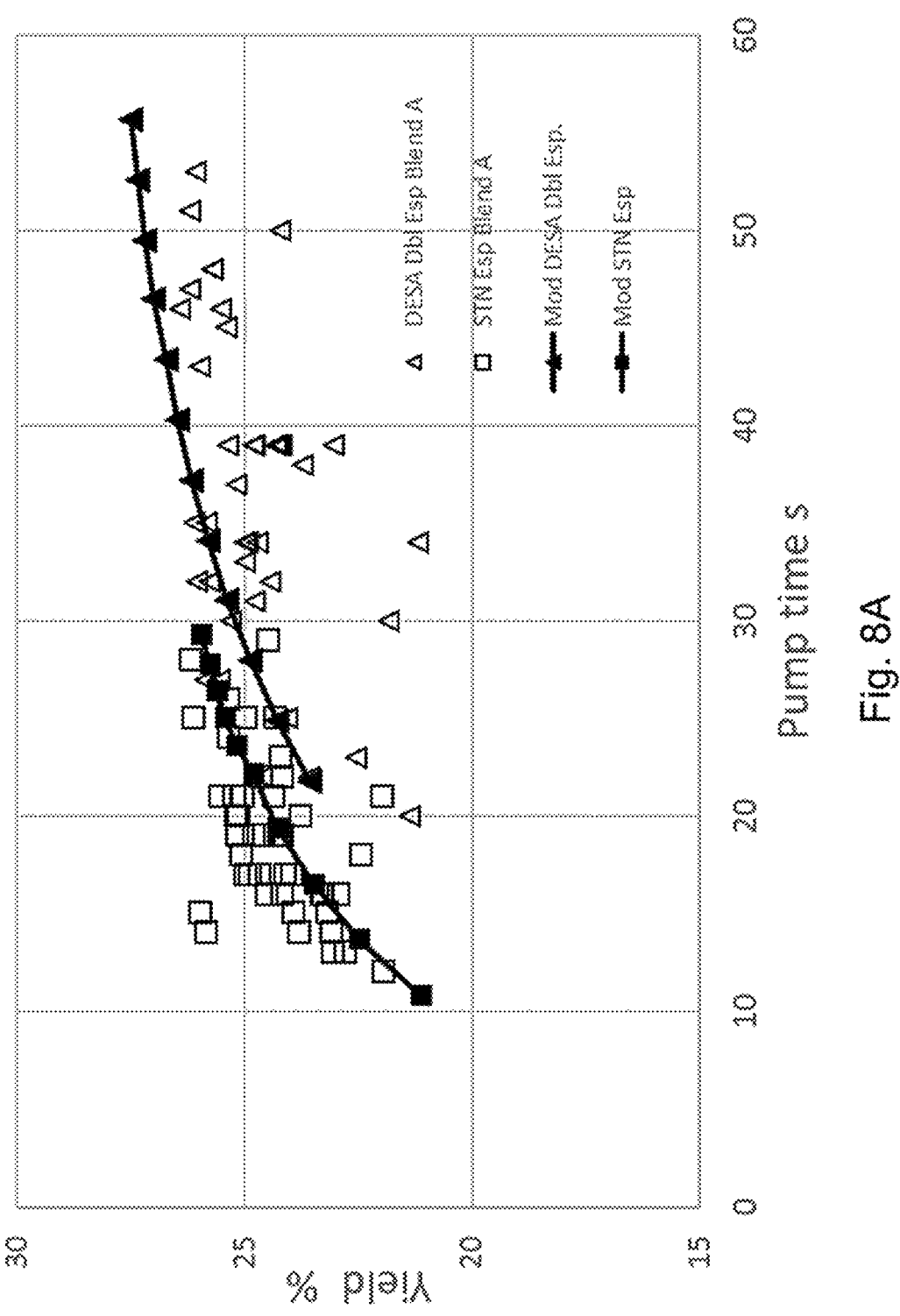
FIG. 8A shows the prediction according to a model of final brew yield for DCA capsules (table 2) vs pump time co-plotted with some experimental data for a standard capsule.
Figure 8B:
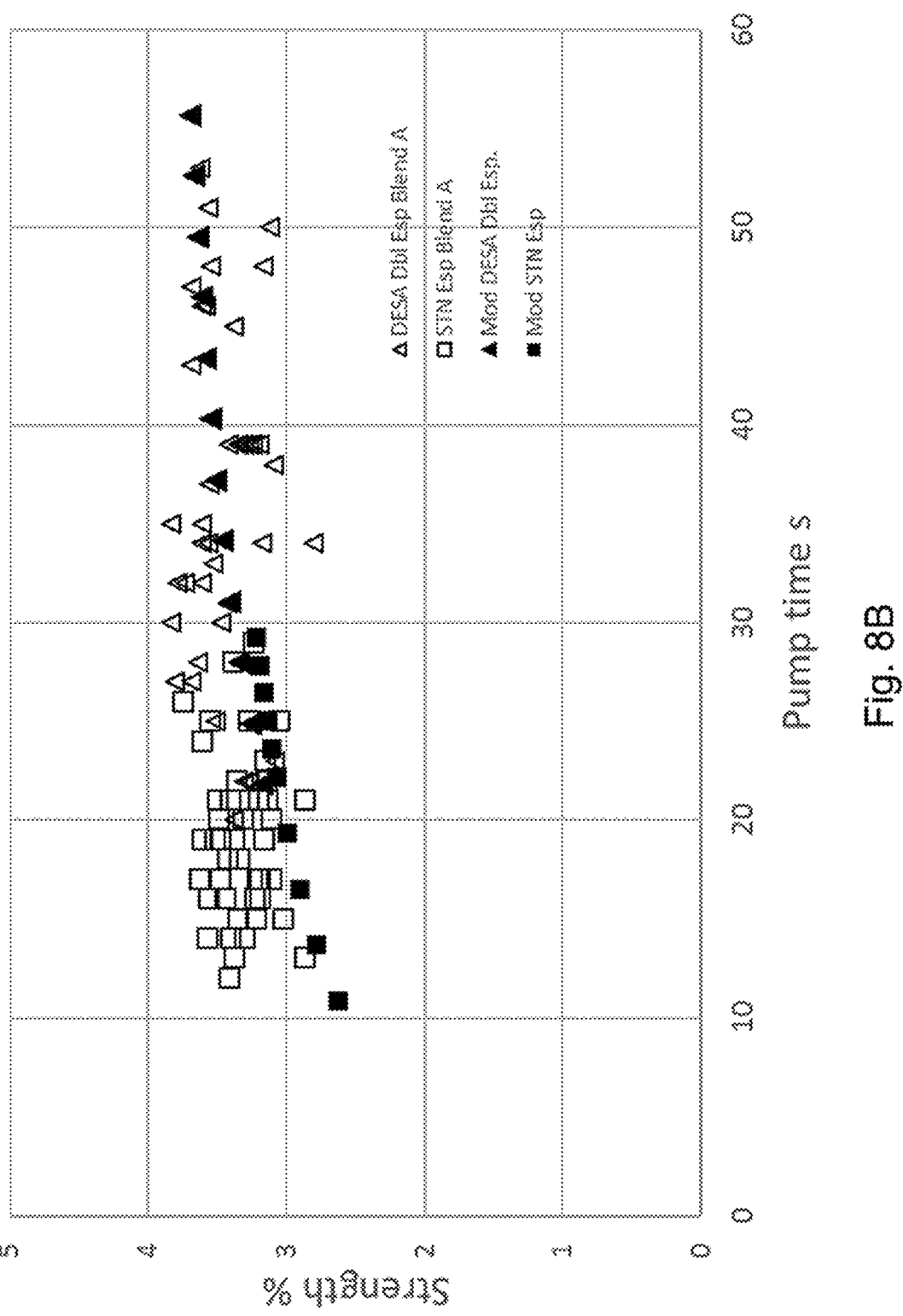
FIG. 8B shows the prediction according to a model of final brew strength for DCA capsules (table 2) vs pump time co-plotted with some experimental data for a standard capsule.
Figure 10:
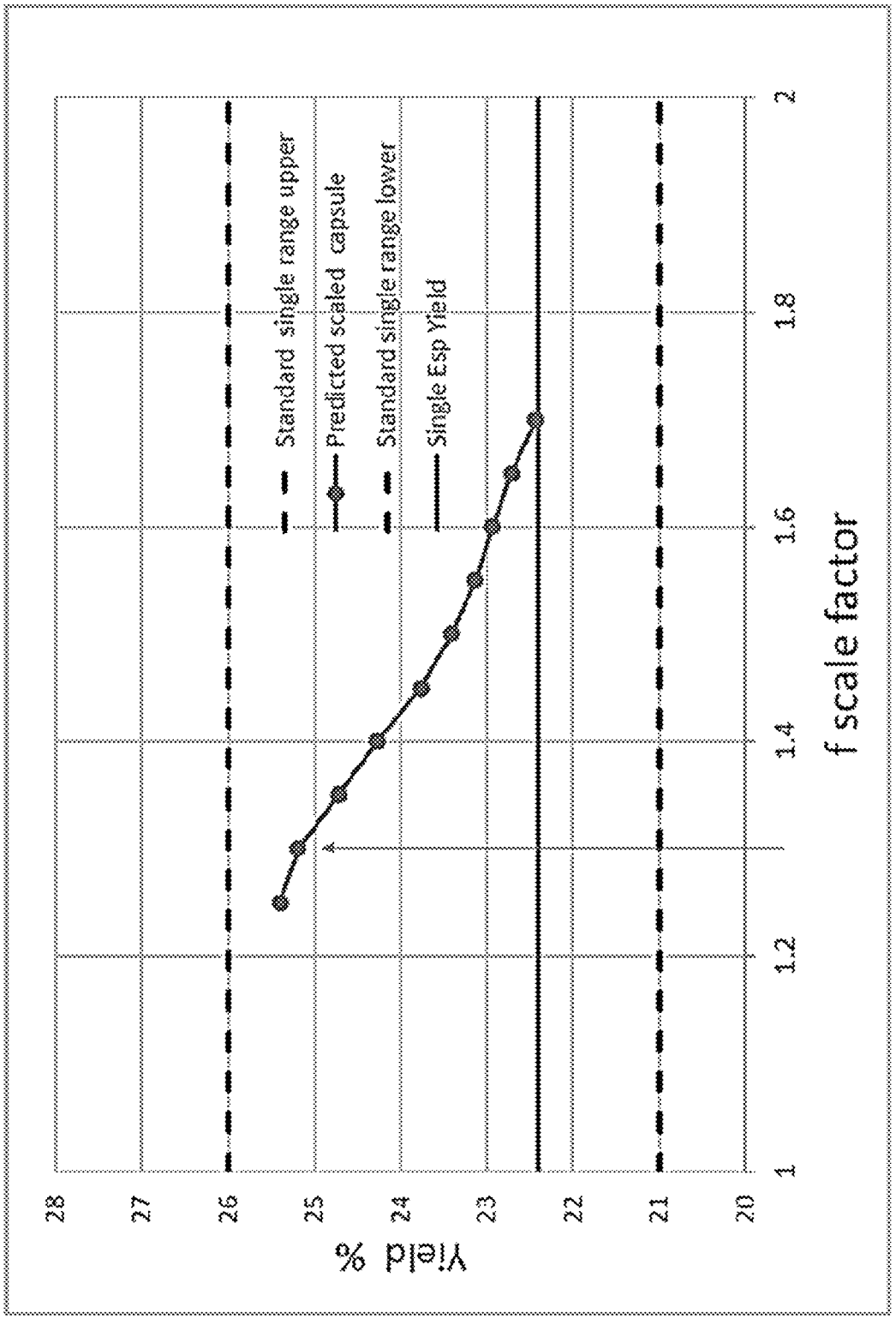
FIG. 10 shows how the yield varies according to a model with a variation of the scaling factor and the range of yields from the STN capsules.
Figure 11:
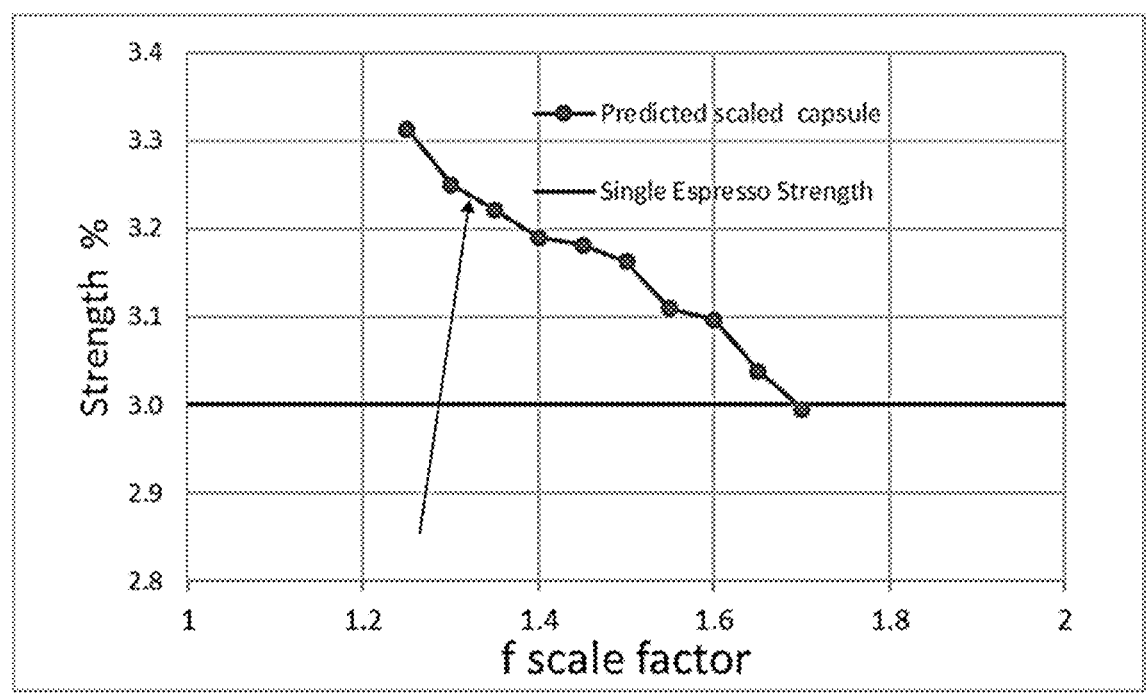
FIG. 11 shows how the strength varies according to a model with a variation of the scaling factor.
Figure 12:
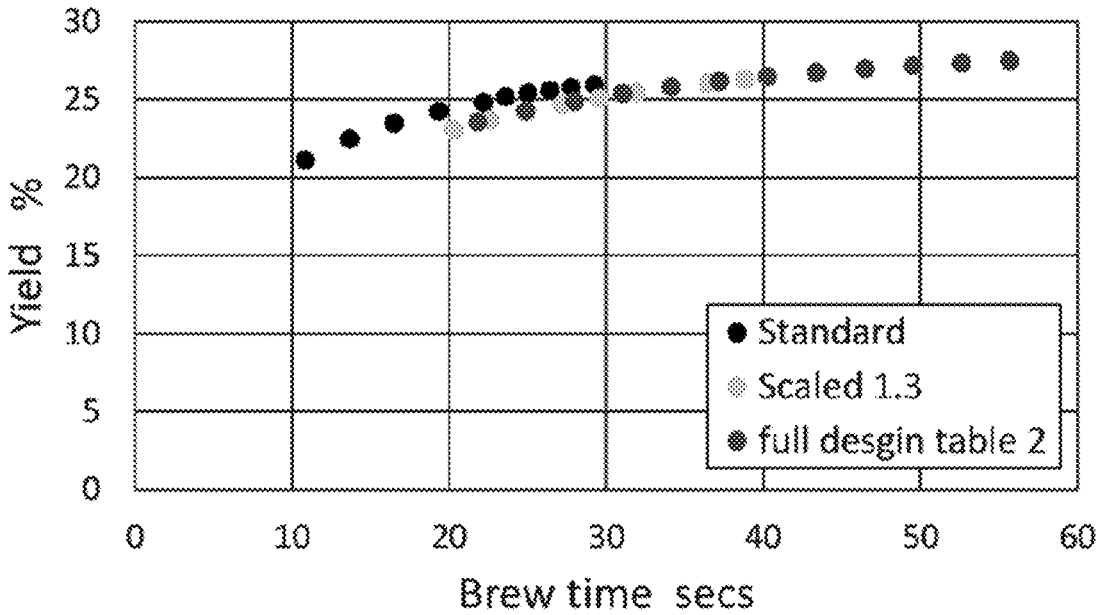
FIG. 12 compares the model predictions for espresso brew yields from 5.5 gr. in the standard capsule.
Figure 13:
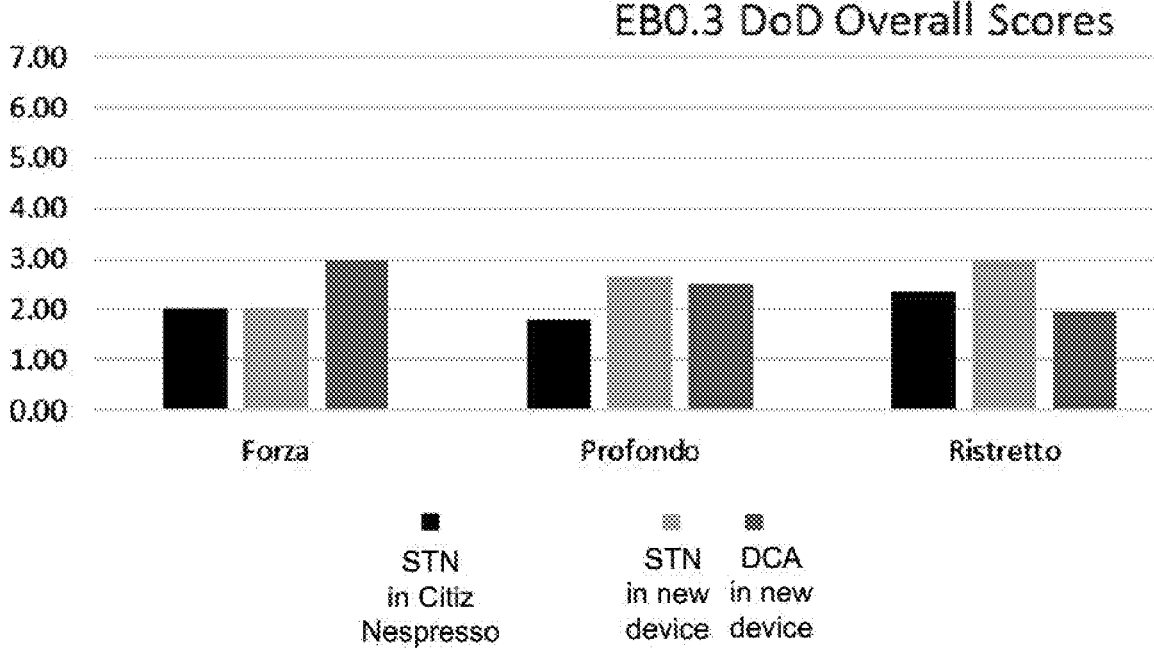
FIG. 13 shows the resulting data.

Section I: Model for the ILD Capsule
A. Theoretical Considerations for the ILD-Capsule In section A reference is made to the following drawings:

FIG. 1 shows a pump characteristic ULka-4;

FIG. 2 shows schematically a capsule having a frustrum shape;

FIG. 3 and table 1 show schematically the dimensions of a standard capsule;

FIG. 4A shows experimental pressure time curves from a capsule with foil lid which ruptures in use;

FIG. 4B shows experimental pressure time curves from a capsule with foil lid in the form of a filter which is open and does not rupture in use;

FIG. 5A shows a model pressure-time curve for a simulation of a standard capsule with different resistances;

FIG. 5B shows a model flowrate-time curve for a simulation of a standard capsule with different resistances;

FIG. 5C shows modelling of the exit area effect for a pressure driven flow through a porous bed for a cube shaped bed open at the flow entrance but with different exit areas;

FIG. 6A shows predicted brew weight vs time;

FIG. 6B shows predicted brew strength vs time;

FIG. 6C shows predicted brew yield vs time;

FIG. 7A shows the prediction according to a model of final brew yield for some standard capsules vs pump time (the time at which the pump stops) co-plotted with some experimental data for a standard capsule—in both the model and experiment time is allowed for drip to added to the brew (cf FIGS. 4-5);

FIG. 7B shows the prediction according to a model of final brew strength for some standard capsules vs pump time co-plotted with some experimental data for a standard capsule;

FIG. 8A shows the prediction according to a model of final brew yield for DCA capsules (table 2) vs pump time co-plotted with some experimental data for a standard capsule;

FIG. 8B shows the prediction according to a model of final brew strength for DCA capsules (table 2) vs pump time co-plotted with some experimental data for a standard capsule;

FIG. 9 schematic of capsules with different scale factors filled with the same weight of coffee bed;

FIG. 10 shows how the yield varies according to a model with a variation of the scaling factor and the range of yields from the STN capsules;

FIG. 11 shows how the strength varies according to a model with a variation of the scaling factor;

FIG. 12 compares the model predictions for espresso brew yields from 5.5 gr. in the standard capsule;

FIG. 13 shows the resulting data. A DOD below 3 is considered not significant.

As discussed an ideal solution would be to choose the larger capsule shape, that both can hold double the weight of coffee than the standard capsule and given the pump performance of the system, can produce double the volume of beverage in the same brew time. However, whilst such a solution can be found theoretically as discussed above it is far from practical and acceptable given the following additional constraint and issues.

In addition to the above first constraint the second constraint is that the consumer if possible without losing quality for the brewed coffee—must have a reason to believe that the standard capsule and the larger capsules can produce an acceptably close beverage. A design choice which is not obvious in view of the first constraint could therefore be to make the larger capsule with the same shape or close to the shape of the standard capsule. This can be achieved by scaling the dimensions of the standard capsules: top radius, bottom radius and height by the same or numerically similar factors. The expectation is however that this would not result in an acceptable brewing performance of the capsule. Using the model below it will be demonstrated that if a scaling factor is used a still acceptable brewing performance can be obtained. If the scaling factor would be 1.7 for a coffee bed of about 11 gr the best brewing performance can be expected. However, if the scaling factor would be 1.3 in combination with a coffee bed of about 11 gr. a still acceptable brewing performance can be accepted wherein the capsule has as an additional advantage that its volume is smaller than the volume of the capsule if a scaling factor of 1.7 would be applied.

The fact that according to an insight of the invention a simple scaling factor can be used to obtain the larger capsule based on the standard capsule leads to a larger capsule having a similar shape as the standard capsule. The shape of the larger capsule can be defined by being frusto-conical wherein the (height)/(maximum width) ratio is in the range of 0.9-1.2. The capsule can in that case be filled with 9-13 gram of coffee. Thus according to one aspect of the invention there is 9-13 gram coffee grinds within the capsule wherein the (height)/(maximum width) ratio of the coffee bed is within the range of 0.9-1.2. According to another aspect of the invention the volume of the coffee bed within the capsule is preferably about the same as the volume of the internal space. In case of the coffee bed being 11 grams this would lead to the scaling factor of 1.3 obtained by means of the model. In case the coffee bed would be larger than 11 grams the preferred scaling factor would be larger than 1.3, however in accordance with the invention the (height)/(maximum width) ratio of the coffee bed remains within the range of 0.9-1.2.

Adopting this scaling constraint, the choice of the scale factors is therefore a challenge. There is a complex relationship between the capsule shape and the brewing properties and the drink quality. The shape, scale and weight of coffee in the capsule are key factors in determining the flow resistance of the capsules, this in turn sets how the pump of the brewer responds and the flow rates through the bed during brewing and the extraction of coffee species from the grinds. In particular, the pump time required to achieve a target beverage volume. Before presenting some experimental results a theoretical model is created to allow to explore designs without needless experiment on poor designs.

It would be desirable to make the scale factors as small as possible for several reasons:

To avoid excess use of materials in the capsule body

The larger scale factor, a fixed weight of coffee the coffee bed will only fill a portion of the capsule volume excess air is undesirable in the system some of the water left in the capsule after brewing drips out, forced out due to trapped compressed air expanding back to atmospheric pressures.

A wide capsule can lead to in-homogeneous flow through the bed resulting giving rise to in-homogeneous extraction.

Consider the case of a single scale factor, there is a minimum value for the scale factor set by the need for the capsule to hold double the weight of coffee the standard at the same bulk density. In the standard capsule design, there is some head-space to avoid filling problems during manufacturing, the same issue may occur in the larger capsule if made to small.

The dimensions of a solution called here the Doubles Capsule A are given in sub section C. This DCA capsule is thus a possible embodiment of the ILD-capsule discussed above. The scale factor for the DCA capsule will be selected in the model to be about 1.3 wherein the capsule is filled with 11 gr, ground coffee. If however a scale factor would be selected around 1.7 the model shows that the best brewing results can be obtained in theory. If the scale factor is however 1.3 the capsule provides—as a surprise—still good brewing results and has in addition other benefits. If a scale factor of 1.3 would be applied the larger capsule would have a (height)/(maximum width) ratio of 0.93. According to a more broad aspect of the invention the larger capsule comprises 9-13 gram coffee grinds within the capsule wherein the (height)/(maximum width) ratio of the coffee bed is within the range of 0.9-1.2. Please note that the model is solely discussed to demonstrate that the selected ranges according per the invention indeed provide surprising results.

B. A Model of the Pump, Capsule and Bed System Coupled to Extraction from the Coffee Grains.

B.1 Brewer. Bed and Capsules Model.

The brewer systems in home On-Demand (OD) systems are typically a vibration pump and a control system which stops the pump after a target volume has been pumped—more expensive café-style systems of bean to cup systems may have rotary pumps. The vibration pumps typically used have a distinct back-pressure flow rate relationship, FIG. 1 shows an example from the ULKA web site. The plot shows the capability of there system, with min and max showing the limit of the variation that can be expected brewer to brewer.

The pump characteristics is approximated (see dashed line in FIG. 1) by linear form shown in equation (2) set by a maximal back-pressure $P_{max}$ (at which the pump stalls) and a maximal flow rate $Q_{max}$ when the system applied to it is open (very low resistance). The capsules and coffee bed presents a resistance R(t) to the pump which is found to vary with time t—in the main this due to evolution of the coffee bed itself. In practice the flow and pressure oscillate with the pump, typically at 50 Hz, however at a given time t, with the capsules flow resistance R(t), the oscillation average of the pressure and flow are given by $$P(t) = R(t)Q(t) = P_{max}\left(1 - \frac{Q(t)}{Q_{max}}\right) \qquad (2)$$

In the modelling below the pump characteristic used is an approximation to that of a known ULKA4 pump used in the Nespresso™ system: $P_{max}$=20 bar and $Q_{max}$=450 ml/min. Given a model of R(t) solution of equation (2) gives the brewer model, predicting the flow and pressure history of the system, see The *Principles of Coffee Extraction from Packed Beds in on-Demand Coffee Systems* Melrose et al (2014) Proceedings of 25th ASIC conference Colombia, available at http://asic-cafe.org/proceedings.

The body of the capsule is close to frustum shaped as shown in FIG. 2. The commercial capsules may have fluted sides and a domed top, these features are not included in the modelling, in practice the coffee bed occupies a portion of the frustum shaped body and does not extend into the domed top.

The flow resistance $R_{cap}(t)$ of a coffee bed of this shape is defined by $$Q = \left(\frac{1}{R_{cap}(t)}\right)\Delta P \qquad (3)$$

where Q is the volumetric flow of fluid and $\Delta P$ is the pressure difference across the bed. The resistance is given by $$R_{cap} = \frac{F(a)\mu h}{K(t)\pi R_1 * R_2} \qquad (4)$$

Where $\mu$ is the viscosity of the fluid, F(a) is an exit area factor (see below) and K(t) is the permeability of the bed, an intensive parameter arising from the flow of the fluid through the complex geometry of the pore space between the grains in the bed—it is assumed that flow does not penetrate through the nano-porous grain matrix itself. Equation holds if the capsule is completely filled with coffee, if the coffee bed partially fills the capsule, the dimensions of equation (4) should be that of the bed within the capsule. In the case of being partially filled an additional resistance can be added to account for the flow through the empty portion of the capsules, but in practice this is negligible in comparison to the resistance of the bed. Partially filled capsules will occur in the modelling of results of section C.

A general form for the permeability is a generalised version of the well-known Kozeny-Carman expressions $$K_{bed}(t) = \left( \frac{(1 - \theta(t))s(b)(\phi d_{32}(t))^2 \epsilon_{b(t)}^3}{k_e \left(\frac{1}{\epsilon_b}\right)^n 36(1 - \epsilon_b)^2} \right) \qquad (5)$$

Where $\theta(t)$ is the fraction of any gas in the bed, $s(b)$ is fraction factor for the rough surface of the grains, $\phi$, is the grain sphericity, $d_{32}(t)$ is the area averaged dimension of the particle size distribution, $\epsilon_b$, is the porosity of the grain packing. However, a complete model for permeability is subject of much debate—equation (5) is a form generalized from that of packing of spheres for which it has been shown to hold well.

As indicated many of the factors in equation (5) depend on time. There are several factors that affect the overall capsule+ bed resistance and its evolution under flow through it, although the dominant effect is usually set by the packed bed of grains. These factors give rise to a natural variation of the capsule resistance to flow through it, and hence a variation of flow history and performance from brew to brew, in particular, this results in an observed spread of brew times from brew to brew to reach the target beverage volume.

The following effects on the bed permeability are noted:
The wetted beds under pressure driving the flow consolidate, and shrink in height.
On the macroscopic scale the beds may shape, sometimes domed in the centre and dipping towards the walls of the capsule, they may also develop channels and regions of trapped gas.
On the microscopic scale, fines in between the coarse grains can plug the bed, increasing resistance. This is a complex phenomenon and coupled to the flow through the bed. On the one hand the flow induces fines to move, but on the other hand they can get captured in narrow pores within the bed and form plugs (collections of fines). The distribution and sizes of plugs is flow rate and bed packing dependent in a way that is not fully understood or easy to observe.
The levels of fines increase when the grains are wet because some fines are agglomerated on the surface of the coarse particles when dry, indeed the PSD of coffee grains measured wet reveals significantly more fines than when measured dry.
Grains may swell under wetting and this can be dependent on water quality.
Gas in the system, circa 50% of the volume of dry grains is air, if trapped within the bed will raise resistance. $CO_2$ gas may also be released by the wetted grains depending on how well the grains have been de-gassed.
Additional effects arise from the capsule:
The capsules have a resistance component at its inlet where they are pierced by small holes.
At the outlet of the capsule, the system early in the evolution of pressure ruptures an aluminium foil base by pressing the foil against pins in a rupture plate. The area of the holes formed is less than the disc area of the bottom of the capsule, to exit these holes the flow must converge to the exit when inside the bed this effect increases the overall resistance of the capsule, theoretical models and experiment show that if the exit area is 10% that of the base, the capsules resistance is increase by a factor circa $F(10\%)=2$, if 1% it is scaled by factor of $F(1\%)=5$ (cf equation 5).

The overall evolution of time dependent flow permeability of coffee beds bed is sensitive to flow rate, this has been measured, some results are reported in" ("A new methodology to estimate the steady-state permeability of roast and ground coffee in packed beds". J. Food Eng., 150, 106-116. Corrochano et al (2015). Values of the permeability evolved from $o(10^{-12})$ $m^2$ to $o(10^{-14})$ $m^2$ over 5-30 s and then in some case increases slightly before reaching steady state values in minutes.

It is crucial to realize that most OD system brewing occurs before the steady state is reached, for significant parts of the brew the resistance is in the transient (changing) regime. This is a particularly significant effect for short time brews such as espressos. A heuristic model of this process has been developed by some of the authors, it assumes a rise in time which is a function to the flow rate, from a high permeability set by the dry PSD and low density (typically 440-480 $kg/M^3$) to much lower bed permeability set by the wet PSD and a higher density (typically 500-530 $kg/M^3$). Additional factors are included which scale the resistance of the capsules due to the inlet and outlet effects as described above.

These systems typically drip after the pump is stopped (for reasons described above), the added volume and yield can be significant especially for espressos. This feature is included in the modelling. This leads to the need to be clear on the definition of 'brew time'. The convention adopted by the experiment and modelling is to plot data against the pump time, the time at which the pump stops. However, the yields and strengths include that given by the volume of brew added by the drip.

B.2 Model for Extraction from Trains

To estimate brew quality, strength and yield, a second extraction model needs be made of the extraction of molecular and colloidal species from the coffee grains into the bed, and then through the bed and into the beverage. Such a model has been developed and reported elsewhere, "Kinetics of Coffee Extraction and Particle Microstructure: Numerical Modelling and Experimental Validation in Slurry Extractions", Proceedings of 25th ASIC conference, Colombia Corrochano et al (2014); "Optimising Coffee Brewing Using A Multiscale Approach" Proceedings of 24th ASIC conference Costa Rica Melrose et al (2012))—it is a straight forward adaption of published models in other context. "Mathematical modelling and scale-up of size-exclusion chromatography". Biochemical Engineering J. 1998, 2 145-155 Li et al (1998), and using well-known numerical techniques to solve for diffusion of species through grains. The model is of particles in a bed, extracting species diffuse through the particles into the pores space of the bed with convective flow through the pore space to the exit of the bed, assuming an axially symmetric bed and ignoring wall effects the pore space concentration and a point z down the axis is given by:

$$\frac{\partial C(z, t)}{\partial t} + D_{bed} \frac{\partial^2 C}{\partial z^2} + v \frac{\partial C}{\partial z} + \frac{3(1 - \epsilon_b)}{\epsilon_b R} j_{bed}(z, t) = 0 \qquad (6)$$

Where, $\epsilon_b$, is the porosity of the bed and v is the fluid velocity in the pore space. $D_{bed}$ is known as the dispersion coefficient and j(R,t) is the flux out of the grains per unit area of grain. The grinds are modelled by representative particles, although many particles may be modelled, we find that a good approximation is to use a coarse and a fine particle reflecting the bi-modal nature of grinds particle size distribution. The flux is given by modelling the concentration profile in each grain. The time dependent diffusion equation is solved for each representative particle/grain:

$$\frac{\partial C_g(r,t)}{\partial t} = -D_g\left(\frac{\partial^2 C_g}{\partial^2 r} + \frac{2}{r}\frac{\partial C_g}{\partial r}\right) \quad (7)$$

With the flux out of the grain given be:

$$j_g(t) = -\epsilon_g D_g \frac{\partial C_g}{\partial r}(R) = \frac{D_b}{\delta(v)}(C_g(R,t) - C(t)) \quad (8)$$

Where C(t) is the pore space concentration external to the grain The starting concentration inside the grains is set by measuring the maximal yield for a blend and grind size measured in dilute slurry conditions after coming to equilibrium over several hours.

In practice the equation (6) is discretized in to cells down the z-axis and in each cell two representative particles, one coarse and one fine are simulated using (3), (4). The flux term which couples (3) and (4) and (2) is given by $$J_{bed}(z,t) = \frac{3(1-\epsilon_{bed})}{\epsilon_{bed}}\left[\frac{j_{fine}(z,t)\vartheta_{fine}}{r_{fine}} + \frac{j_{coarse}(z,t)(1-\vartheta_{fine})}{r_{coarse}}\right] \quad (9)$$

where $D_g$ is the diffusion constant of the releasing species inside the grains. In reality, there are many different releasing species, however it was found by the inventor that using $D=1.0\ 10^{-10}\ m^2/s$ is good proxy for the total yield over times up 40-60 s.

The flow through the bed and hence pore velocity at a given cross section of the capsule are solved from equation (2). The brew time in these capsules is determined by the evolution of the capsule resistance to flow and the solution of equations (2,3). The flow rate is time varying, but these systems monitor the volume pumped over time and switch off the pump when a pre-set target volume is reached. Generally, this target volume is greater than the desired beverage volume, because some fluid is left in the capsules after use. In addition, as noted earlier, once the pump is stopped some fluid drips into the beverage due to the relaxation of trapped gas in the capsule and the system back to atmospheric pressure. These effects are all included in the model. As in the real systems the pump is stopped so as to give a desired volume of beverage e.g. circa 40 ml for and expresso and 2×40 ml for a double espresso.

Given the shape of the capsule, the weight of coffee and the bulk density, a bed of grinds is defined in the capsules. Equation (6) is solved by discretization in layers normal to the axis of the capsule, each layer contains a 2-particle model of the PSD, the flux out of the particle is solved, and convection terms exchange pore space concentration between layers. At any point down the axis of the capsule, the pore space flow velocity used in equation (6) is solved from the time varying volumetric flow rate by dividing by the cross-sectional area and the porosity of the bed. Flow out of the bottom of the system and the concentration at the bottom of the bed are integrated over time to give the time dependent strength and yield.

C. Model Predictions

The standard singles capsule model (see FIG. 3) is a frustum shape with dimensions as shown. Capsules with dimensions close to this are in wide spread commercial use. In particular, those used in the Nespresso™ family of brewing systems.

This is close to the dimensions of the main body of a Nespresso™ system. The flow enters at the thin end and exits at the thicker end. In addition, these capsules can have a doomed top, sometimes filled with a filter this is ignored in the model, the bed typicality fills just to the top of the main body.

Fill weights in the standard capsule vary from 5-6 gram, depending on grind and blend. The modelling below considers a fill weight of 5.5 gram.

A larger capsules design brewing doubles (double espressos, double lungos etc), is a scale version of this shape

TABLE 2

| Doubles Capsules A (DCA-capsule) | |
| --- | --- |
| $R_1 =$ | 1.27 × 1.45 cm |
| $R_{2\ (top)} =$ | 1.31 × 1.10 cm |
| h = | 1.37 × 2.45 cm |

For 5.5 gram in the standard capsules the yield is found to be 22-27%, see FIG. 7A later. From brew to brew there is variation in the pump time (and hence yield), this is due to variations in the capsule resistance from run to run due to variation in all the factors listed above. To mimic this variation, the model assumes a base case of resistance, set by a typical measured permeability of the bed, dry and wet, a typical area of rupture (10%), and observed inlet resistance and timescale for the permeability to shift from dry to wet. It then arbitrarily varies the resistance by multiplying by a factor to mimic variation around this base value.

FIG. 4A shows experimental pressure time curves from a standard Aluminium Nespresso capsule with foil lid which ruptures open under fluid pressure. FIG. 4B shows the same for a plastic L'or capsule with an open top and lid that does not rupture open under fluid pressure. In these plots the oscillations of the pump are seen. For each 50 Hz cycle the pressure max, pressure min and average pressure are plotted.

FIGS. 5A, B show some model pressure-time curves (A) and flow rate-time curves (B), for a simulation of a standard capsule, with 5 different resistances which mimic the observed variation in the resistance of capsules (see comments above). The model is just of the average pressures and flow, not the full oscillation pattern seen in the real system (cf FIG. 4). In these runs $P_{max}=20$ bar and $Q_{max}=9$ ml/s was used. The resistance variation is done as follows (see equation 4) by choosing values of permeability decreasing from $0.29\ 10^{-10}$ from to $0.83\ 10^{-10}\ m^2$ with a relaxation time of 0.5 s, and multiplying by factors F(a)=5.5, 6.0, 6.5, 7.0, 7.5 to simulate different exit areas, factor F(a) in equation (4) to give a range of performance. The F(a) factors were established by theory and experiment and is shown in FIG. 5C.

FIG. 5C shows modelling of the exit area effect by solving the well know Darcy equation for pressure driven flow through a porous bed for a cube shaped bed open at the flow entrance but with different exit areas, computational cubic grids of mesh size 59×59×59 and 30×30×30 were used. The green circles show a variation of hole pattern from central to peripheral holes. The purple squares show experimental results on flow through a cylindrical bed of radius 3.5 cm and height 2 cm with steel plates at the bottom with varying numbers and sizes of holes, at fixed flow of 8 mls. The pressures were measured and the resistance of system estimated from equation (3). The horizontal axis is the % of open area at the exit, the vertical axis is the factor F(a) of equation (4).

FIGS. 6A, 6B and 6C show respectively the predicted, brew strength, brew concentration and yield vs time.

D. Model Predictions for Yield and Strength Vs Experiment

FIGS. 7A and 7B compare espressos and lungos brewed in the STN capsules (standard capsule or capsule of the first type) with model predictions for the STN capsules. Esp. Blend A is the experimental result for a standard espresso capsule for a blend A (5.7 gram), brew weights were in the range 39-45 gram. STN Lun. Blend B is the experimental result for a standard espresso capsule for a blend B (6.0 g), with lungo brew weights in the range 110-116 g brew. The predictions of the model for both cases are shown connected by lines. Mod STN Esp provides the calculated (based on the model discussed in subsection B and C) results for the standard espresso capsule for a model with coarse grind size 340 micrometers, comparable to that of the experimental blend the model gave brew weights in the range 44-45 gram brew, the capsule resistance is varied to mimic the variation seen in actual pump times. Mod STN Lun provides the calculated results, (based on the model discussed in subsection B and C) for the standard espresso capsule for the same grind size model giving brew weights in the range 115-117 gram. The applied pump characteristic relation between the pressure and flow (averaged over the oscillations) is given by FIG. 1. FIG. 7A shows yield vs pump time and FIG. 7B shows strength vs pump time. In the model predictions the maximum yield was set at 29%, a typical value for the grind sizes used. The brew time variation in the modelling is generated by varying the resistance of the capsules. The FIGS. 7A and 7B show that the model is reliable.

In both the experiment and modeling, there is a natural variation in the espresso yields between 20 and 26%, and strengths between 2.5 and 4%. In practice this is what current consumers experience.

FIG. 8A and FIG. 8B compare modelling and experiments on the standard and DCA capsules using Blend A in both. The STN capsules are filled with a weight of coffee of 5.7 gram, The DCA capsules are filled with a weight of 10.7 gram. Model coffee weights were 5.5 gm in the STN case and 11.0 g in the DCA case. Again, model data is shown connect by lines Yields are plotted in FIG. 8A and strengths in FIG. 8B. The experiments in the STN case are the same data as in FIG. 7 with brew weights were in the range 39-45 gram. The brews of Blend A in the DCA capsules gave a double espresso weight in the range 75-85 gram, the models were run with 5.5 g in the standard capsule and 11 g in the Doubles design to a weight 81-82 gram. The pump times are longer than the ideal design which would have brew times with comparable spread to that of singles. The doubles from the DCA capsules have a range of yield starting mid the range of the single (espressos) yield extending to higher values. Although the yields of the scaled capsules lie to the top end of those of the standard capsules, they still lie within an ideal range of 22-27%. With the larger weight of coffee in the DCA capsules, the strengths of the doubles are comparable with those of the singles and the spreads of the STN singles and DCA doubles have much overlap.

The conclusion of this section is that the model gives comparable results to experiments (FIG. 7) and can be used for explorations of design beyond experiment. FIG. 8 show that the single espressos brewed from the STN capsules and double expressos from the DCA capsules have comparable spreads of brew yields and strengths, despite (and surprisingly so) that they have longer pump times. That is, given the constraints which forces the design choice to be away from that of the ideal (see next section, one which would give the same pump times for singles and doubles), it is found that the performance of the DCA capsules is acceptable so that a design satisfying the constraints but with acceptable performance has been found by the inventors.

E. Singles from the Standard Capsules Vs Doubles from Scaled Capsules.

This section will use modelling to examine the wider space of capsules shape options and place the DCA design satisfying the constraints in relation to an 'ideal' solution. For simplicity consider a family of capsules generated from the standard capsules of FIG. 3 with dimensions of table 1 by multiplying all its dimensions by a single factor f. The scaled capsules are filled with double the weight of the standard capsule and brewed to twice the volume. The standard capsule was modelled with 5.5 gm of coffee and the scaled capsules filled with 11 gm, obviously the bigger the scale factor the less the volume of the capsule filled by the fixed weight of coffee. The scaled capsules are assumed filled up from the exit (the larger radius end). FIG. 9 shows this schematically. With the larger the scale factor, the coffee bed fills from the exit upwards to shorter and shorter heights, becoming broader and shorter.

FIG. 9 shows a schematic of scaled capsules filled with fixed weight of coffee, with increasing scale factor left to right, the hatched zone shows a hypothetical filling, bed, of a fixed weight of coffee. The dashed box will be used in the discussion below.

The standard capsule was simulated with 5.5 gram of coffee and a flow resistance mid-range of that observed, the pump time was 15.5 s producing a brew weight of 41.1 gram with a yield of 22.4% and strength 3.0%.

Using the model, the yields from a capsule by a single scale factor with weight of coffee 11 gram, the bed permeability and exit area effects were set as used in the modelling of the standard capsule, note the resistance of the capsule varies with shape decreasing with increasing scale factor as the bed becomes shorter and broader and hence so does brew time and yield vary. At f=1.3 the modelled pump time was 28 s whilst at f=1.7 it was 24 s. The brew weights produced vary due to varying dripping effects driven by trapped gas, the pump times and hence volume pumped were adjusted to keep brew-weights for the double espressos in the range 81-83 gram. The longer pump times are required with larger capsules to also account for the larger volume required to fill the capsule initially. This drives the variability shown by FIGS. 10 and 11.

FIG. 10 shows how the yield varies with shape due to varying resistance with fixed bed permeability and exit factors.

FIG. 11 shows how the corresponding strength varies with shape.

As will be shown in FIG. 12 below the design choice DCA with slightly different factors for the different dimensions (table 2) is very close in performance to the single scale factor 1.3, the performance of the latter is indicated by the arrows in FIGS. 10 and 11.

FIG. 12 compares the model predictions for varying brew times for espresso brew yields from 5.5 gram in the standard capsule, the yields for a double espresseso brew from 11 gram in the single scale factor capsule with f=1.3 (close to the DCA capsule) and the yield from 11 g in the full design DCA (Table 2)

Although a factor 1.7 might be considered ideal in that it gives brew times, yields and strengths close to those of the standard capsule. In practical terms the capsules would be very large with a bed just in the bottom portion (cf FIG. 9, right hand figure) and a large un-filled volume. Such a larger capsule only partially filled with bed could in practice have the range of undesirable effects listed in Section A. One could choose a thin 'flat' design just enough to contain the 11 g (as indicated by the dashed box in FIG. 9), however such a design would look radically different from the standard capsule, quite unacceptable from the point of view of consumer perception (Constraint 1 of section A). Furthermore it is in the experience of the inventors that it is difficult in practice to achieve a homogeneous flow pattern through such a broad and short bed. The double design choice (this is the capsule with f=1.3 which is close to the DCA capsule and which is an embodiment of the ILD capsule) gives a slightly different beverage with higher yields and strength. However, it is within an acceptable range and this is supported by sensory data. It follows that the scale factor may be between 1.3 and 1.7. This means that the internal volume may be in the range of 27.66-68.67 cm3.

F. Sensory Data

A sensory panel was used to test for difference between the following samples. The degree of difference was judged between the following espresso brews. 3 different blends were tested:

Reference—L'or blend in Nespresso (Citiz Brewer)

Blind control—same as reference

Standard Capsules brewed on apparatus discussed below

ILD capsule brewed on apparatus discussed below

FIG. 13 shows the resulting data. A DoD below 3 is considered not significant.

G. Analytical Data.

The following samples were Brewed

Espresso 1: Blend A, in STN Capsule (drink length 40 ml)

Espresso 2: Blend A, in DCA (double weight and drink length 80 ml)

Lungo 1: Blend B in STN capsule (drink length 110 ml)

Lungo 2: Blend B in DCA (double weight and drink length 220 ml)

FIGS. 14A and 14B show plots of GCMS data for a set of Key Aroma Compounds.

FIG. 14A shows a normalized aroma analysis of an averaged double espresso brewed in a DCA capsule (Espresso 2) vs an averaged single espresso brewed in a STN capsule (Espresso 1) in which the values of the STN capsule are normalized to 100%. The table under the figure shows the absolute values in ppm. From these data it follows that there is no significant difference between the components in the brews from Espresso 1 and Espresso 2.

FIG. 14B shows a normalized aroma analysis of an averaged double lungo brewed in a DCA capsule (Lungo 2) vs an averaged single lungo brewed in a STN capsule (Lungo 1) in which the values of the STN capsule are normalized to 100%. The table under the figure shows the absolute values in ppm. From these data it follows that there is a significant difference in the phenols and that the other components do not show a significant difference. This is an unexpected result because one would expect a higher concentration of phenols in view of the longer brewing time.

The data is normalised to that of the singles, so the concentration of the doubles are plotted as a percentage of that of the singles. In most cases, the data is consistent with the overall trends of Carbohydrate (see FIG. 18) and acid analysis (see FIG. 15) in that the brews are within measurement variability not significantly different. A deviation above 10% is however considered significant and this is seen in FIG. 14B for the phenols. There is some indication of a difference for the same molecules also in FIG. 14A. This is both surprising but constitutes quite a positive advantage from the point of view of the consumer perception. Three of the molecules are quiacols associated with undesirable over extraction.

Quoting from the literature Brita, F. *The Craft and Science of Coffee* Ch 15. (2017) Academic press ISBN. 978-0-12-803520-7. Bottom of 2$^{nd}$ para page 365 says: "Lee et al (2011) show how guiacol, 4-ethylguiacol and 4-vinylguiacol increased during extraction which was highly correlated with increasing off-flavours linked to over extraction" The Lee et al reference is Analysis of off-flavour compounds from over-extracted coffee. Korean Journal of Food Science and Technology. (2011) 43(3), 348-360.

These molecules are thus known to release relatively slowly and give rise to undesirable over extraction with long brew times. The DCA capsules despite giving longer brew times for doubles relative to singles (cf FIGS. 8A,8B) have reduced levels of these molecules despite longer brew times and we assume that bed shape mitigates against flavours known to correlate with over extraction in contradiction of an experts expectations that the DCA shape with longer brew times would give over extraction. Without being bound by theory, this could occur if the molecules released for grounds at the top of the tall bed are bound to lower grains before exiting the bed.

FIG. 15 is a table relating to the variance of organic acids in which espresso 1 relates to measurements of a single espresso brewed in a STN capsule and espresso 2 relates to measurements of a double espresso brewed in a DCA capsule. No significant differences are observed between the espresso 1 and espresso 2. Lungo 1 relates to measurements of a single lungo brewed in a STN capsule and lungo 2 relates to measurements of a double lungo brewed in a DCA capsule. The differences observed between lungo 1 and lungo 2 are within the method variability.

FIG. 16 is a table relating to the variance of pH/Ta, DMA and Caffeine in which espresso 1 relates to measurements of a single espresso brewed in a STN capsule and espresso 2 relates to measurements of a double espresso brewed in a DCA capsule. Lungo 1 relates to measurements of a single lungo brewed in a STN capsule and lungo 2 relates to measurements of a double lungo brewed in a DCA capsule. The substances where there is a significant variance is indicated at the bottom of the columns with a "yes".

FIG. 17 is table relating to the variance of Bitterlactones and Chlorogenic acids in which espresso 1 relates to measurements of a single espresso brewed in a STN capsule and espresso 2 relates to measurements of a double espressos brewed in a DCA capsule. Lungo 1 relates to measurements of a single lungo brewed in a STN capsule and lungo 2 relates to measurements of a double lungo brewed in a DCA capsule. With respect to these substances, no significant differences have been observed.

FIG. 18 is a table relating to the variance of free and total carbohydrates in which espresso 1 relates to measurements of a single espresso brewed in a STN capsule and espresso 2 relates to measurements of a double espresso brewed in a DCA capsule. Lungo 1 relates to measurements of a single lungo brewed in a STN capsule and lungo 2 relates to measurements of a double lungo brewed in a DCA capsule. With respect to these substances, no significant differences have been observed.

Figure 19:
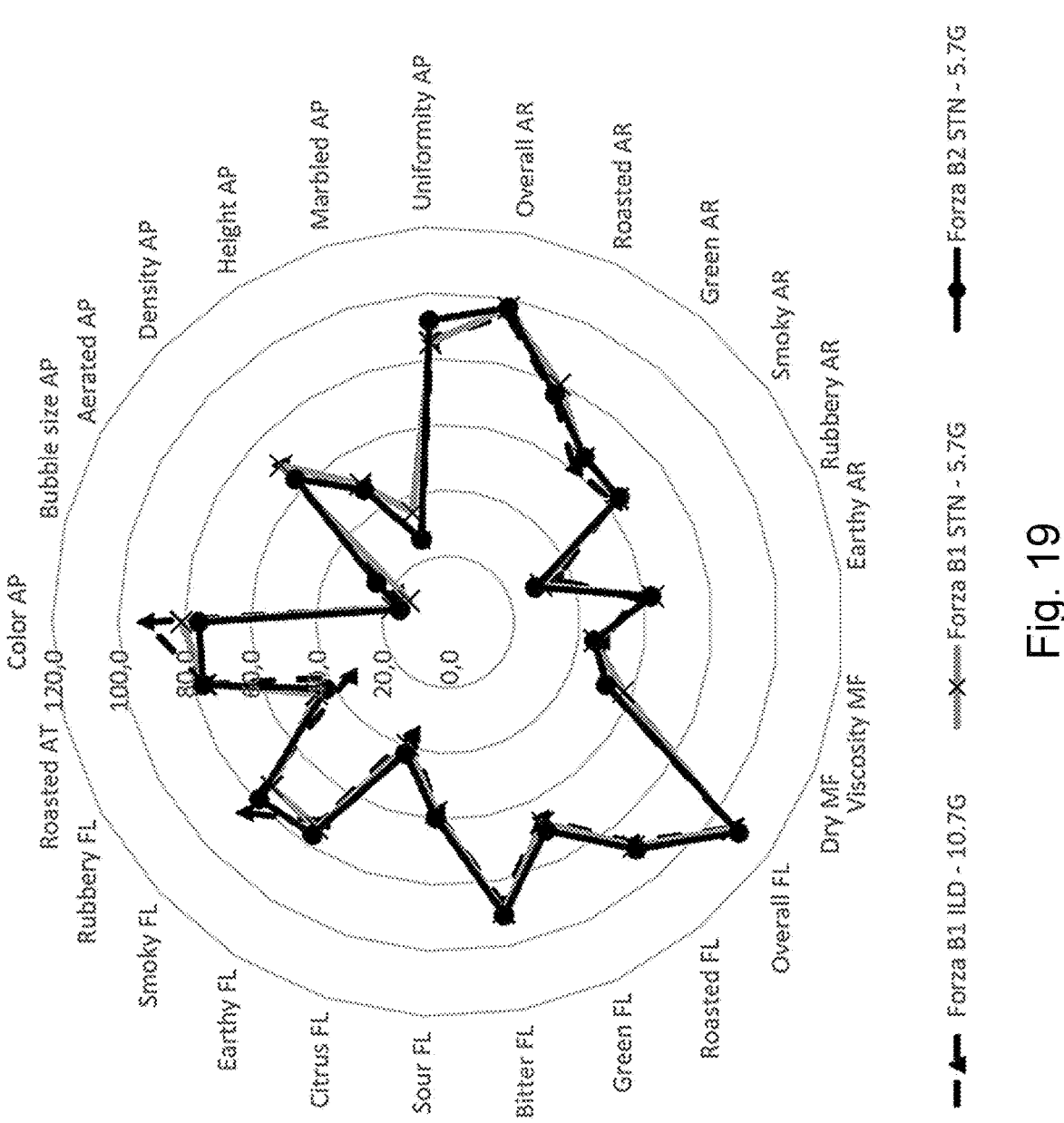
FIG. 19 is a spider plot in which a brew from a Forza coffee blend batch 1 (10.7 g) accommodated in an ILD-capsule is compared with a brew from a Forza coffee blend batch 1 (5.7 g) and a brew from a Forza coffee blend batch 2 (5.7 g) both in a STN capsule.

FIG. 19 is a spider plot in which a brew from a Forza coffee blend batch 1 (10.7 g) accommodated in an ILD-capsule is compared with a brew from a Forza coffee blend batch 1 (5.7 g) and a brew from a Forza coffee blend batch 2 (5.7 g) both in a STN capsule. In this figure AR=aroma, AP=appearance, MF=mouthfeel, FL=flavour and AT is aftertaste. From the spider plot it can be concluded that the brew of the ILD-capsule is significantly darker in colour compared to the brew of the STN capsule. However, the ILD-capsule brew of Forza is a good sensory match with the STN capsule brew.

Figure 20:
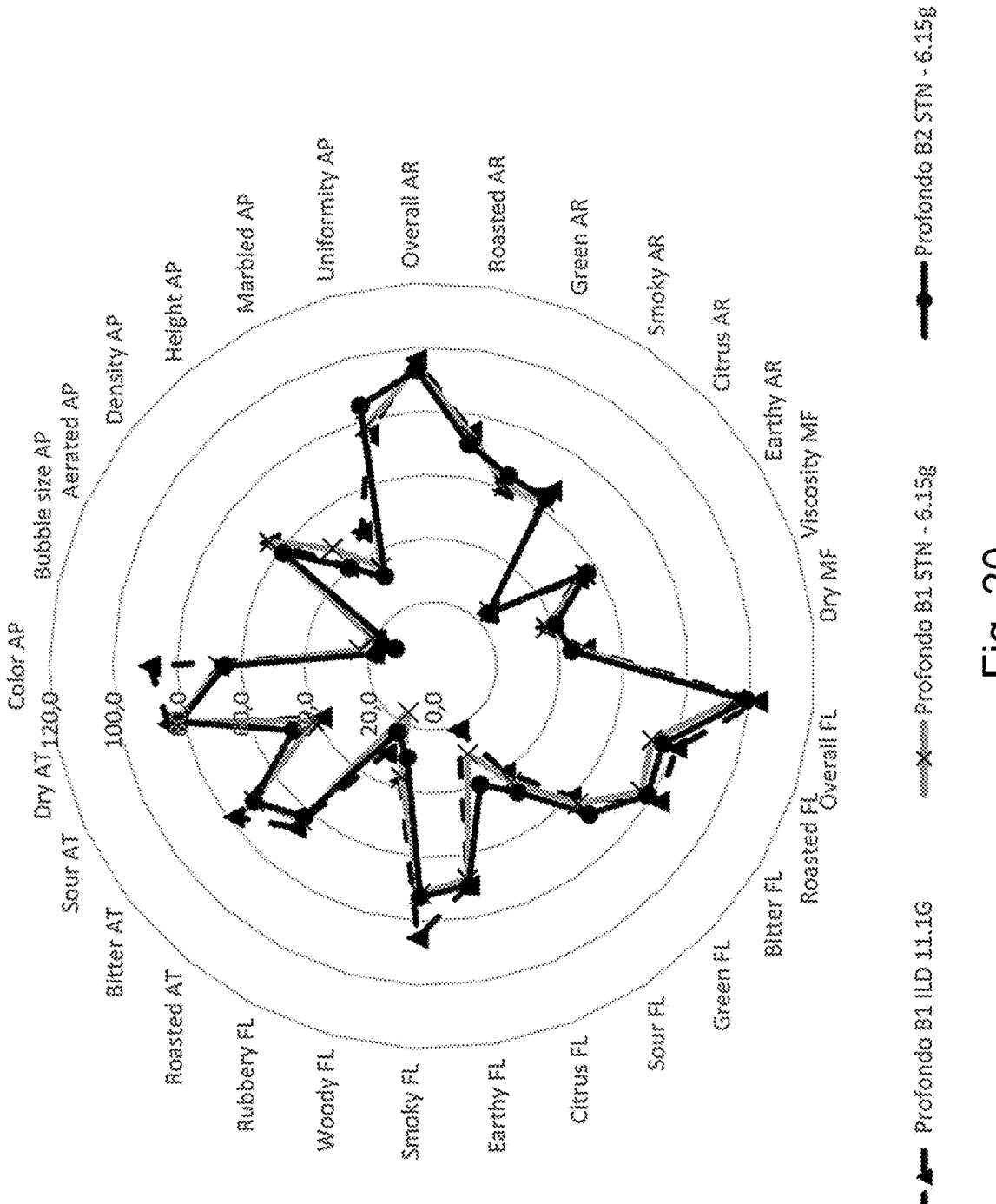
FIG. 20 is a spider plot in which a brew from a Profondo coffee blend batch1 (11.1 g) accommodated in an ILD-capsule is compared with a brew from a Profondo coffee blend batch 1 (6.15 g) and a brew from a Profondo coffee blend batch 2 (6.15 g) both in a STN capsule.

FIG. 20 is a spider plot in which a brew from a Profondo coffee blend batch1 (11.1 g) accommodated in an ILD-capsule is compared with a brew from a Profondo coffee blend batch 1 (6.15 g) and a brew from a Profondo coffee blend batch 2 (6.15 g) both in a STN capsule. Again, in this figure AR=aroma, AP=appearance, MF=mouthfeel, FL=flavour and AT is aftertaste. From the spider plot it can be concluded that the brew of the ILD-capsule is significantly darker in colour compared to the brew of the STN capsule. Also, the citrus flavour of the ILD-capsule with Profondo blend is significantly weaker compared to the brew of the STN capsule filled with the Profondo blend. Still, the ILD-capsule brew of Profondo is a good sensory match with the STN capsule brew.

Section II: Practical Embodiments.

Figure 21A:
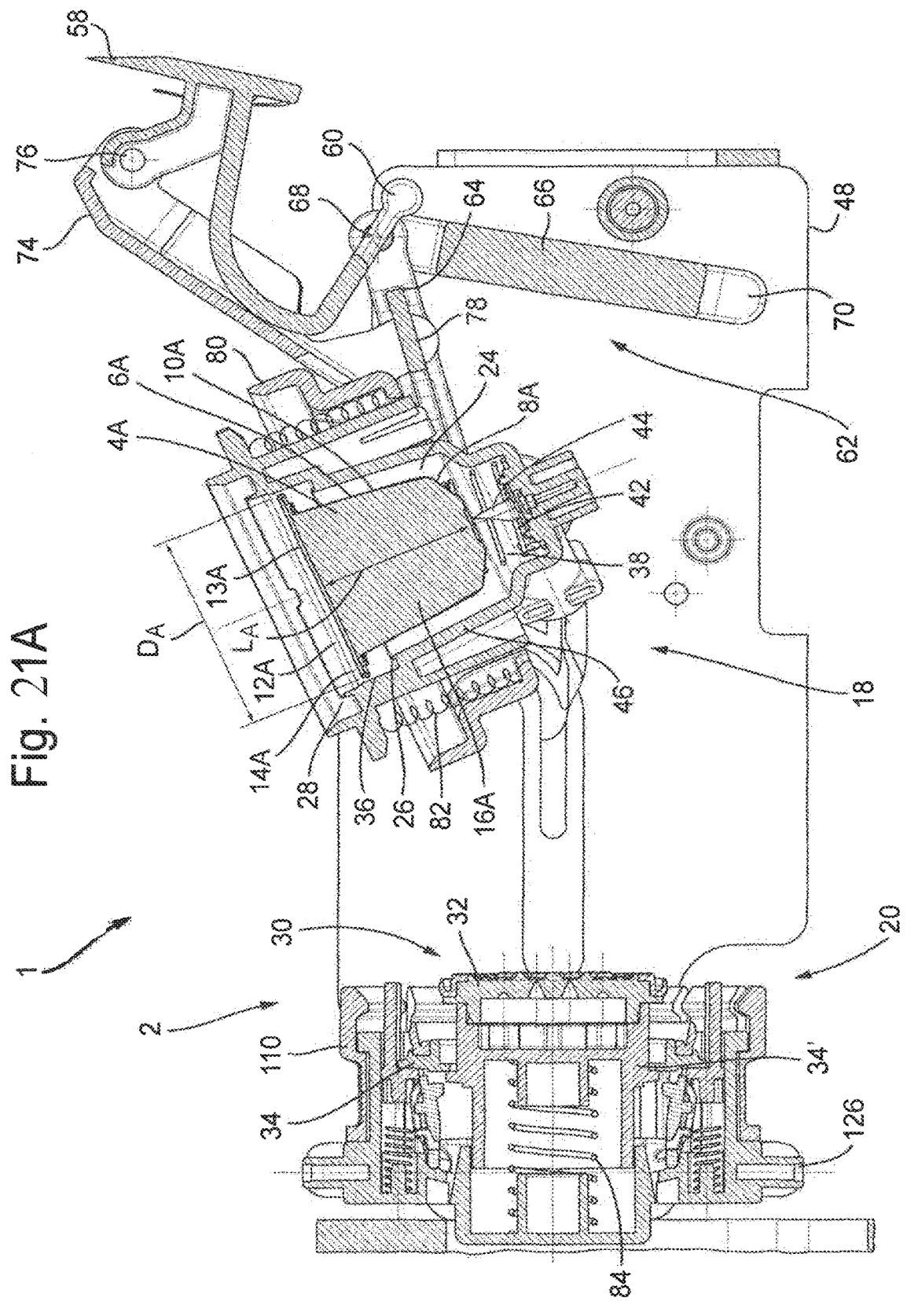
FIGS. 21A and 21B show schematic representations of a system.
Figure 21B:
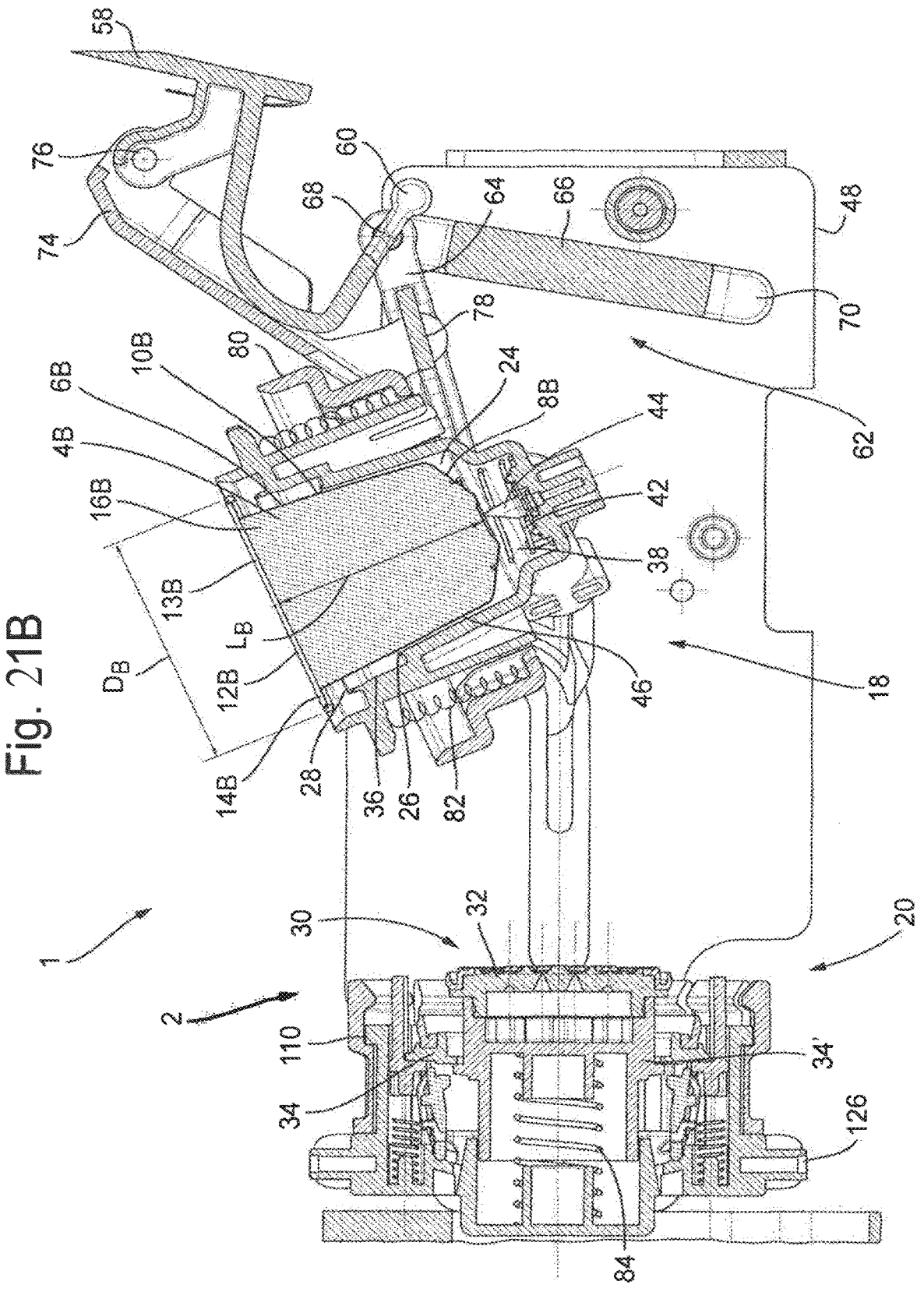

In this section reference is made to the following drawings:

FIGS. 21A and 21B show schematic representations of a system.

Figure 22A:
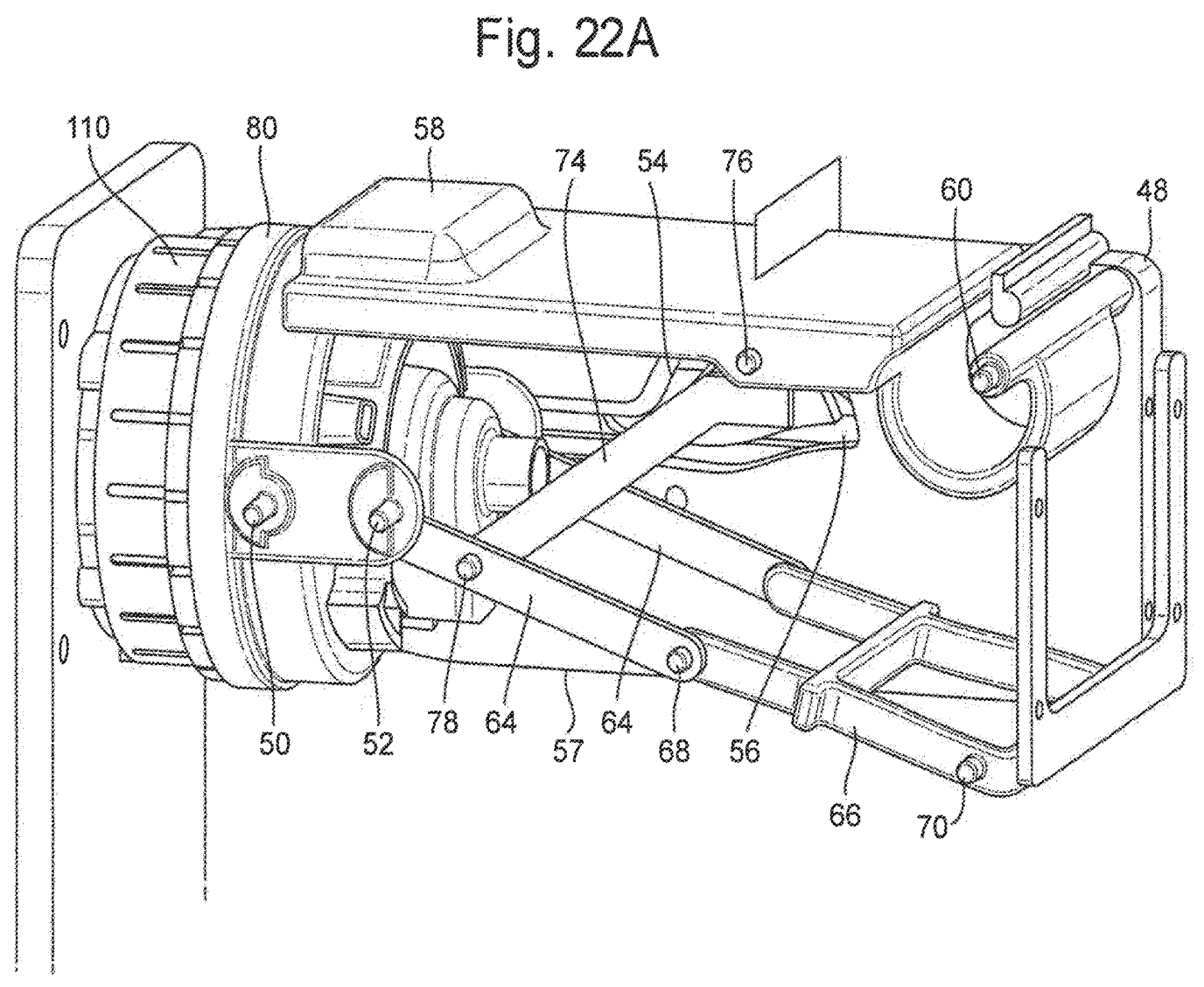

FIG. 22A shows a perspective side view of an apparatus in half-closed state.

Figure 22B:
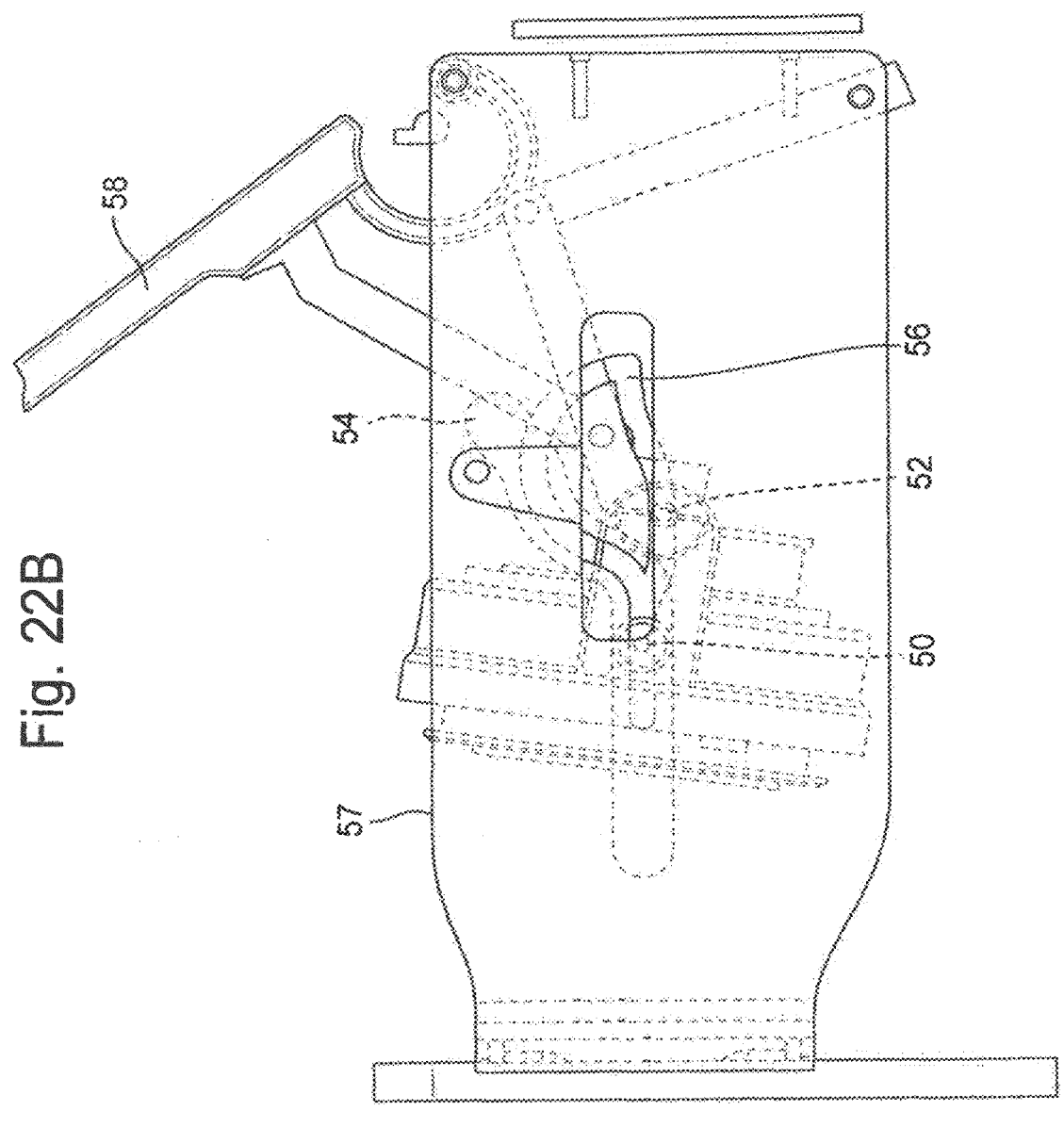
FIG. 22B shows a perspective side view of an apparatus in fully closed state.

FIG. 22B shows a perspective side view of an apparatus in fully closed state.

Figure 23A:
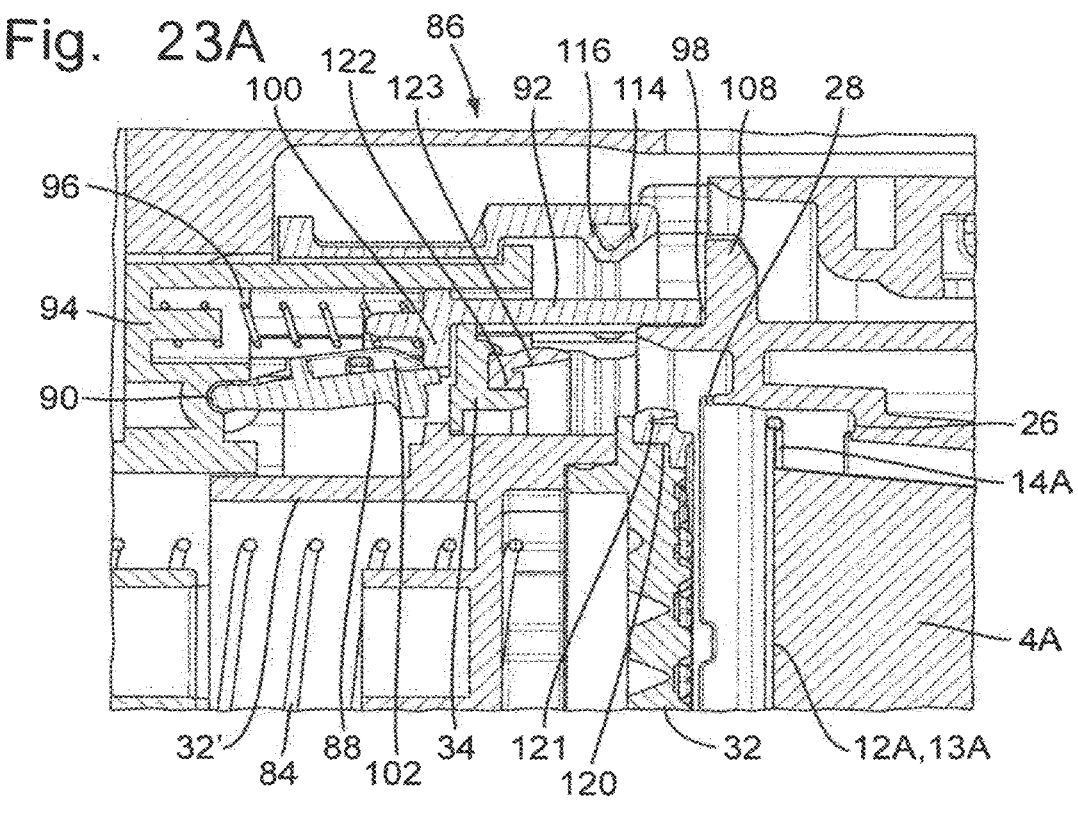
FIGS. 23A and 23B show the functioning of the locking mechanism of the system as shown in FIG. 21A when the cavity holds the capsule of the first type.
Figure 23B:
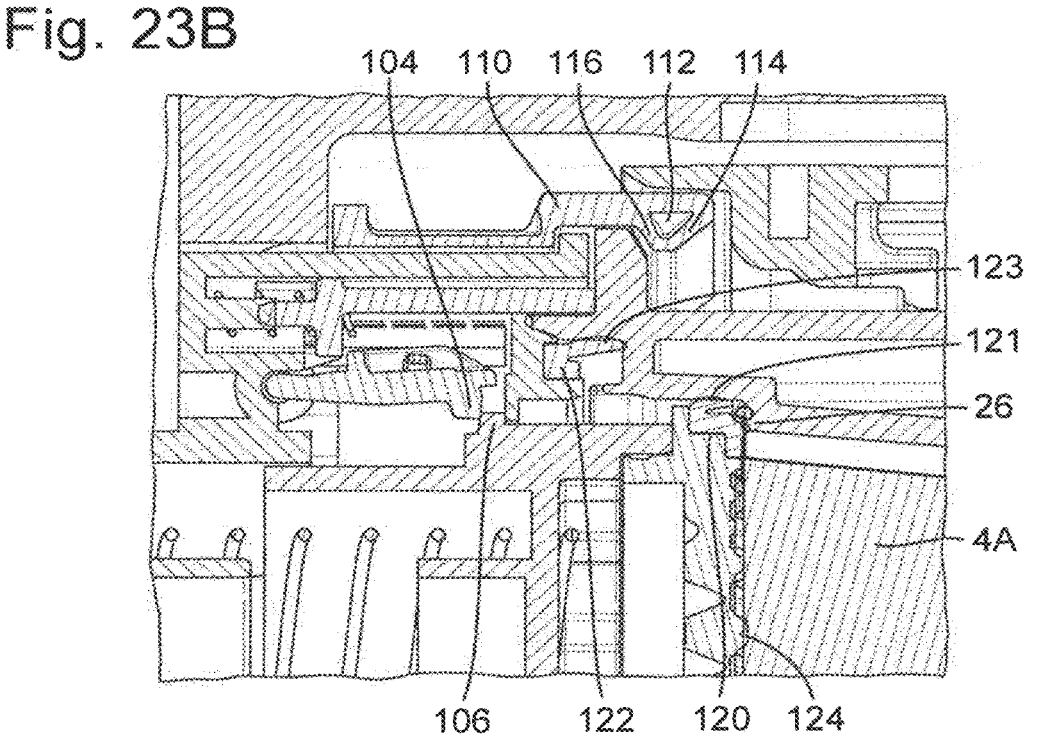

FIGS. 23A and 23B show the functioning of the locking mechanism of the system as shown in FIG. 21A when the cavity holds the capsule of the first type.

Figure 24A:
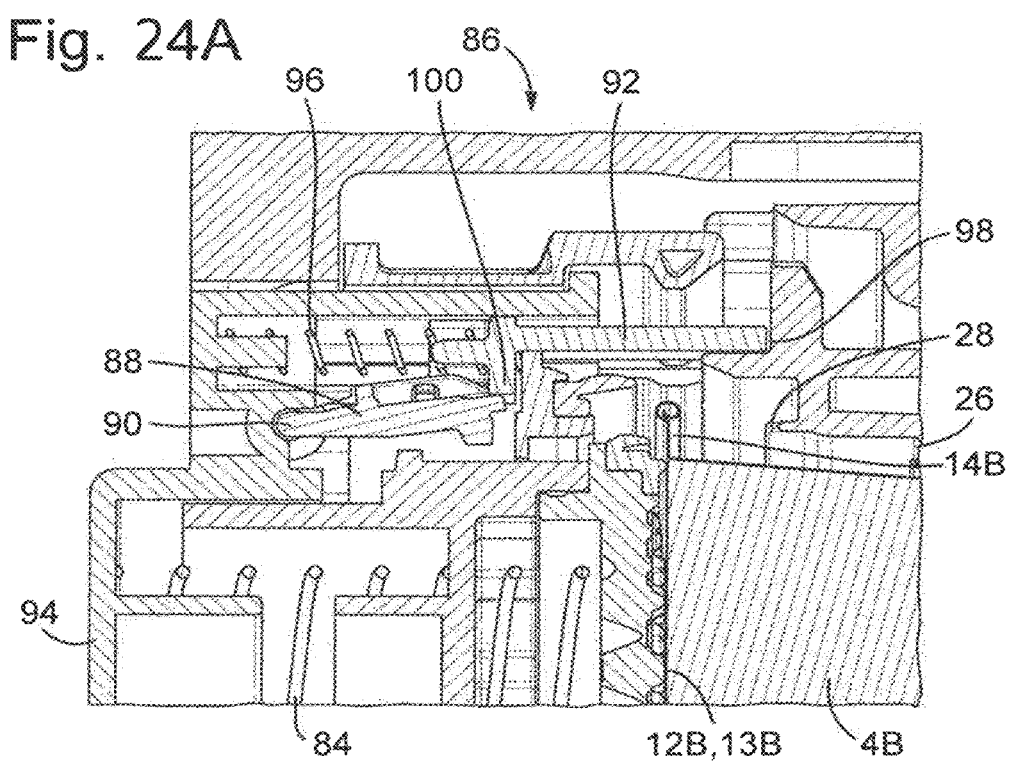
FIGS. 24A and 24B show the functioning of the locking mechanism of the system as shown in FIG. 21B when the cavity holds the capsule of the second type.
Figure 24B:
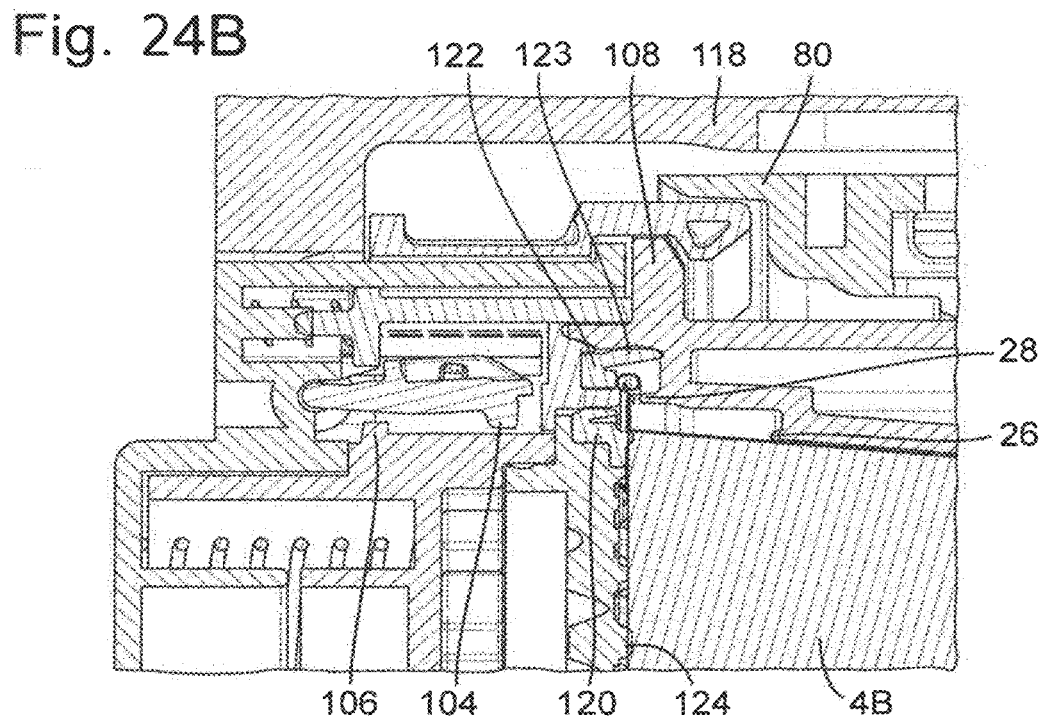

FIGS. 24 and 24B show the functioning of the locking mechanism of the system as shown in FIG. 21B when the cavity holds the capsule of the second type.

Figure 25A:
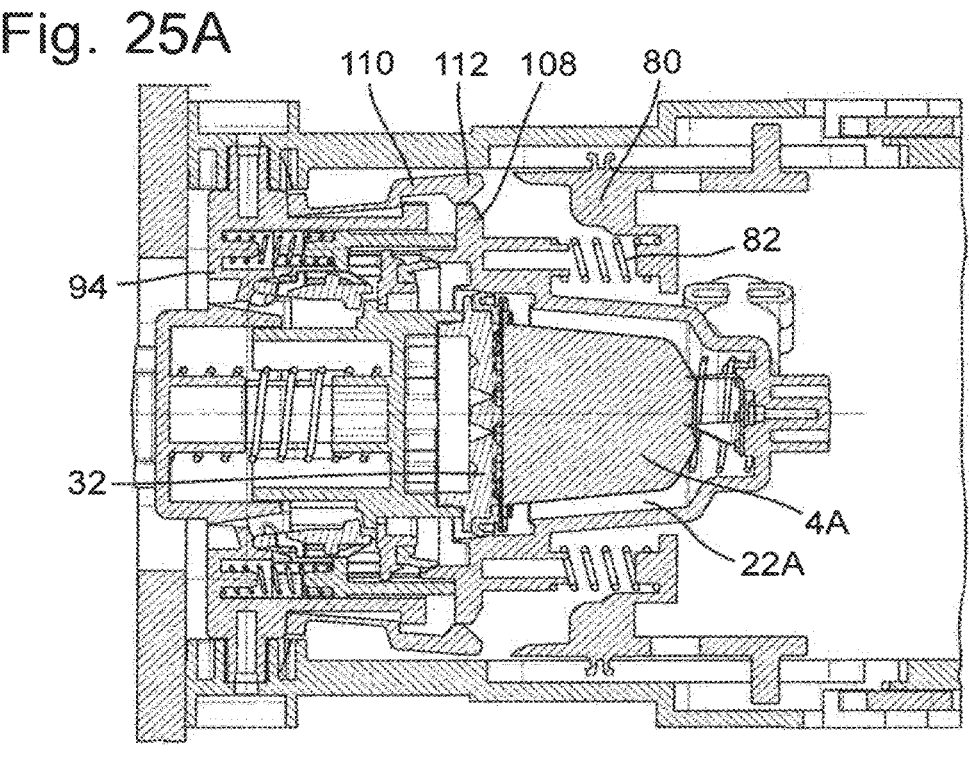
FIGS. 25A, 25B, and 25C show the functioning of the arresting ring of the system as shown in FIG. 21A when the cavity holds the capsule of the first type.
Figure 25B:
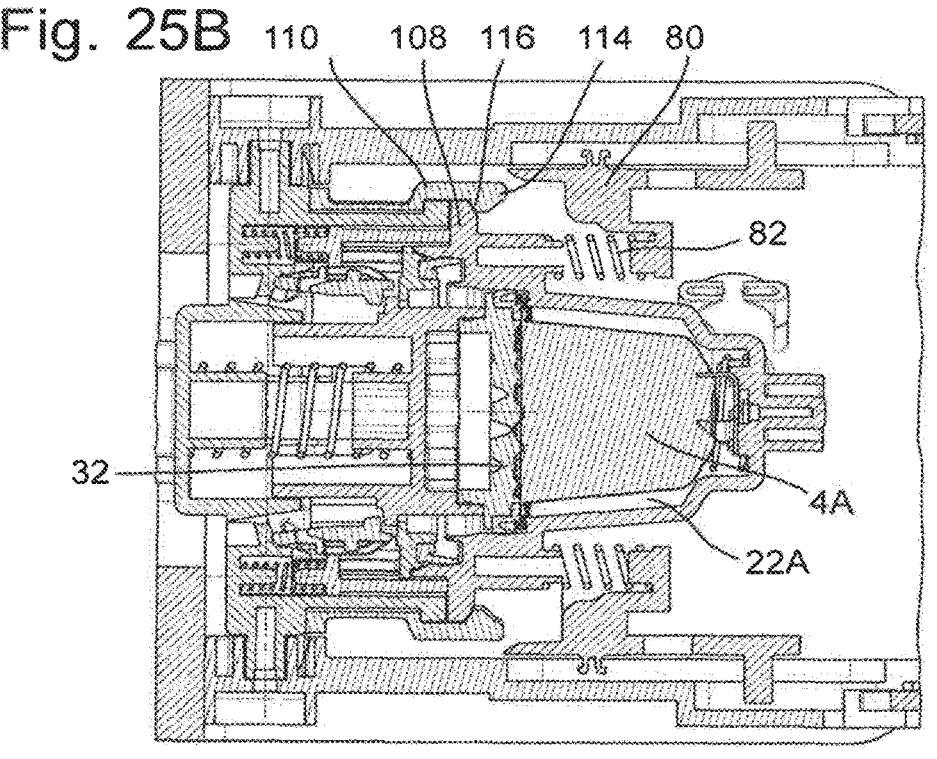
Figure 25C:
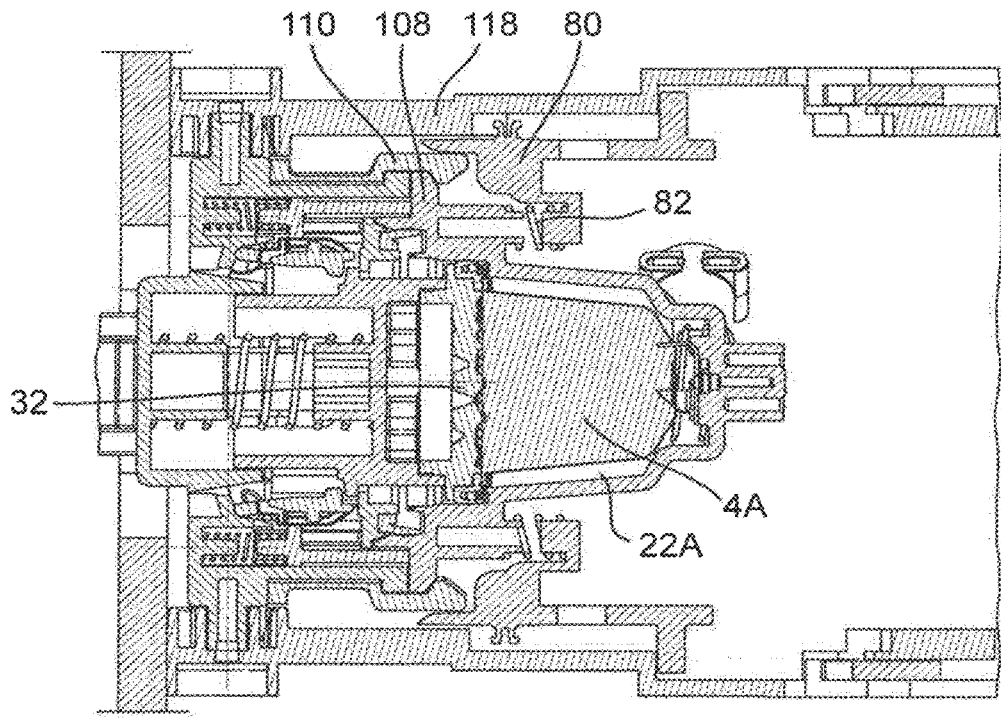

FIGS. 25A, 25B, and 25C show the functioning of the arresting ring of the system as shown in FIG. 21A when the cavity holds the capsule of the first type.

Figure 26A:
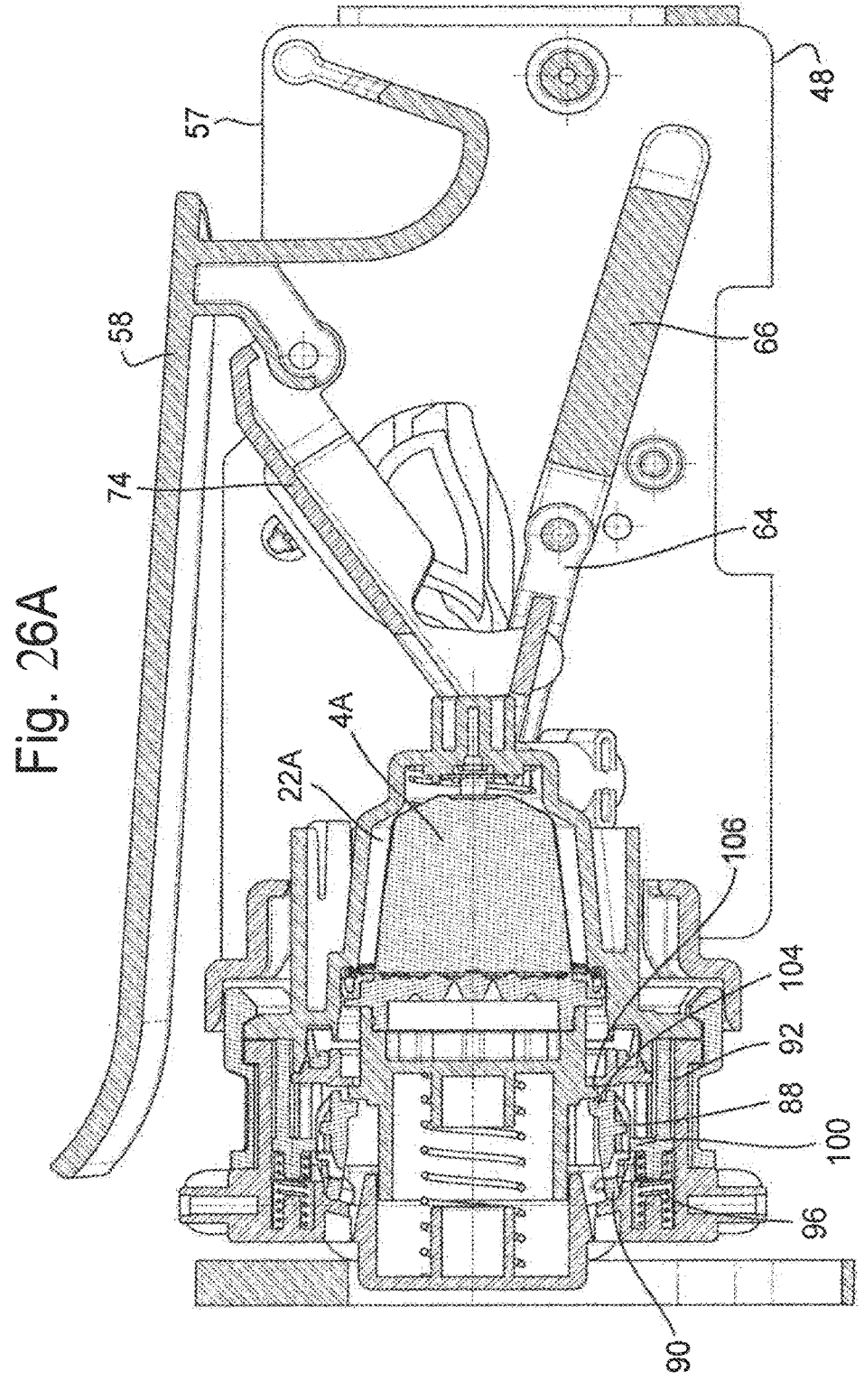
FIGS. 26A and 26B show the capsule of the first type in the brew chamber during extraction and the capsule of the second type in the brew chamber during extraction, respectively.
Figure 26B:
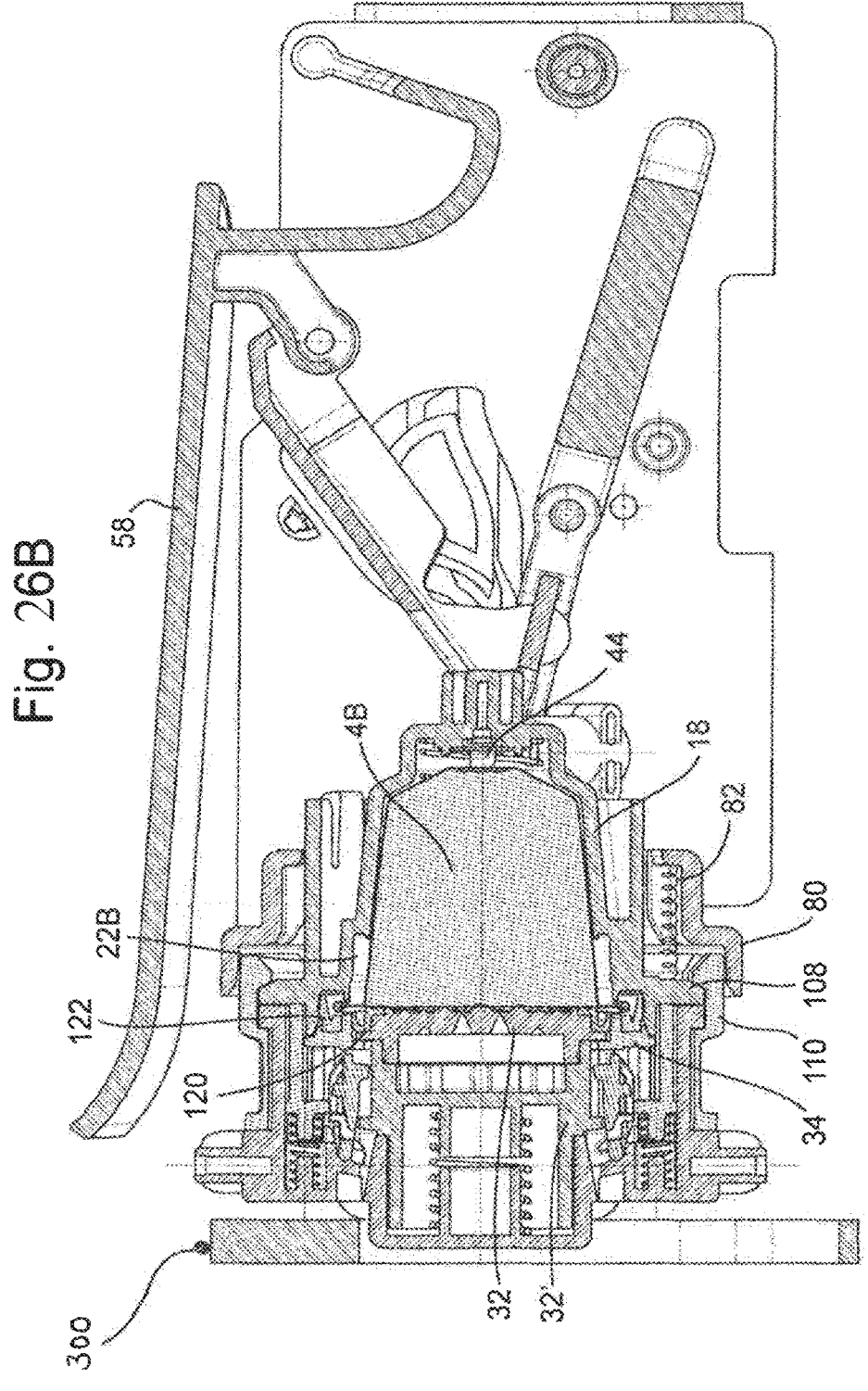

FIGS. 26A and 26B show the capsule of the first type in the brew chamber during extraction and the capsule of the second type in the brew chamber during extraction, respectively.

Figure 27A:
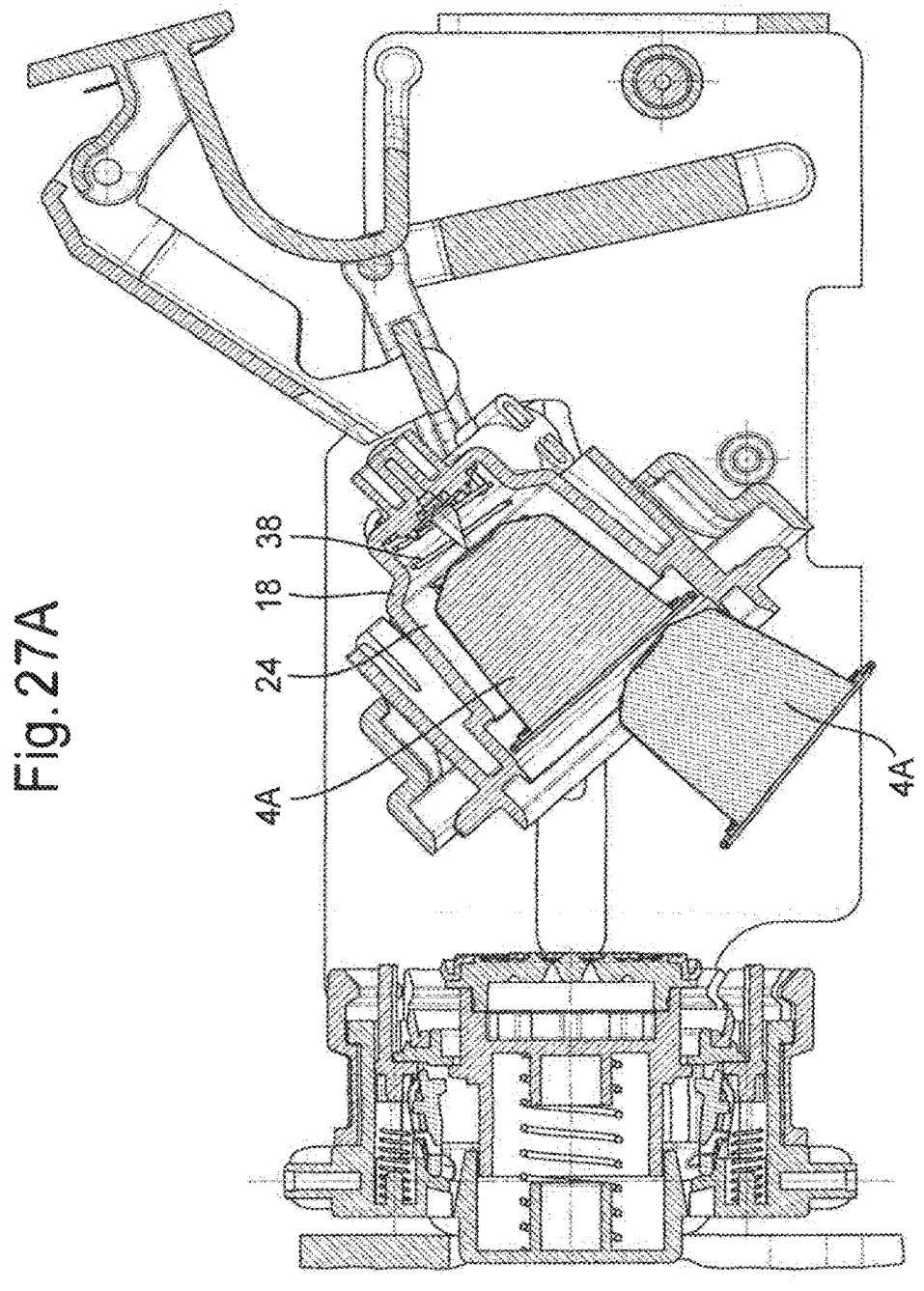
FIGS. 27A and 27B show the first brew chamber part swiveled downwards for ejection of the used first and capsule of the second type, respectively, from the cavity under the effect of gravity.
Figure 27B:
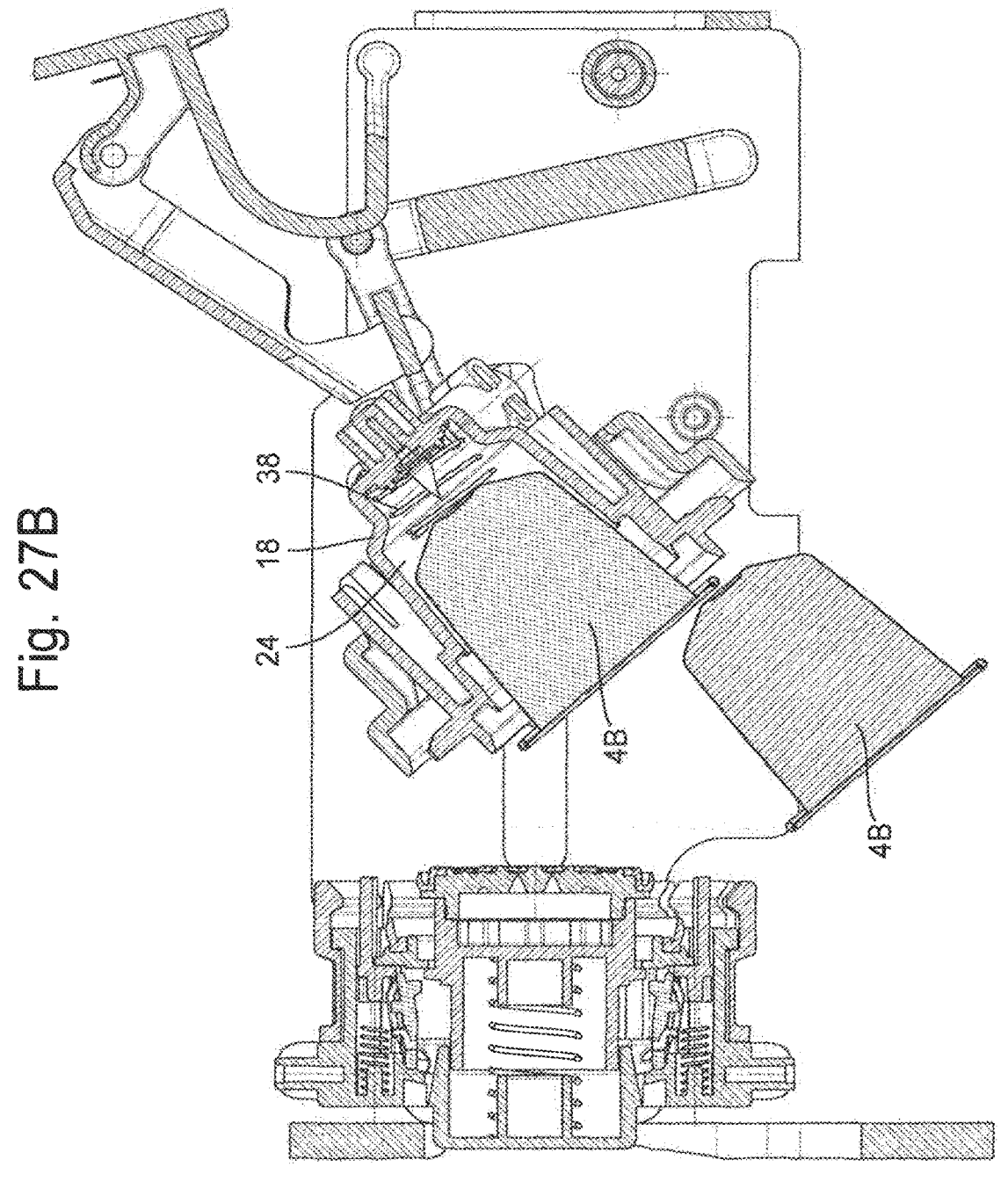

FIGS. 27A and 27B show the first brew chamber part swiveled downwards for ejection of the used first and capsule of the second type, respectively, from the cavity under the effect of gravity.

Figure 28A:
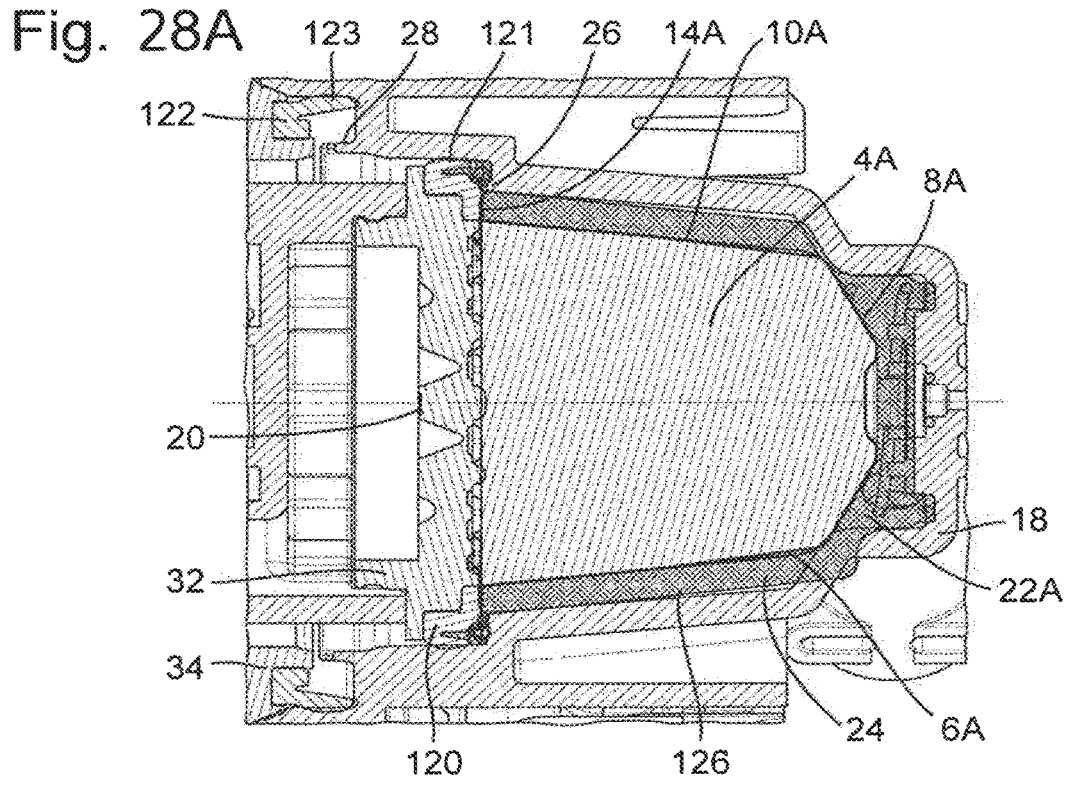
FIGS. 28A and 28B show an example of a capsule of the first type and capsule of the second type, respectively, inserted in the brew chamber formed by the first brew chamber part and the second brew chamber part.
Figure 28B:
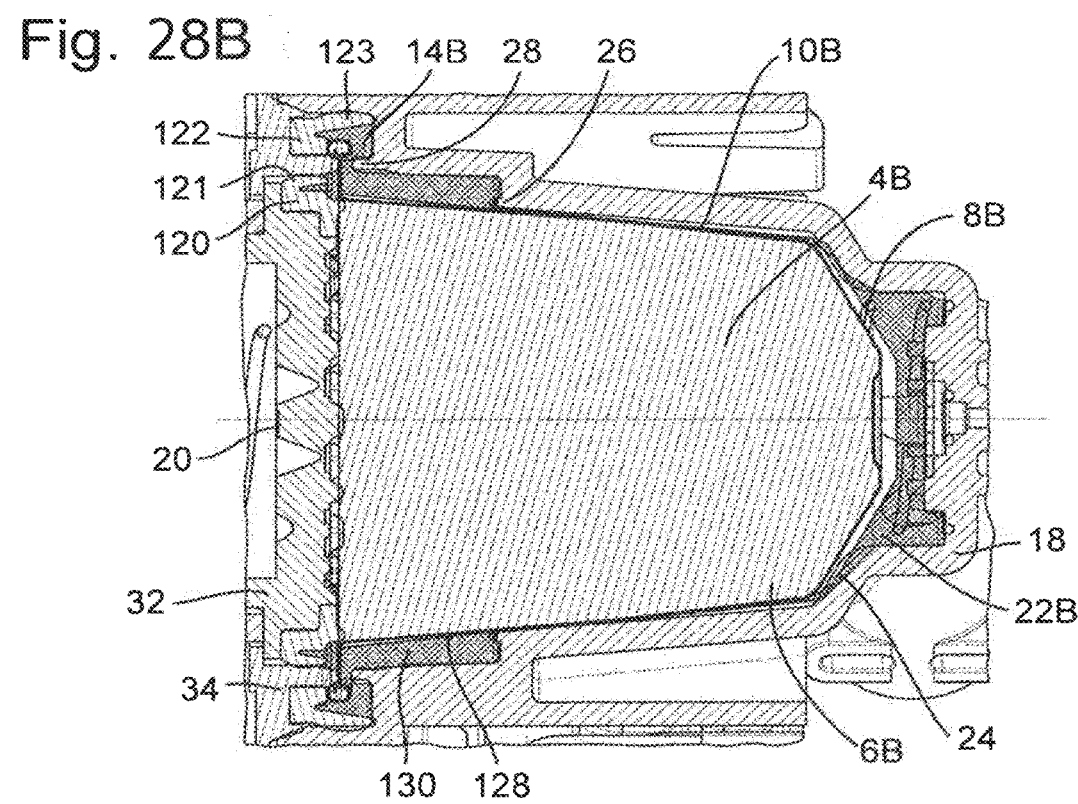

FIGS. 28A and 28B show an example of a capsule of the first type and capsule of the second type, respectively, inserted in the brew chamber formed by the first brew chamber part and the second brew chamber part.

Figure 29A:
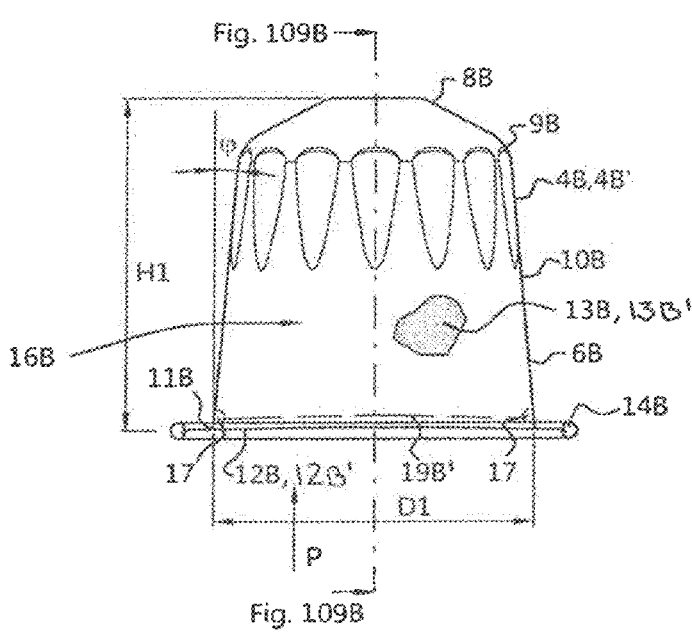
FIG. 29A shows a view of an embodiment of a capsule of the second type.

FIG. 29A shows a view of an embodiment of a capsule of the second type.

Figure 29B:
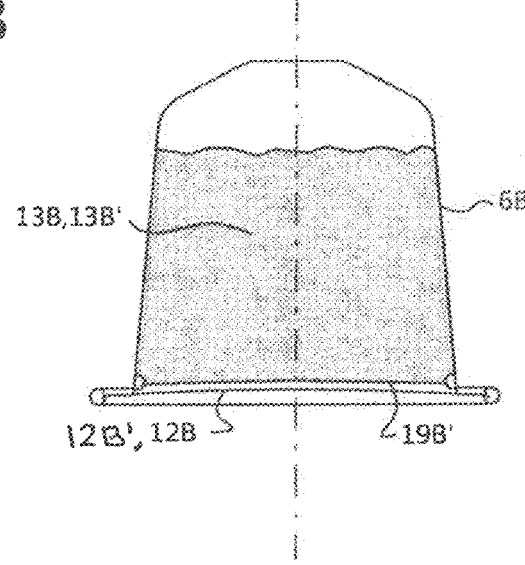
FIG. 29B shows a cross section of the capsule according to FIG. 29A.

FIG. 29B shows a cross section of the capsule according to FIG. 29A.

Figure 29C:
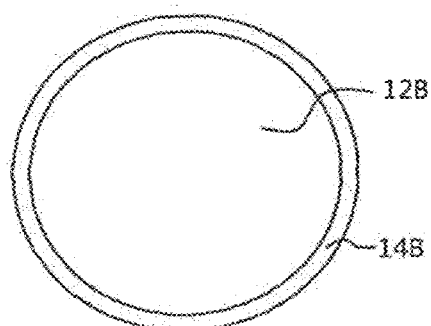
FIG. 29C shows a view of a possible embodiment of the lid in the direction of arrow P as shown in FIG. 29A.

FIG. 29C shows a view of a possible embodiment of the lid in the direction of arrow P as shown in FIG. 29A.

Figure 29D:
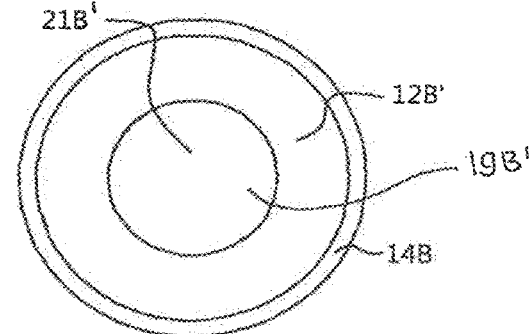
FIG. 29D shows a view of an alternative embodiment of the lid in the direction of arrow P as shown in FIG. 29A.

FIG. 29D shows a view of an alternative embodiment of the lid in the direction of arrow P as shown in FIG. 29A.

Figure 29E:
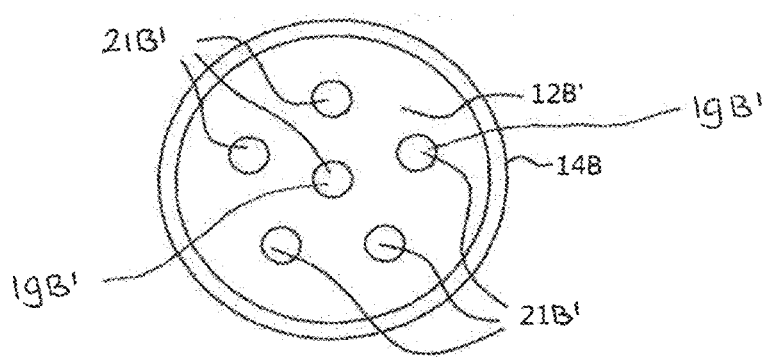
FIG. 29E a view of an alternative embodiment of the lid in the direction of arrow P as shown in FIG. 29A.

FIG. 29E shows a view of an alternative embodiment of the lid in the direction of arrow P as shown in FIG. 29A.

FIGS. 21A and 21B show schematic cross sectional views of a system 1 for preparing a beverage. The system includes an apparatus 2 and an exchangeable capsule. Here the system 1 is arranged for cooperating with a capsule 4A of the first type and a second capsule 4B of the second type. The apparatus 2 shown in FIGS. 21A and 21B is one and the same apparatus. The apparatus 2 is arranged for selectively cooperating with either the capsule 4A (see FIG. 21A) or the capsule 4B (see FIG. 21B). It will be appreciated that the system 1 can include the apparatus 2, the capsule 4A and the capsule 4B.

The capsules 4A, 4B are of a different type. In this example, the capsule 4B is larger than the capsule 4A. An axial length LB of the capsule 4B is larger than an axial length LA of the capsule 4A. A diameter DB of the capsule of the second type 4B is a larger than a diameter DA of the capsule of the first type 4A. Notwithstanding the differences, in this example the first and second capsules 4A, 4B are designed to make a similar visual impression. As explained above it is non obvious for the skilled man that the capsule of the second type has the same shape as the capsule of the first type in view of expected brewing behavior of such an enlarged capsule. The capsule of the second type is an embodiment of the ILS capsule as discussed above. The capsule of the first type is an embodiment of the standard capsule as discussed above. The first and second capsules 4A, 4B are designed to have a family look and feel. Here a ratio of the axial length and diameter LA/DA of the capsule of the first type 4A is substantially the same as a ratio of the axial length and diameter LB/DB of the capsule of the second type 4B. Preferably, the length to diameter ratio of the first and second capsules is identical within 20%, preferably within 10%, e.g. identical.

In view of the similarity, both capsules 4A, 4B will now be described simultaneously. In this example, the capsules 4A, 4B both include a cup-shaped body 6A, 6B. Here the cup-shaped body 6A, 6B includes a bottom 8A 8B and a circumferential wall 10A, 10B. The bottom 8A, 8B and the circumferential wall 10A, 10B can form a monolithic part. The capsules 4A, 4B both include a lid 12A, 12B. The lid 12A, 12B closes off an open end of the cup-shaped body 6A, 6B. The lid 12A, 12B includes an exit area 13A, 13B through which beverage can be drained from the capsule as explained below. In this example the lid 12A, 12B is connected to a flange-like rim 14A, 14B of the capsule 4A, 4B. Here the rim 14A, 14B is an outwardly extending rim. The bottom 8A, 8B, the circumferential wall 10A, 10B and the rim 14A, 14B can form a monolithic part. Here the exit area 13A, 13B defines the area of the lid 12A, 12B through which the beverage can potentially exit the capsule 4A, 4B. Hence, an area of the lid 12A, 12B sealed to the rim 14A, 14B does not constitute part of the exit area 13A, 13B. In this example, the capsules 4A, 4B are substantially rotation symmetric around an axis extending from the bottom 8A, 8B to the lid 12A, 12B. The cup-shaped body 6A, 6B and the lid 12A, 12B enclose an internal space 16A, 16B of the capsule. The internal space 16A, 16B includes a quantity of beverage ingredient, such as an extractable or soluble substance. The beverage ingredient can e.g. be roast and ground coffee, tea, or the like. The beverage ingredient can be powdered coffee. The beverage ingredient can be a liquid. In view of the difference in size of the capsules 4A, 4B it will be appreciated that the capsule of the second type 4B can include a larger quantity of beverage ingredient than the capsule of the first type 4A. In this example, the internal space 16B of the capsule of the second type 4B is about twice the internal space 16A of the capsule of the first type 4A. For example, the capsule of the first type 4A may include 4-8 grams, e.g. about 6 grams, of ground coffee. For example, the capsule of the second type 4B may include 8-16 grams, e.g. about 12 grams, of ground coffee.

The cup-shaped body 6A, 6B can be manufactured from a metal foil, such as aluminum foil, a plastics material, such as polypropylene or polyethylene, or a combination thereof. The cup-shaped body 6A, 6B can be manufactured by pressing, deep-drawing, vacuum forming, injection moulding or the like. The lid can be manufactured from a metal foil, such as aluminum foil, a plastics material, such as polypropylene or polyethylene, or a combination thereof. In the example the capsules 4A, 4B are so-called closed capsules. This indicates capsules that are hermetically closed prior to insertion into the apparatus. The closed capsules can be opened by the apparatus as described below. Alternatively, non-sealed or refillable capsules could also be used.

The apparatus includes a first brew chamber part 18 and a second brew chamber part 20. The first and second brew chamber parts 18, 20 can be closed against each other to form a brew chamber 22A, 22B (not shown in FIGS. 21A, 21B).

The first brew chamber part 18 includes a cavity 24. The cavity 24 is arranged for receiving the first or second capsule 4A, 4B. Here the cavity 24 of the first brew chamber part 18 is a predetermined cavity 24 arranged for holding the capsule of the first type 4A or the capsule of the second type 4B. Here the cavity 24 has an invariable shape for holding the capsule of the first type or the capsule of the second type. Here the first brew chamber part 18 is arranged for holding the capsule of the first type or capsule of the second type without changing a configuration of the first brew chamber part 18. In this example the first brew chamber part 18 is a monolithic part. In this example the first brew chamber part 18 includes a first abutment surface 26. The first abutment surface is positioned inside the cavity 24. Here the first abutment surface 26 is a first generally annular abutment surface. The first generally annular abutment surface 26 can be continuously annular, or it may be interrupted annular, such as comprising a plurality of segments along an annulus. The first abutment surface 26 may for example take the shape of one or more, e.g. arched, ridges which protrude into cavity 24. Here the first abutment surface 26 provides the cavity 24 with a stepped shape. In this example the first brew chamber part 18 includes a second abutment surface 28. The second abutment surface is positioned near the open end of the cavity 24. Here the second abutment surface 28 is a second generally annular abutment surface. The second generally annular abutment surface 28 can be continuously annular, or it may be interrupted annular, such as comprising a plurality of segments along an annulus. The second abutment surface 28 may for example take the shape of one or more, e.g. arched, ridges. It will be appreciated that the first abutment surface 26 and the second abutment surface 28 are spaced at a mutual distance in an axial direction of the first brew chamber part 18. The first abutment surface 26 and the second abutment surface are positioned at a fixed spacing. The first abutment surface 26 and the second abutment surface are immobile relative to each other. Here, the first brew chamber part 18 includes an ejector 38. The ejector 38 can includes a conical ring and/or and a resilient element 42, here a helical spring. The first brew chamber part 18 includes piercing means 44 for piercing the bottom of the capsule. Here the piercing means includes a plurality of knives, such as three knives.

The second brew chamber part 20 includes an extraction plate 30. In this example, the extraction plate 30 includes a central portion 32 and a peripheral portion 34. The central portion 32 is movable relative to the peripheral portion 34. Here the central portion 32 is movable in an axial direction of the second brew chamber part 20.

The system 1 as described thus far can be used for preparing a beverage as follows. Further features of the system 1 will be explained along the way.

In the example of FIGS. 21A and 21B the apparatus 2 is in a state ready for receiving a capsule. In FIGS. 21A and 21B the capsule 4A, 4B has just been inserted into the cavity of the first brew chamber part 18. The first brew chamber part 18 is in an inclined position. The open end of the cavity 24 points upwards.

As shown in FIG. 21A, the capsule of the first type 4A can fall into the cavity 24 under the influence of gravity. Herein the rim 14A of the capsule of the first type 4A is guided by an inner surface 36 of the first brew chamber part 18. The bottom 8A of the capsule of the first type 4A lowers into the cavity 24 until it abuts against the ejector 38. Here the bottom 8A of the capsule of the first type 4A centers on the ejector 38. It will be appreciated that the rim 14A of the capsule of the first type 4A is positioned between the first abutment surface 26 and the second abutment surface 28. The bottom 8A of the capsule of the first type 4A is not yet pierced in this state.

As shown in FIG. 21B, the capsule of the second type 4B can also fall into the cavity 24 under the influence of gravity. Herein the circumferential wall 10B of the capsule of the second type 4B is guided by an inner surface 46 of the first brew chamber part 18. The bottom 8B of the capsule of the second type 4B lowers into the cavity 24 until it abuts against the ejector 38. Here the bottom 8B of the capsule of the second type 4B centers on the ejector 38. It will be appreciated that the rim 14B of the capsule of the second type 4B is positioned beyond the second abutment surface 28 when seen from the piercing means 44. The bottom 8B of the capsule of the second type 4B is not yet pierced in this state.

Once the capsule 4A, 4B is inserted into the cavity 24 as shown in FIGS. 21A and 21B, the first brew chamber part 18 can be moved towards the second brew chamber part 20 for closing the brew chamber around the capsule 4A, 4B. The first brew chamber part 18 is guided in a frame 48 of the apparatus.

In this example the first brew chamber part 18 includes first bosses 50 and second bosses 52 as shown in FIGS. 22A and 22B. The first bosses 50 are guided in a first groove 54 of the frame 48. The second bosses 52 are guided in a second groove 56 of the frame 48. It will be appreciated that the bosses 50, 52 and grooves 54, 56 determine the path that will be followed by the first brew chamber part 18. Here the first groove 54 and the second groove 56 are provided in a side wall 57 of the frame 48. The first groove 54 extends into the side wall 57 to a first depth. The second groove 56 extends into the side wall to a second depth. The second depth is larger than the first depth. The first boss 50 has a larger diameter than the second boss 52. The first groove 54 has a larger width than the second groove 56. The width of the first groove 54 corresponds to the diameter of the first boss 50. The width of the second groove 56 corresponds to the width of the second boss 52. It will be appreciated that the first groove 54 extends along a different trajectory than the second groove 56. The different widths and depths of the grooves allow the first and second bosses 50, 52 to follow different trajectories. This construction allows a very compact construction for guiding the first and second bosses 50, 52.

The apparatus 2 includes a lever 58. The lever can be actuated manually by a user. The lever is pivotally connected to the frame 48 around a lever axis 60. The first brew chamber part 18 is connected to the frame 48 via a knee joint 62. The knee joint 62 includes a push rod 64 and a crank 66. The push rod 64 is pivotally connected to the crank 66 at a knee axis 68. The crank 66 is pivotally connected to the frame 48 at a crank axis 70. The lever 58 is connected to the knee joint 62 for actuating the first brew chamber part 18 in motion. Here the lever 58 is connected to the knee joint 62 through a lever link 74. The lever link 74 is pivotally connected to the lever 58 at a lever link axis 76. The lever link 74 is pivotally connected to the push rod 74 at a knee link axis 78.

An arresting ring 80 is arranged surrounding the first brew chamber part 18. The arresting ring 80 is axially movable relative to the first brew chamber part 18. Here, the arresting ring 80 is guided by an external surface of the first brew chamber part 18. The arresting ring is connected to the first brew chamber part via one or more resilient elements 82, here helical springs. The push rod is pivotally connected to the arresting ring 80 at a push rod axis 72. Hence, here the knee joint 62 is indirectly connected to the first brew chamber part 18, viz. via the arresting ring 80 and one or more resilient elements 82. The function of the arresting ring will be set out below.

When the lever 58 is moved in a downward direction the knee joint 62 will push the first brew chamber part 18 towards the second brew chamber part 20. Simultaneously, due to the shape of the first and second grooves 54, 56, the first brew chamber part 18 will be rotated from the upwards inclined orientation into a an aligned orientation in which an axial direction of the first brew chamber part 18 is aligned with an axial direction of the second brew chamber part 20.

As mentioned above, the apparatus 2 is arranged for selectively cooperating with either the capsule of the first type 4A or the capsule of the second type 4B. Here, the system 1 is arranged for automatically adjusting the brew chamber depending on whether the capsule of the first type 4A or the capsule of the second type 4B (or 4B', see below) has been inserted. This provides the advantage that no user input is required for selecting proper handling of the first or capsule of the second type. Hence, the risk of errors is greatly reduced.

As mentioned, the second brew chamber part 20 includes an extraction plate 30 with a central portion 32 and a peripheral portion 34. Here the central portion 32 is movable in an axial direction of the second brew chamber part 20. The central portion 32 in this example includes a shaft 32' axially slidably movable with respect to the frame 48. The central portion 32 is connected to the frame 48 via a resilient member 84, here a helical spring. The resilient member 84 biases the central portion into a ready position in FIGS. 21A and 22B. The ready position is an extended position in this example. The central portion 32 can be positioned in a first brewing position for cooperating with the capsule of the first type 4A. The central portion can be positioned in a second brewing position for cooperating with the capsule of the second type 4B. In this example, the system 1 includes a locking mechanism 86 arranged for locking the central portion 32 in or near the first brewing position when the cavity 24 holds the capsule of the first type 4A.

The locking mechanism 86 includes a locker 88. Here the locker 88 is designed as a pivotable finger, pivotable around a pivoting axis 90. The locker 88 is biased into a position pivoted away from the shaft 32'. The locker could also be biased into any other suitable position. The locking mechanism 86 further includes a pusher 92. The pusher is slidably guided in a body 94 of the second brew part 20. The pusher 92 is connected to the body 94 via a resilient member 96, here a helical spring. The resilient member 96 biases the pusher in an extended position. The first brew chamber part 18 includes an actuator 98. Here the actuator is formed by a frontal surface of the first brew chamber part 18.

FIGS. 23A and 24B show functioning of the locking mechanism 86 when the cavity 24 holds the capsule of the first type 4A. In this example, an outermost part of the capsule of the first type 4A, here formed by the lid 12A, exit area 13A and/or rim 14A, is positioned rearwardly, i.e. more towards the piercing means 44, relative to the actuator 98. As a result, when advancing the capsule of the first type 4A towards the second brew chamber part 20, the actuator 98 will touch the pusher 92 before the outermost part of the capsule of the first type 4A will touch the central portion 32. The pusher is pushed against the biasing force of the resilient member 96. A lip 100 of the pusher 92 will slide along a sloping surface 102 of the locker 88, causing the locker 88 to pivot towards the shaft 32'. As a result, a thumb 104 of the locker 88 is placed in a path of movement of part 106 of the central portion 32 (see FIG. 23B). When the capsule of the first type 4A is advanced further towards the second brew chamber part 20 the capsule of the first type 4A will abut against the central portion 32. This can cause the central portion to be pushed against the biasing force of the resilient member 84. The pivoted locker 88 prevents travel of the central portion beyond a position where the part 106 abuts against the thumb 104. This is herein defined as the first brewing position. Hence, the capsule of the first type 4A is arranged for moving the central portion 32 from the ready position to the first brewing position. The capsule of the first type 4A is held between the first and second brew chamber parts 18, 20 while brewing, wherein the central portion 32 is in the first brewing position.

FIGS. 24A and 24B show functioning of the locking mechanism 86 when the cavity 24 holds the capsule of the second type 4B' (or 4B'). In this example, an outermost part of the capsule of the second type 4B, here formed by the lid 12B, exit area 13B and/or rim 14B, is positioned forwardly, i.e. more towards the second brew chamber part 20, relative to the actuator 98. As a result, when advancing the capsule of the second type 4B towards the second brew chamber part 20, the outermost part of the capsule of the second type 4B will abut against the central portion 32 before the actuator 98 will touch the pusher 92. The central portion 32 is pushed against the biasing force of the resilient member 84 while the locker 88 is still pivoted away from the shaft 32'. As a result, the part 106 passed underneath the thumb 104. Only after the part 106 has passed the thumb 104 the pusher is pushed against the biasing force of the resilient member 96 by the actuator 98. The lip 100 of the pusher 92 will still slide along the sloping surface 102 of the locker 88, causing the locker 88 to pivot towards the shaft 32'. However, the part 106 has already passed the thumb 104 at that moment. In this example, the capsule of the second type 4B pushes the central portion 32 in abutment with the body 94. This is herein defined as the second brewing position. Hence, the capsule of the second type 4B is arranged for moving the central portion 32 from the ready position to the second brewing position. The capsule of the second type 4B is held between the first and second brew chamber parts 18, 20 while brewing, wherein the central portion 32 is in the second brewing position.

Thus, the locking mechanism 86 is arranged for locking the central portion 32 in the first extraction position when the cavity 24 holds the capsule of the first type 4A. It is noted that the locking may be single-sided, viz. the locking mechanism may prevent the central portion 32 from being moved beyond the first extraction position when the cavity 24 holds the capsule of the first type 4A. However, movement of the central portion 32 from the first extraction position to the ready position may be not prevented. The locking unit 86 is arranged for selectively preventing the central portion 32 being locked in or near the first brewing position when the capsule of the second type 4B is included in the brew chamber. The locking unit 86 is arranged for selectively allowing the central portion 32 being moved into the second brewing position when the capsule of the second type is included in the brew chamber.

When comparing FIGS. 23A and 24A it will be appreciated that while advancing the first brew chamber part 18 towards the second brew chamber part 20 the capsule of the first type 4A is recessed further into the first brew chamber part than the capsule of the second type 4B. Then the first lid 12A, exit area 13A and/or rim 14B is recessed further into the first brew chamber part 18 than the second lid 12B, exit area 13B and/or rim 14B.

When comparing FIGS. 23B and 24B it will be appreciated that when the brew chamber holds the capsule of the first type 4A, the central portion 32 extends into the cavity 24. The central portion 32 extends into the first brew chamber part 18 beyond a position where the lid 12B, exit area 13B and/or rim 14B of the capsule of the second type 4B would have been, had the capsule of the second type been included in the first brew chamber part 18.

As mentioned above, the knee joint 62 is indirectly connected to the first brew chamber part 18, viz. via the arresting ring 80 and one or more resilient elements 82. FIGS. 25A-25C demonstrate functioning of the arresting ring 80.

In FIG. 25A the capsule of the first type 4A abuts against the central portion 32 with the central portion in the first brewing position. The arresting ring 80 is still in the rearward position. It will be appreciated that the lever 58 will not yet have reached its end position. The first brew chamber part 18 includes a protrusion 108. Here the protrusion 108 is a substantially annular protrusion. The protrusion 108 extends outwardly. Here the protrusion 108 forms an outermost edge of the first brew chamber part 18. The second brew chamber part 20 includes a retainer 110. Here the retainer 110 is designed as a circumferential ring of retainer lips. The retainer 110 is pivotally connected to the body 94. Here the retainer 110 is resiliently pivotally connected to the body 94. The retainer 110 includes a tooth 112. The tooth here has a first inclined surface 114 and a second inclined surface 116.

When lowering the lever 58, the arresting ring 80 will be advanced towards the second brew chamber part 20. The one or more resilient elements 82 will push the first brew chamber part 18 ahead of the arresting ring 80 until the first brew chamber part abuts against the second brew chamber 20 part, e.g. with the capsule 4A, 4B clamped in between. During this movement, the protrusion 108 will advance against the first inclined surface 114. This causes the retainer 110 to be pivoted outwardly (see FIG. 25A). Further advancing causes the protrusion 108 to pass beyond the second inclined surface 116, causing the retainer 110 to pivot inwardly (see FIG. 25B). Further lowering of the lever 58 first brew chamber part abuts against the second brew chamber 20 part will cause the one or more resilient elements 82 to be compressed. As a result, the arresting ring 80 will advance towards the second brew chamber part 20. Fully lowering the lever 58 will cause the arresting ring 80 to be interposed between the retainer 110 and a locking ring 118 (see FIG. 25C). The arresting ring 80 surrounding the retainer 110 prevents the retainer 110 from pivoting outwardly. Hence, the first brew chamber part is locked with respect to the second brew chamber part 20. The first brew chamber part is locked onto the second brew chamber part 20.

The apparatus can include a fluid supply system for supplying a fluid, e.g. a liquid, such as hot water under pressure, to the first brew chamber part 18. When the brew chamber is pressurized with the fluid for brewing a beverage, the first and second brew chamber parts 18, 20 will be pushed away from each other by the fluid pressure. The retainer 110 and arresting ring 80, and optionally the locking ring 118, will bear all, or part of, the force exerted by the fluid pressure. The arresting ring 80 interposed between the retainer 110 and the locking ring 118 increases mechanical stability. The arresting ring 80 does not have to bear all forces exerted onto it by the retainer 110, since it can abut against the locking ring 118 and transmit at least part of the forces to the locking ring 118. The locking ring 118 can be immobile, and hence can easily be reinforced. Since the first brew chamber part is locked onto the second brew chamber part 20 the frame 48 and the actuation mechanism, e.g. the knee joint, do not have to bear this force, or at least a smaller part thereof. Hence the frame and/or the actuation mechanism can be designed weaker and/or cheaper.

Although the functioning of the arresting ring 80 has been shown in FIGS. 25A-25C with respect to the capsule of the first type 4A, it will be appreciated that the arresting ring 80 can function identically with respect to the capsule of the second type 4B. FIG. 26A shows the capsule of the first type 4A in the brew chamber during extraction. FIG. 26B shows the capsule of the second type 4B in the brew chamber during extraction.

The piercing member 44 is arranged for piercing the bottom 8A, 8B of the capsule 4A, 4B. As can also be seen in FIGS. 25A-25C, in this example the piercing member 44 does not pierce the bottom 8A, 8B until the lid 12A, 12B of the capsule 4A, 4B abuts against the central portion 32 in the first or second brewing position. Thereto, stiffnesses of the resilient element 42 and the resilient member 84 can be chosen. In this example, the stiffness of the resilient element 42 is chosen to be larger than the stiffness of the resilient member 84. However, it will be appreciated that it is also possible that the stiffness of the resilient element 42 is equal to the stiffness of the resilient member 84 or that the stiffness of the resilient element 42 is smaller than the stiffness of the resilient member 84.

Once the capsule 4A, 4B is included in the brew chamber, and the bottom 8A, 8B has been pierced, a fluid, in this example hot water under pressure, can be supplied to the brew chamber. Therefore it is desired that the brew chamber is leak tight. Thereto the central portion 32 is provided with a first sealing member 120. The peripheral portion 34 is provided with a second sealing member 122. The beverage preparation apparatus 2 is arranged for preparing a quantity of a beverage, suitable for consumption, using either a capsule of the first type 4A or a capsule of the second type 4B. The quantity can be a predetermined quantity. The quantity can also be a user selectable, user settable, or user programmable quantity.

Referring to FIG. 23B sealing in view of the capsule of the first type 4A is described. The first sealing member 120 is arranged for providing a fluid sealing engagement between the central portion 32 and the first brew chamber 18 part when forming the brew chamber for holding the capsule of the first type 4A. The first sealing member 120 can be made of any resilient plastic or rubber, for example of silicon, having a hardness in a range of for example 50-70 Shore A. In this example, the first sealing member 120 abuts against the first brew chamber part 18 when the capsule of the first type 4A is included in the brew chamber. This provides a seal for water being present in the cavity 24 outside the capsule 4A. This way, brewing fluid injected into the brew chamber 22A is prevented from bypassing around the outside of the capsule 4A. In the example of FIG. 23B the first sealing member 120 includes a resilient lip 121. The resilient lip 121 is arranged to provide a self-reinforcing sealing engagement between the central portion 32 and the first brew chamber part 18 under the effect of fluid pressure in the brew chamber, which may for example be as high as 5-20 bar. Stiffness of the resilient lip 121 may therefore be higher or lower or the same as the stiffness of the rest of the first sealing member 120. In this example the first sealing member 120 abuts against the rim 14A of the capsule of the first type 4A. The rim 14A is pressed against the first sealing member 120 by the first abutment surface 26. This provides a sealing engagement between the central portion 32 and the capsule 4A against beverage exiting the capsule 4A via the exit area 13A. It will be appreciated that here the side of the rim 14A facing away from the cup-shaped body 6A is sealed against the second brew chamber part 20. In order to reinforce said sealing engagement, the first sealing member 120 may include a small protruding ridge arranged to be received in a corresponding groove on the rim 14A facing away from the cup-shaped body 6A of the capsule of the first type 4A. The small protruding ridge may also be arranged to seal against a flat part on the rim 14A facing away from the cup-shaped body 6A of the capsule of the first type 4A. Alternatively, or additionally, the side of the rim 14A facing towards the cup-shaped body 6A can be sealed against the first brew chamber part 18. Thereto an additional seal can be provided on the first brew chamber part 18, e.g. on the first abutment surface 26, and/or on the capsule 4A, e.g. on the rim 14A or on the cup-shaped body 6A. It will be clear that a seal on the capsule may be additional to the seal between the first brew chamber part 18 and the second brew chamber part 20. This may reduce the sealing effort by the first sealing member 120.

Referring to FIG. 24B sealing in view of the capsule of the second type 4B is described. The second sealing member 122 is arranged for providing a fluid sealing engagement between the peripheral portion 34 and the first brew chamber 18 part when forming the brew chamber for holding the capsule of the second type 4B. The second sealing member 122 can be made of any resilient plastic or rubber, for example of silicon, having a hardness in a range of for example 50-70 Shore A. It will be clear to the person skilled in the art that the features of the second sealing, e.g. size, thickness, stiffness, or others, may, but need not, be the same as for the first sealing member 120. In this example, the second sealing member 122 abuts against the first brew chamber part 18 when the capsule of the second type 4B is included in the brew chamber. This provides a seal for water being present in the cavity 24 outside the capsule 4B. In the example of FIG. 24B the second sealing member 122 includes a resilient lip 123. The resilient lip 123 is arranged to provide a self-reinforcing sealing engagement between the peripheral portion 34 and the first brew chamber part 18 under the effect of fluid pressure in the brew chamber, which may for example be as high as 5-20 bar. Stiffness of the resilient lip 123 may therefore be higher or lower or the same as the stiffness of the rest of the second sealing member 122. Also the features of the resilient lip 123, as for example a length, may, but need not, be the same as for the resilient lip 121 of the first sealing member 120. In this example the second sealing member 122 abuts against the rim 14B of the capsule of the second type 4B. The rim 14B is pressed against the second sealing member 122 by the second abutment surface 28. This may provide a sealing engagement between the peripheral portion 34 and the capsule 4B against beverage exiting the capsule 4B via the exit area 13B. In FIG. 24B the first sealing member 120 provides a sealing engagement between the central portion 32 and the peripheral portion 34 when forming the brew chamber for holding the capsule of the second type 4B. This sealing engagement between the central portion 32 and the peripheral portion 34 can be self-reinforcing. Thereto the engagement between peripheral portion 34 and the capsule of the second type 4B may allow brewing fluid to pass to the first sealing member 120. Hence, the first sealing member 120 provides a sealing engagement between the central portion 32 and the capsule 4B against beverage exiting the capsule 4B via the exit area 13B. In one embodiment, the first sealing member 120 may be in direct sealing contact with a part of the peripheral portion 34 protruding between the first sealing member 120 and the second sealing member 122 when forming the brew chamber for holding the capsule of the second type 4B. In an alternative embodiment, the first sealing member 120 may be in direct sealing contact with the second sealing member 122 included in the peripheral portion 34. It will be appreciated that here the side of the rim 14B facing away from the cup-shaped body 6B, which rim may or may not be covered by a lid, for example by a foil, is sealed against the second brew chamber part 20. Alternatively, or additionally, the side of the rim 14B facing towards the cup-shaped body 6B can be sealed against the first brew chamber part 18. Thereto an additional seal can be provided on the first brew chamber part 18, e.g. on the second abutment surface 28, and/or on the capsule 4B, e.g. on the rim 14B or on the cup-shaped body 6B. It will be clear that a seal on the capsule may be additional to the seal between the first brew chamber part 18 and the second brew chamber part 20. This may reduce the sealing effort by the second sealing member 122.

When the fluid under pressure is supplied to the capsule 4A, 4B in the brew chamber, the exit area 13A, 13B may open against the extraction plate 30. The extraction plate 30 in this example includes a plurality of relief elements 124. Here the relief elements 124 are truncated pyramids. A rise in pressure inside the capsule 4A, 4B can cause the exit area 13A, 13B to tear against the relief elements allowing beverage to exit the capsule 4A, 4B.

The beverage can pass through the extraction plate 30 via apertures in the extraction plate. Next the beverage can flow to an outlet 126. From the outlet 126 the beverage can flow into a receptacle, such as a cup.

Once the beverage has been brewed, the lever 58 can be moved upwardly. This causes the arresting ring 80 to be moved away from the retainer 110. Next, the first brew chamber part 18 will be moved rearwardly. The second inclined surface 116 of the retainer 110 can allow the retainer to pass the projection 108. The first brew chamber 18 part will move away from the second brew chamber part 20. The central portion 32 will return to the ready position. The bosses 50, 52 and grooves 54, 56 determine the path that will be followed by the first brew chamber part 18. As shown in FIGS. 27A and 27B the first brew chamber part will swivel downwardly. This promotes ejection of the used capsule 4A, 4B from the cavity 24 under the effect of gravity. The ejector 38 can assist in pushing the capsule 4A, 4B off the piercing member 44 and out of the cavity 24. The used capsule 4A, 4B can fall into a waste basket of the apparatus 2.

In this example the first and second capsules 4A, 4B are designed to make a similar visual impression. FIG. 28A shows an example of a capsule of the first type 4A inserted in the brew chamber 22A formed by the first brew chamber part 18 and the second brew chamber part 20. It will be appreciated that the circumferential wall 10A is narrower than the cavity 24 at that location. As a result there is a first volume 127 surrounding the capsule of the first type 4A inside the cavity 24. FIG. 28B shows an example of a capsule of the second type 4B inserted in the brew chamber 22B formed by the first brew chamber part 18 and the second brew chamber part 20. It will be appreciated that a part 128 of the circumferential wall 10B is narrower than the cavity 24 at that location. This part 128 is formed by the part of the circumferential wall 10B extending beyond the first abutment surface 26. As a result there is a second volume 130 surrounding the capsule of the second type 4B inside the cavity 24.

It is noted that the first volume 127 is not occupied by the capsule of the first type 4A when the brew chamber holds the capsule of the first type 4A. However, this first volume 127 is occupied by part of the capsule of the second type 4B when the brew chamber holds the capsule of the second type 4B. The second volume 130 is not occupied by the capsule of the second type 4B when the brew chamber holds the capsule of the second type 4B. This second volume 130 receiving the central portion 32 of the extraction plate 30 when the brew chamber holds the capsule of the first type 4A.

When brewing a beverage using the capsule of the first type 4A, the first volume 127 will fill with fluid, such as water, which fluid is not used for brewing the beverage. This fluid can be drained to the waste basket after brewing. When brewing a beverage using the capsule of the second type 4B, the second volume 130 will fill with fluid, such as water, which fluid is not used for brewing the beverage. This fluid can be drained to a container, e.g. the waste basket, after brewing. In this example the first volume 127 is substantially equal to the second volume 130. Hence, the volume of fluid directed to the waste basket is substantially equal when brewing a beverage using a capsule of the first type 4A and when brewing a beverage using a capsule of the second type 4B.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the central portion of the extraction plate includes a plurality of relief elements. The peripheral portion includes no relief elements. However, it will be appreciated that the peripheral portion may also include relief elements.

The extraction plate and the second exit area can be adapted to each other such that a flow resistance of the second exit area when opened is less than a flow resistance of the first exit area when opened. The extraction plate and the second exit area may be adapted to each other such that the second exit area tears on the extraction plate over a larger surface area than the first exit area. The extraction plate and the second exit area may be adapted to each other such that the second exit area tears on the extraction plate on more locations than the first exit area. Outer relief elements may be designed for tearing both the first and second exit area wherein the second exit area tears on the outer relief elements over a larger surface area than the first exit area. The extraction plate can include relief elements of a first type and at least one relief element of a second type, wherein the relief elements of the first type are arranged within an area corresponding to the first exit area, and the at least one relief element of the second type being arranged within an area corresponding to the second exit area and outside the area corresponding to the first exit area. The relief element of the second type may have a sharper edge than the relief elements of the first type. The second exit area may include a weakened zone. The weakened zone may be located in a peripheral area of the second exit area.

In the examples, the capsule of the first type has an outwardly extending flange-like rim. It will be appreciated that it is possible that the capsule of the first type does not include an outwardly extending rim. In the examples, the capsule of the second type has an outwardly extending flange-like rim. It will be appreciated that it is possible that the capsule of the second type does not include an outwardly extending rim.

In the examples, the capsule body and lid are made of aluminum foil, preferable polymer coated aluminum foil to allow easy welding of the lid to the body. It will be appreciated that the capsule body and/or lid can be made of a wide variety of materials considered suitable by the skilled person and capable of being processed into a sheet, film or foil using techniques conventionally known in the art such as extrusion, co-extrusion, injection molding, blow molding, vacuum forming, etc. Suitable materials for the capsule body and/or lid include, without being limited thereto, plastic materials, in particular thermoplastic materials, for example a polyolefin polymer, for example polyethylene or polypropylene, PVC, polyesters for example polyethylene terephthalate (PET); metal foils such as aluminum, stainless steel, metal alloys etc.; or sheets of a woven or a non-woven or otherwise processed fibrous material, like paper, polyester, etc.; or combinations thereof, e.g. multilayers. The material for the capsule can be a biodegradable polymer or another biodegradable material. The skilled person will be capable of selecting the appropriate material taking into account the envisaged use with food material and any other relevant circumstances during use of the capsule. The thickness of the sheet or foil may be chosen such that a form stable capsule is provided. The thickness of the sheet or foil may vary with the nature of the material.

In the examples, the capsules are closed capsules. It is also possible to provide the system with an open capsule. The open capsule is open prior to insertion into the apparatus. The open capsule can be pre-perforated. The open capsule can be packaged in a hermetically sealed package, which has to be removed before inserting the open capsule in the apparatus. In the examples, the capsules are pierced by the piercing means. It is also possible to provide the system with a capsule that is not pierced by the piercing means. Such capsule can e.g. include an entrance filter. In the examples, the capsules open against the extraction plate. It is also possible to provide the system with a capsule that does not open against the extraction plate. Such capsule can e.g. include an exit filter.

In the examples, the capsules themselves do not include a sealing member. It will be appreciated that it is possible to provide the capsule with a sealing member, e.g. a resilient sealing member. The sealing member can e.g. be placed on the rim, e.g. on the side facing towards the cup-shaped body or on the side facing away from the cup-shaped body. Alternatively, or additionally, a sealing member can be provided on the circumferential wall and/or on the bottom.

In the examples the arresting ring and retainer extend along substantially the entire perimeter of the first and second brew chamber parts. This provides particular good locking of the two brew chamber parts onto each other. However, it will be appreciated that it is also possible that the arresting ring and retainer include arresting means and retaining means at one or more discrete positions along the perimeter, e.g. at two, three, four, six or eight positions.

In all the examples above the capsule 4B can be replaced by a capsule 4B' to be discussed hereinafter.

For a detailed embodiment (see FIG. 109 A-109C) of the capsule of the second type 4B (also referred to as the ILD capsule) it holds that the capsule 4B includes a frusto-conical capsule body 6B. The body comprises a circumferential side wall 10B extending around a central axis of the cup body, a bottom wall 8B connected with a first 9B end of the side wall for closing off the first end of the capsule body and a flange (also referred to as rim or flange like rim) 14B extending radially outwardly from a second end 11B of the circumferential side wall.

The capsule further includes a foil lid 12B that is connected with the flange. It also includes a coffee bed 13B of coffee grind that is accommodated within an internal space 16B bounded by the capsule body and the lid. The coffee bed has a maximum coffee bed diameter D1 that corresponds with an inner diameter of the cup body at the second end of the circumferential wall. The internal space has a height H1 defined by the maximum distance between the bottom and a plane in which the second end of the circumferential side wall extends, The weight of the coffee bed is in the range of 9-13 grams. The (height)/(maximum width) ratio of the coffee bed is within the range of 0.9-1.2. In this example D1 is about 34 mm and H1 is about 39 mm. The ratio of (the height of the internal space)/(the inner diameter of the cup body at the second end of the circumferential wall) is also in the range of 0.9-1.2. Thus the height of the coffee bed is substantially the same as height of the internal space. The capsule body 6B and the lid 12B are each made from aluminum. The capsule 4B is hermitically closed. The bottom of the capsule 4B is designed to be pierced open for supplying water under pressure into the capsule and wherein the lid is designed to tear open under the influence of the pressure of the water in the capsule as discussed above.

The effects are that the capsule of the second type has a good brew performance. For example the brew performance can be characterized as follows:

dry matter being within a range of 2.8-3.4% for an espresso and 1.3-1.5% for a lungo;

the ratio (bitterlactones)/(acetic acids) is in the range of 220-245 for espresso and in the range of 480-510 for lungo;

the ratio (bitterlactones)/(quinic acids) is in the range of 95-105 for espresso and in the range of 210-230 for lungo;

the ratio (bitterlactones)/(citric acids) is in the range of 210-225 for espresso and 390-420 for lungo;

yield in the range of 20-28%;

strength in the range of 2.6-3.9%;

aroma being within a range of 7180-7750 ppm for an espresso and 7300-7550 ppm for a lungo Other value ranges are shown in FIGS. 14A, 14B, 15, 16, 17, 18, 19 and 20 in which the values relating to espresso 2 relate to an espresso brew made from a DCA capsule which is an embodiment of the ILD capsule according to the invention. The values relating to lungo 2 relate to a lungo brew made from a DCA capsule which is an embodiment of the ILD capsule according to the invention. The values relating to espresso 1 and lungo 1 are associated with brews that have been made with a standard capsule (STN) not according to the present invention.

The values ranges shown in FIGS. 14A, 14B, 15, 16, 17, 18, 19 and 20 and relating to espresso 2, lungo 2 (for FIGS. 14A, 14B, 15, 16, 17 and 18) and relating to Forza B1 ILD 10.7 g (for FIG. 19) and relating to Profundo B1 ILD 11.1 g (for FIG. 19) also characterize the brew performance of an embodiment of an ILD capsule according to the invention and are incorporated herein by reference. Preferably the weight of the coffee bed may be in the range of 10.0-12.5 grams.

Preferably it may hold in general that the volume of the coffee bed is at least substantially the same as the volume of the internal space. It may also hold that the ratio of the (volume of the coffee bed)/(volume of the internal space) is in the range of 0.6-1.0 preferably within the range of 0.75-1.0, more preferably within the range of 0.85-1.0, even more preferably within the range of 0.9-1.0, most preferably within the range of 0.95-1.0. The fact that the internal space is (almost) filled with coffee provides that the brewing behavior is predictable. If it would not be (almost) completely filled the shape of the coffee bed would very. It comes as a surprise that such a capsule can be used for preparing a double ristretto, double espresso and double lungo. The skilled man would expect that the capsule for the double lungo would be (almost) completely filled with coffee and that the capsule for the ristretto and/or espresso would not be completely filled with the coffee bed. In that case the remaining open space near the bottom of the capsule could be filled with a plastic filling peace having an open structure so that water could flow through it. This filling peace provides that the coffee bed has a predefined shape wherein channeling is avoided. Also it is avoided that the strength of the brew for a espresso or ristretto becomes to strong. According to an aspect of the invention the filling peace is replaced by coffee grinds. It shows that the strength of the brew for a espresso or ristretto is still as desired and does not become to strong.

In view of this the invention also relates to a system comprising a first capsule of the second type 4B as discussed above and a second capsule of the second type 4B (including a second capsule of the second type 4B') discussed below as discussed above wherein the first capsule of the second type 4B is filled with a coffee bed for preparing a double ristretto or a double espresso and wherein the second capsule of the second type 4B. 4B' is filled with a coffee bed for preparing a double lungo, wherein the height of the coffee bed of the first capsule of the second type is about the same as the height of the coffee bed of the second and wherein preferably the height of each coffee bed substantially corresponds with the height of the internal space 16B.

More general it is preferred that the volume of the internal space is within the range of 25-30 ml, more preferably within the range of 27.5-28.5 ml. This corresponds with possible scaling factor f as discussed above. Also more general the volume of the coffee bed is within the range of 25.0-30.0 ml, more preferably within the range of 27.5-28.5 ml.

It also holds more general that the height of the internal space is in the range of 37.0-39.0 mm, preferably 38.0-38.8 mm; and/or the inner diameter of the capsule body at second end of the circumferential wall is in the range of 33.0-35.0 mm, preferably 34.0-34.9 mm (diameter cup body opening); and/or the inner diameter of the capsule body at the first end of the circumferential wall is in the range of 27.0-30.0 mm, preferably 28.0-29.0 mm (diameter bottom); In more general characteristics terms it holds that the capsule is arranged for preparing a volume of coffee brew larger than 50 ml. In this embodiment the capsule body and/or the lid are provided with a coating.

According a further aspect of the invention it holds for the capsule of the second type that:

a grind size distribution;

an average grind size;

a percentage of fines;

tap density of coffee (gr/cm³);

volume mean diameter; and coffee bed density gr/cm³ in capsule are all chosen such that with the internal volume being completely, or alternatively, partly filled with coffee grind, the taste of the brew obtained is defined by a fingerprint which is defined by at least one of the following parameters:

dry matter being within a range of 2.8-3.4% for an espresso and 1.3-1.5% for a lungo;

the ratio (bitterlactones)/(acetic acids) is in the range of 220-245 for espresso and in the range of 480-510 for lungo;

the ratio (bitterlactones)/(quinic acids) is in the range of 95-105 for espresso and in the range of 210-230 for lungo;

the ratio (bitterlactones)/(citric acids) is in the range of 210-225 for espresso and 390-420 for lungo;

yield in the range of 20-28%;

strength in the range of 2.6-3.9%;

aroma being within a range of 7180-7750 ppm for an espresso and 7300-7550 ppm for a lungo.

Preferably the ratio (lid diameter)/(lid thickness) is within the range of 700-2100, preferably within 900-1400. Such a lid tears open on an optimal moment during its use despite that it has a relatively large surface area.

The ranges mentioned above provide a more predictable desired yield and strength as discussed above.

According to another aspect of the invention it holds for the capsule of the second type that:

the height of the coffee bed is in the range of 23.0-39.0 mm, preferably 35.0-38.8 mm; and/or the maximum coffee bed diameter is in the range of 33.0-35.0 mm, preferably 34.0-34.9 mm; and/or the volume of the internal space is in the range of 25.0-30.0 ml, preferably 27.5-28.5 ml;

and wherein: at least one of the coffee bed properties is within the following ranges:

tap density: 380-500 g/l, preferably 400-460 g/l;

percentage of fines: 6-24%<90 microns, preferably 10-21%<90 microns volume mean diameter: 240-440 microns, preferably 260-400 microns Effects are that the capsule of the second type when being used, provides an amount of coffee brew in the range of 50-220 ml within a time range of 10-73 s so that an average flowrate is obtained of 3-5 ml/s. The lower part of the volume range being associated with a double ristretto, the middle part of the volume range is associated with a double espresso and the upper part of the volume range is associated with a double lungo.

It is noted that the percentage of fines and volume mean diameter (VMD) according to the invention is determined by means of a commonly known Sympatec analyser that is suitable for determining particle distribution and size in dry products. Such an analyser may be a Sympatec Central Unit "Helos" used in combination with a dry dispersion system Rodos T4.1 unit. The used measuring range R6 comprises 9.0-1750. A sample is positioned in the measuring unit. By means of laser diffraction technology, the particle size distribution of said sample is determined. The light emitted by the laser is diffracted by the sample particles. The amount of diffraction is dependent on the particle size of the roast and ground coffee of the sample. The diffused light is detected by a detector after passing a lens, said lens being a R6 lens.

A coffee brew may be obtained of which the fingerprint includes at least one of the following parameters:

dry matter being within a range of 2.8-3.4% for an espresso and 1.3-1.5% for a lungo;

the ratio (bitterlactones)/(acetic acids) is in the range of 220-245 for espresso and in the range of 480-510 for lungo;

the ratio (bitterlactones)/(quinic acids) is in the range of 95-105 for espresso and in the range of 210-230 for lungo;

the ratio (bitterlactones)/(citric acids) is in the range of 210-225 for espresso and 390-420 for lungo;

yield in the range of 20-28%;

strength in the range of 2.6-3.9%;

aroma being within a range of 7180-7750 ppm for an espresso and 7300-7550 ppm for a lungo.

According to again another aspect of the invention it holds for the capsule of the second type that:

the height of the internal space is in the range of 37.0-39.0 mm, preferably 38.0-38.8 mm; and/or the internal diameter of the cup body at a the second end is in the range of 33.0-35.0 mm, preferably 34-34.9 mm; and/or the volume of the internal space is in the range of 25.0-30.0 ml, preferably 27.5-28.5 ml; and wherein the angle φ of the sidewall relative to the central axis is in the range of 4.5-5.5 degrees, preferably 4.9-5.1 degrees.

It shows that such a capsule can be made from aluminum wherein the capsule body can be formed by a deep drawing process without the risk that during the deep drawing process the capsule body tears and/or faux plis occurs. The draw ratio for the capsule (made from an aluminum circular sheet) is 1.28-1.31. In that case going over 5 degrees makes it too difficult to produce without running said risks.

Preferably the capsule of the second type has a splash 17 of adhesive in the internal space at the transition edge between the circumferential wall and the flange 14B. This avoids that the lid may tear loose from the capsule body during brewing. It may provide some additional support to be able to obtain a proper seal with the apparatus as discussed above when engaging the lid surface for formation of a seal instead of engaging the flange of the capsule body.

Also according to another aspect of the invention it holds for the capsule of the second type that:

the internal diameter of the cup body at the second end of the circumferential wall is in the range of 33.0-35.0, preferably 34.0-34.9 mm; and/or the internal space has a volume in the range of 25.0-30.0 ml, preferably 27.5-28.5 ml; and/or the height of the internal space is in the range of 37.0-39.0 mm, preferably 38.0-38.8 mm; and wherein the thickness of the circumferential wall and the bottom wall of the cup body is in the range of 105-120 μm. The relative thick wall also helps that faux plis may be avoided as discussed above.

Also according to another aspect of the invention it holds for the capsule of the second type that the internal diameter of the cup body at the second end of the circumferential wall is in the range of 33.0-35.0 mm, preferably in the range of 34.0-34.9 mm. The lid has a diameter in the range of 34.0-48.0 mm, preferably between 39.0-43.0 mm, even more preferably approximately 40.8 mm. This provides a sufficient large surface area to connect the lid to the flange. The lid thickness is within a range of 20-47 micro meter, preferably within 30-40 micro meter. The lid is connected along a ring like connection area with the flange of the cup body, wherein a ratio (Ar/Al) of a surface area (Ar) of the ring like connection area and a surface area (Al) of the lid is within a range of 0.36-0.41, preferably 0.375-0.385. The amount of bulging, i.e. the distance between a center of the lid and the plane in which the second end of the circumferential wall extends is in the range of 0.8-2.0 mm. This possible amount of bulging enables coffee grinds to be packed into the closed capsule which is fresh and holds a lot of aroma's. The internal pressure at which the lid bursts open without contacting a studplate or at which the lid is teared loose from the flange is in the range of 1.2-1.9 bar more preferably in the range of 1.6-1.8 bar Now another embodiment of a capsule of the second type 4B' will be discussed. This second capsule 4B' of the second type is the same as the (first) capsule of the second type 4B with the difference that the lid 12B' (FIG. 29D) that is connected with the flange 14B, is provided with an outflow opening 21B' (FIG. 29D) or a plurality of outflow openings 21B' (FIG. 29E). The capsule 4B' further comprises an outlet filter 19B' (schematically shown as an option by dashed lines in FIGS. 29A, 29B and shown in FIGS. 29D and 29E) which is positioned between the coffee bed 13B' and the lid 12B'. Preferably the thickness of the outlet filter is in the range of 1.2-1.6 mm and/or the permeability of the outlet filter is in the range of 100 mm/s @ 200 Pa-700 mm/s @ 200 Pa according to DIN and ISO 9237 and/or the outlet filter comprises polyester fibers and/or the weight of the filter is 300-600 g/m2.

Such as capsule according to FIGS. 29A and 29B with a lid according to FIG. 29D or 29E can be used for preparing a double lungo of coffee which does not or almost does not comprise crema. Such coffee extract is also referred to as brewed coffee.

The total surface area of the opening 21B' or the plurality of openings 21B' may be in the range of 1.5-5.0 cm2.

The invention also relates to a system comprising a first capsule of the second type 4B as discussed above and a second capsule 4B' of the second type as discussed above wherein the first capsule of the second type 4B is filled with a coffee bed for preparing a double ristretto or a double espresso and wherein the second capsule of the second type 4B' is filled with a coffee bed for preparing a double lungo with substantially no crema wherein the height of the coffee bed of the first capsule of the second type is about the same as the height of the coffee bed of the second capsule of the second type and wherein preferably the height of each coffee bed substantially corresponds with the height of the internal space 16B.

According to another aspect of the invention a system comprising an apparatus 2 for brewing a coffee as discussed above and a capsule of the second type 4B or 4B' wherein the apparatus is arranged such that for preparing a double ristretto or a double espresso while using the capsule of the second type 4B a pump of the apparatus operates at full power so that a flowrate of the fluid which is submitted to the capsule of the second type by means of the pump for brewing coffee is maximal within the system.

According to yet another aspect, the apparatus is arranged for preparing a double lungo while using the capsule of the second type 4B or 4B' wherein the flow of water which is submitted by means of the pump to the capsule of the second type is controlled, during a time period, preferably during the full time period wherein the pump is powered, so that the flowrate does not exceed a predetermined value wherein the predetermined value lays in the range of 2.5-5.0 ml/sec, preferably 3.0-4.0 ml/s. In such a system it is avoided that when the capsule of the second type 4B' is used, which capsule has by its nature a lower flow resistance than capsule of the second type 4B, the flowrate through the capsule of the second type 4B' does not become too high despite the relatively flow resistance of the capsule 4B'. In the example A below the time period is the full time period wherein the pump is powered. In the example B below the time period may start 10 seconds after the pump has started.

Alternatively the apparatus is arranged for preparing a double lungo while using the capsule of the second type 4B wherein the pump of the apparatus operates at full power so that a flowrate of the fluid which is submitted to the capsule of the first type by means of the pump for brewing coffee is maximal within the system. In that case the apparatus is also arranged for preparing a double lungo while using the capsule of the second type 4B' wherein the flow of water which is submitted by means of the pump to the capsule of the second type is controlled during a time period, preferably during the full time period wherein the pump is powered so that the flowrate does not exceed a predetermined value wherein the predetermined value lays in the range of 2.5-5.0 ml/s, preferably within 3.0-4.0 ml/s. It would not be a problem of the pump operates at full power if the capsule 4B would be used because it has a higher resistance than capsule 4B'.

The apparatus can therefor, in an example A be provided with three buttons 300 (schematically shown in FIG. 26B only) which can be used in combination with a capsule of the second type 4B, 4B' for selecting a brewing process: a first button for the selection of the preparation of a double ristretto wherein, if the first button is activated, in use, the apparatus provides sufficient hot water to the capsule of the second type (4B) for preparing the double ristretto at maximum pump power, a second button for the selection of the preparation of a double espresso wherein, if the second button is activated, in use, the apparatus provides sufficient hot water to the capsule of the second type (4B) for preparing a double espresso at maximum pump power and a third button for the selection of the preparation of a double lungo wherein, if the third button is activated, in use, the apparatus provides sufficient hot water to the capsule of the second type (4B or 4B') for preparing a double lungo while the flowrate is kept below the predetermined maximum value.

Alternatively the apparatus may be provided with four buttons 300 (schematically shown in FIG. 26B only) which can be used in combination with a capsule of the second type 4B, 4B' for selecting a brewing process: a first button for the selection of the preparation of a double ristretto wherein, if the first button is activated, in use, the apparatus provides sufficient hot water to the capsule of the second type (4B) for preparing the double ristretto at maximum pump power, a second button for the selection of the preparation of a double espresso wherein, if the second button is activated, in use, the apparatus provides sufficient hot water to the capsule of the second type (4B) for preparing a double espresso at maximum pump power, a third button for the selection of the preparation of a double lungo wherein, if the third button is activated, in use, the apparatus provides sufficient hot water to the capsule of the second type (4B) for preparing a double lungo at maximum pump power and a fourth button for the selection of the preparation of a double lungo with substantially no crema wherein, if the fourth button is activated, in use, the apparatus provides sufficient hot water to the capsule of the second type 4B' for preparing a double lungo with substantially no crema while the flowrate is kept below the predetermined maximum value.

Again alternatively in an example B. the apparatus is provided with three buttons for selecting the brewing process. A first button for selecting the preparation of a double ristretto wherein, if the first button is activated, in use, the apparatus provides sufficient hot water to the capsule of the second type 4B for preparing the double ristretto at maximum pump power. A second button for selecting the preparation of a double espresso wherein, if the second button is activated, in use, the apparatus provides sufficient hot water to the capsule of the second type 4B for preparing a double espresso at maximum pump power. A third button for selecting the preparation of a double lungo wherein, if the third button is activated, in use, the apparatus provides sufficient hot water to the capsule of the second type 4B or 4B' for preparing a double lungo. The apparatus may further be provided with detection means such as a flow meter to determine whether during a predetermined first time period of the brewing process (such as the first 10 seconds of a brewing process) the flowrate exceeds a predetermined first value (such as 7-9 ml/s) and/or the amount of beverage produces exceeds a predetermined second value (such as 50 ml). The apparatus may be further arranged to keep the flow rate below the predetermined maximum value (as discussed above) for the flow rate within a second time period of the brewing process (for example starting at 10 seconds after the start of the brewing process until the end of the brewing process) which follows after the first time period if during the first time period it is detected that the flowrate exceeds the predetermined first value and/or the amount of beverage produces exceeds the predetermined second value. The brewing process is defined in this example as the total time period wherein the pump is powered.

Preferably the apparatus is also designed for preparing a single ristretto, a single espresso and a single lungo by using the capsule of the first type which is smaller than the capsule of the second type. In that case the pump always operates at full power so that a flowrate of the fluid which is submitted to the capsule of the first type by means of the pump for brewing coffee is maximal within the system. The apparatus may be designed to distinguish (automatically) between the capsule of the first type and the capsule of the second type.

In that case for the three buttons solution discussed above the same three buttons may be used to select a brewing process when loaded with the capsule of the first type wherein the apparatus recognizes that a capsule of the first type is loaded. In that case the activation of three buttons has a different function than discussed above in association with a capsule of the second type. The first button for selecting the preparation of a single ristretto wherein, if the first button is activated, in use, the apparatus provides sufficient hot water to the capsule of the first type (4A) for preparing the single ristretto at maximum pump power, the second button for the selection of the preparation of a single espresso wherein, if the second button is activated, in use, the apparatus provides sufficient hot water to the capsule of the first type (4A) for preparing a single espresso at maximum pump power and the third button for selecting the preparation of a single lungo wherein, if the third button is activated, in use, the apparatus provides sufficient hot water to the capsule of the second type (4A') for preparing a single lungo at maximum pump power.

For the four buttons solution discussed above the same first three buttons may be used select a brewing process when loaded with the capsule of the first type. Again the apparatus recognizes that a capsule of the first type is loaded. In that case the activation of four buttons has a different function than discussed above in associating with a capsule of the second type. The first button is for selecting the preparation of a single ristretto wherein if the first button is activated, in use, the apparatus provides sufficient hot water to the capsule of the first type (4A) for preparing the single ristretto at maximum pump power, the second button is for selecting the preparation of a single espresso wherein if the second button is activated, in use, the apparatus provides sufficient hot water to the capsule of the first type (4A) for preparing a single espresso at maximum pump power and the third button is for selecting the preparation of a single lungo wherein if the third button is activated, in use, the apparatus provides sufficient hot water to the capsule of the second type (4A') for preparing a single lungo at maximum pump power. The fourth button is not used for a capsule of the first type.

The maximal flowrate when the capsule of the second type 4B is used for preparing a double espresso or double ristretto or optionally double lungo (pump operates at full power) is in the range of 2.0-7.0 ml/s The maximal flowrate when the capsule of the first type 4A is used is in the range of 1.5-7.0 ml/s.

The apparatus is designed such that for preparing a double lungo the flow of water which is submitted by means of the pump to the capsule is controlled so that the flowrate does not exceed a predetermined value wherein the predetermined value lays in the range of 7-9 ml/s.

The system is preferably designed such that the water temperature profile in the water inlet of a brewing chamber that accommodates the coffee capsule of the second type during brewing complies with the e.g. the following parameters:

from start of 3 s: water temperature is in the range of 90-95° C.

from 3 seconds to 15 seconds: water temperature is in the range of 83-95° C.;

after 15 s: water temperature is in the range of 88-95° C.

An effect is that the final brew temperature of the total volume brewed coffee is in the range of 85-92° C. Also a coffee brew is obtained which has a finger print including at least one of the following parameters:

dry matter being within a range of 2.8-3.4% for an espresso and 1.3-1.5% for a lungo;

the ratio (bitterlactones)/(acetic acids) is in the range of 220-245 for espresso and in the range of 480-510 for lungo;

the ratio (bitterlactones)/(quinic acids) is in the range of 95-105 for espresso and in the range of 210-230 for lungo;

the ratio (bitterlactones)/(citric acids) is in the range of 210-225 for espresso and 390-420 for lungo;

yield in the range of 20-28%;

strength in the range of 2.6-3.9%;

aroma being within a range of 7180-7750 ppm for an espresso and 7300-7550 ppm for a lungo Preferably the piercing pattern in the lid of the capsule of the first type 4A formed during brewing differs from the piercing pattern in the lid of the capsule of the second type 4B formed during brewing wherein the piercing pattern in the lid of a capsule of the first type formed during brewing differs from the piercing pattern in the lid of the capsule of the second type formed during brewing wherein the area comprising the pierced openings of the capsule of the first type is slightly smaller than the area comprising the pierced openings of the capsule of the second type, more particularly between 0.5 and 5.0% smaller.

According to another aspect of the system according to the invention it holds that the capsule of the second type when being used, provides a amount of coffee brew in the range of 50-220 ml within a time range of 10-73 s so that an average flowrate is obtained of 3-5 ml/s, wherein the ratio of the (average flowrate)/(maximum coffee bed diameter) is in the range of 0.008-0.16 ml/mm.

With such a system, coffee may be obtained having a finger print including at least one of the following parameters:

dry matter being within a range of 2.8-3.4% for an espresso and 1.3-1.5% for a lungo;

the ratio (bitterlactones)/(acetic acids) is in the range of 220-245 for espresso and in the range of 480-510 for lungo;

the ratio (bitterlactones)/(quinic acids) is in the range of 95-105 for espresso and in the range of 210-230 for lungo;

the ratio (bitterlactones)/(citric acids) is in the range of 210-225 for espresso and 390-420 for lungo;

yield in the range of 20-28%;

strength in the range of 2.6-3.9%;

aroma being within a range of 7180-7750 ppm for an espresso and 7300-7550 ppm for a lungo.

In another aspect, the invention also relates to a system as described above, wherein with the first capsule of the second type a double ristretto or a double espresso is brewed and wherein with the second capsule of the second type a double lungo is brewed.

Finally, according to another aspect, the invention relates to the use of a system as described above, wherein with a capsule of the second type a double ristretto, a double espresso, or a double lungo is brewed.

It will be appreciated that it is also possible to provide a second apparatus arranged for brewing a beverage using a capsule of the second type, but incapable of brewing a beverage using a capsule of the first type. Such second apparatus can be included in a system with the apparatus as described in relation to the figures and a capsule of the second type and optionally a capsule of the first type.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A system comprising an apparatus for brewing coffee and a set of capsules comprising a capsule of a first type configured to prepare a single espresso, single ristretto or single lungo and a capsule of a second type configured to prepare a double espresso, double ristretto or double lungo, wherein the single espresso and the double espresso, the single ristretto and the double ristretto, or the single lungo and the double lungo have a strength of 2.5-4% and a yield of 20-29%, each capsule comprising:

a frusto-conical capsule body comprising:

a circumferential side wall extending around a central axis of the frusto-conical capsule body;

a bottom wall connected with a first end of the circumferential side wall for closing off the first end of the frusto-conical capsule body;

a flange extending radially outwardly from a second end of the circumferential side wall;

wherein the capsule further includes:

a foil lid that is connected with the flange;

a coffee bed of coffee grind that is accommodated within an internal space bounded by the frusto-conical capsule body and the foil lid, the coffee bed having a maximum coffee bed diameter that corresponds with an inner diameter of the frusto-conical capsule body at the second end of the circumferential side wall, the internal space having a height defined by the maximum distance between the bottom wall and a plane in which the second end of the circumferential side wall extends;

wherein a top radius, bottom radius and height of the capsule of the second type are scaled relative to the capsule of the first type by a single scale factor;

wherein the scale factor is in the range of 1.3-1.7;

wherein the weight of the coffee bed in the capsule of the first type is in the range of 4-8 grams, and wherein the weight of the coffee bed in the capsule of the second type is in the range of 9-13 grams and wherein the (height)/(maximum width) ratio of the coffee bed in the capsule of the second type is within the range of 0.9-1.2;

the apparatus comprising:

a first brew chamber part and a second brew chamber part, closeable against each other to form a brew chamber;

a fluid supply system;

a piercing member;

an extraction plate; and an outlet.

2. The system according to claim 1, wherein for the capsule of the second type the ratio of (the height of the internal space of the frusto-conical capsule body)/(the inner diameter of the frusto-conical capsule body at the second end of the circumferential side wall) is in the range of 0.9-1.2.

3. The system according to claim 1, wherein the height of the coffee bed in the capsule of the second type is substantially the same as the height of the internal space of the capsule of the second type.

4. The system according to claim 1, wherein the weight of the coffee bed in the capsule of the second type is in the range of 10.0-12.5 grams.

5. The system according to claim 1, wherein for the capsule of the second type the volume of the coffee bed is at least substantially the same as the volume of the internal space and/or wherein the ratio of the (volume of the coffee bed)/(volume of the internal space) is within the range of 0.6-1.0.

6. The system according to claim 1, wherein for the capsule of the second type the volume of the internal space is within the range of 25.0-30.0 ml and wherein the volume of the coffee bed is within the range of 25.0-30.0 ml.

7. The system according to claim 1, wherein for the capsule of the second type the volume of the coffee bed is within the range of 25.0-30.0 ml.

8. The system according to claim 1, wherein for the capsule of the second type the height of the internal space is in the range of 37.0-39.0 mm; and/or
the inner diameter of the frusto-conical capsule body at second end of the circumferential side wall is in the range of 33.0-35.0 mm; and/or
the inner diameter of the frusto-conical capsule body at the first end of the circumferential side wall is in the range of 27-30 mm.

9. The system according to claim 1, wherein for the capsule of the second type the frusto-conical capsule body and the foil lid are made from aluminum.

10. The system according to claim 9, wherein the capsule of the second type is hermetically closed prior to insertion into the brew chamber.

11. The system according to claim 1, wherein the capsule of the second type is arranged for preparing a volume of coffee brew larger than 50 ml.

12. The system according to claim 1, wherein for the capsule of the second type the capsule body and/or the foil lid are provided with a coating.

13. The system according to claim 1, wherein for the capsule of the second type the ratio (foil lid diameter)/(foil lid thickness) is within the range of 700-2100.

14. The system according to claim 1, wherein for the capsule of the second type:
the height of the coffee bed is in the range of 23.0-39.0 mm; and/or
the maximum coffee bed diameter is in the range of 33.0-35.0 mm; and/or
the volume of the coffee bed is in the range of 25.0-30.0 ml; and
wherein at least one of the coffee bed properties is within the following ranges:
tap density: 380-500 g/l;
percentage of fines: 6-24%<90 microns;
volume mean diameter: 240-440 microns.

15. The system according to claim 1, wherein for the capsule of the second type:
the height of the internal space is in the range of 37.0-39.0 mm; and/or
the internal diameter of the frusto-conical capsule body at the second end is in the range of 33.0-35.5 mm; and/or the volume of the internal space is in the range of 25.0-30.0 ml; and
wherein the angle of the circumferential side wall relative to the central axis is in the range of 4.5-5.5 degrees.

16. The system according to claim 1, the capsule of the second type further comprising an adhesive in the internal space at a transition edge between the circumferential side wall and the flange.

17. The system according to claim 1, wherein for the capsule of the second type:
the internal diameter of the frusto-conical capsule body at the second end of the circumferential side wall is in the range of 33.0-35.0 mm; and/or
the internal space has a volume in the range of 25.0-30.0 ml; and/or
the height of the internal space is in the range of 37.0-39.0 mm; and
wherein the thickness of the circumferential side wall and the bottom wall of the frusto-conical capsule body is in the range of 105-120 µm.

18. The system according to claim 1, wherein for the capsule of the second type the internal diameter of the frusto-conical capsule body at the second end of the circumferential side wall is in the range of 33.0-35.0 mm; and
wherein the foil lid has a diameter in the range of 34.0-48.0 mm; and
wherein at least one of the following conditions is complied with:
foil lid thickness is within a range of 20-47 micro meter;
the foil lid is connected along a ring like connection area with the flange of the frusto-conical capsule body, wherein a ratio (Ar/Al) of a surface area (Ar) of the ring like connection area and a surface area (Al) of the foil lid is within a range of 0.36-0.41;
the amount of bulging, i.e. the distance between a center of the foil lid and the plane in which the second end of the circumferential side wall extends is in the range of 0.8-2.0 mm; or an internal pressure at which the foil lid bursts open without contacting a studplate of the apparatus or at which the foil lid is torn from the flange is in the range of 1.2-1.9 bar.

19. The system according to claim 1, wherein for the capsule of the second type the foil lid that is connected with the flange is provided with an outflow opening or a plurality of outflow openings wherein the capsule of the second type further comprises an outlet filter which is positioned between the coffee bed and the foil lid.

20. The system according to claim 19, wherein for the capsule of the second type the total surface area of the outflow opening or the plurality of outflow openings is in the range of 1.5-5.0 cm2.

21. The system according to claim 19, wherein the capsule of the second type is arranged for preparing a double lungo with substantially no crema.

22. The system according to claim 1, wherein the apparatus is arranged such that for preparing a double ristretto or a double espresso while using the capsule of the second type a pump of the apparatus operates at full power.

23. The system according to claim 22, wherein the apparatus is arranged such that if used for the capsule of the first type the pump operates at full power.

24. The system according to claim 23, wherein the flow-rate when the capsule of the first type is used and the pump operates at full power is in the range of 1.5-7.0 ml/s.

25. The system according to claim 23, wherein a piercing pattern in the foil lid of the capsule of the first type formed during brewing differs from a piercing pattern in the foil lid of the capsule of the second type formed during brewing wherein the area comprising pierced openings of the capsule of the first type is slightly smaller than the area comprising pierced openings of the capsule of the second type.

26. The system according to claim 22, wherein the apparatus is arranged for preparing a double lungo while using the capsule of the second type wherein a flow of water which is submitted by means of the pump to the capsule of the second type is controlled during a time period so that the flowrate does not exceed a predetermined value wherein the predetermined value lays in the range of 2.5-5.0 ml/sec; or wherein the apparatus is arranged for preparing a double lungo while using the capsule of the second type wherein the pump of the apparatus operates at full power so that a flowrate of the fluid which is submitted to the capsule of the second type by means of the pump for brewing coffee is maximal.

27. The system according to claim 22, further comprising a second capsule of the second type of which the foil lid that is connected with the flange is provided with an outflow opening or a plurality of outflow openings, wherein the second capsule of the second type further comprises an outlet filter which is positioned between the coffee bed and the foil lid, wherein the apparatus is arranged such that for preparing a double lungo without substantially crema while using the second capsule of the second type wherein a flow of water which is submitted by means of the pump to the second capsule of the second type is controlled during a time period so that the flowrate does not exceed a predetermined value wherein the predetermined value lays in the range of 2.5-5.0 ml/sec.

28. The system according to claim 27, wherein the apparatus is provided with four buttons for selecting a brewing process, including a first button for selecting the preparation of a double ristretto wherein, if the first button is activated, in use, the apparatus provides sufficient hot water to the capsule of the second type for preparing the double ristretto at maximum pump power, a second button for selecting the preparation of a double espresso wherein, if the second button is activated, in use, the apparatus provides sufficient hot water to the capsule of the second type for preparing a double espresso at maximum pump power, a third button for selecting the preparation of a double lungo with crema wherein, if the third button is activated, in use, the apparatus provides sufficient hot water to the capsule of the second type for preparing a double lungo at maximum pump power and a fourth button for selecting the preparation of a double lungo with substantially no crema wherein, if the fourth button is activated, in use, the apparatus provides sufficient hot water to the capsule of the second type for preparing a double lungo with substantially no crema while the flowrate is kept below a predetermined maximum value.

29. The system according to claim 22, wherein the flowrate when the capsule of the second type is used and the pump operates at full power is in the range of 2.0-7.0 ml/s.

30. The system according to claim 22, wherein the water temperature profile in a water inlet of the brew chamber that accommodates the capsule of the second type during brewing complies with the following parameters:

from start to 3 seconds: water temperature is in the range of 90-95° C.

from 3 seconds to 15 seconds: water temperature is in the range of 83-95° C.;

after 15 seconds: water temperature is in the range of 88-95° C.

31. The system according to claim 22, wherein the capsule of the second type, when being used, provides an amount of coffee brew in the range of 50-220 ml within a time range of 10-73.3 s so that an average flowrate is obtained of 3-5 ml/s, wherein the ratio of the (average flowrate)/(maximum coffee bed diameter) is in the range of 0.008-0.16 ml/mm.

32. The system according to claim 22 wherein the apparatus is provided with three buttons for selecting a brewing process, including a first button for selecting the preparation of a double ristretto wherein, if the first button is activated, in use, the apparatus provides sufficient hot water to the capsule of the second type for preparing the double ristretto at maximum pump power, a second button for selecting the preparation of a double espresso wherein, if the second button is activated, in use, the apparatus provides sufficient hot water to the capsule of the second type for preparing a double espresso at maximum pump power and a third button for selecting the preparation of a double lungo wherein, if the third button is activated, in use, the apparatus provides sufficient hot water to the capsule of the second type for preparing a double lungo while during a time period wherein the pump is powered the flowrate is kept below a predetermined maximum value.

33. The system according to claim 32, wherein the apparatus is also designed for preparing a single ristretto, a single espresso or a single lungo by using the capsule of the first type which is smaller than the capsule of the second type, and wherein the apparatus is arranged to distinguish the capsule of the first type from the capsule of the second type wherein if the presence the capsule of the first type in the apparatus is detected the actuation of the three buttons is as follows: the first button is for selecting the preparation of a single ristretto wherein, if the first button is activated, in use, the apparatus provides sufficient hot water to the capsule of the first type for preparing the single ristretto at maximum pump power, the second button is for selecting the preparation of single espresso wherein, if the second button is activated, in use, the apparatus provides sufficient hot water to the capsule of the first type for preparing a single espresso at maximum pump power and the third button is for selecting the preparation of a single lungo wherein, if the third button is activated, in use, the apparatus provides sufficient hot water to the capsule of the first type for preparing a single lungo at maximum pump power.

34. The system according to claim 33, wherein the apparatus is arranged to distinguish the capsule of the first type from the capsule of the second type wherein if the presence of the capsule of the first type in the apparatus is detected the actuation of the three buttons is as follows: the first button is for selecting the preparation of a single ristretto wherein, if the first button is activated, in use, the apparatus provides sufficient hot water to the capsule of the first type for preparing the single ristretto at maximum pump power, the second button is for selecting the preparation of single espresso wherein, if the second button is selected, in use, the apparatus provides sufficient hot water to the capsule of the first type for preparing a single espresso at maximum pump power and the third button is for selecting the preparation of a single lungo wherein, if the third button is activated, in use, the apparatus provides sufficient hot water to the capsule of the first type for preparing a single lungo at maximum pump power.

35. The system according to claim 22, wherein the apparatus is provided with three buttons for selecting a brewing process, including a first button for selecting the preparation of a double ristretto, wherein, if the first button is activated, in use, the apparatus provides sufficient hot water to the capsule of the second type for preparing the double ristretto at maximum pump power, a second button for selecting the preparation of a double espresso, wherein, if the second button is activated, in use, the apparatus provides sufficient hot water to the capsule of the second type for preparing a double espresso at maximum pump power and a third button for selecting the preparation of a double lungo, wherein, if the third button is activated, in use, the apparatus provides sufficient hot water to the capsule of the second type for preparing a double lungo, wherein the apparatus is provided with detection means to determine whether during a predetermined first time period of the brewing process the flowrate exceeds a predetermined first value and/or the amount of beverage produced exceeds a predetermined second value wherein the apparatus is further arranged to keep the flow rate below a predetermined maximum value for the flow rate within a second time period of the brewing process which follows after the first time period if during the first time period it is detected that the flowrate exceeds the predetermined first value and/or the amount of beverage produced exceeds the predetermined second value.

\* \* \* \* \*